US012426739B2

(12) United States Patent
Garland et al.

(10) Patent No.: US 12,426,739 B2
(45) Date of Patent: Sep. 30, 2025

(54) COOKING DEVICES AND COMPONENTS THEREOF

(71) Applicant: SharkNinja Operating LLC, Needham, MA (US)

(72) Inventors: Adam Garland, Boston, MA (US); Gregory Allan Fish, Boston, MA (US); Alex Kibbe, Needham, MA (US); Joshua D. Anthony, North Billerica, MA (US); Kevin O'Malley, London (GB); Christopher Meyer-Rassow, London (GB)

(73) Assignee: SharkNinja Operating LLC, Needham, MA (US)

( * ) Notice: Subject to any disclaimer, the term of this patent is extended or adjusted under 35 U.S.C. 154(b) by 0 days.

(21) Appl. No.: 18/883,593

(22) Filed: Sep. 12, 2024

(65) Prior Publication Data
US 2025/0040755 A1    Feb. 6, 2025

Related U.S. Application Data

(63) Continuation of application No. PCT/US2024/040545, filed on Aug. 1, 2024.
(Continued)

(51) Int. Cl.
*A47J 37/06* (2006.01)
*A23L 5/10* (2016.01)
(Continued)

(52) U.S. Cl.
CPC ........... *A47J 37/0641* (2013.01); *A23L 5/17* (2016.08); *A47J 36/06* (2013.01); *A47J 37/0664* (2013.01); *F24C 15/325* (2013.01)

(58) Field of Classification Search
CPC .... A47J 37/0641; A47J 36/06; A47J 37/0664; A23L 5/17; F24C 15/325
See application file for complete search history.

(56) References Cited

U.S. PATENT DOCUMENTS

| 3,817,419 A | 6/1974 | Moller et al. |
| 11,490,761 B1 | 11/2022 | Jackson et al. |

(Continued)

FOREIGN PATENT DOCUMENTS

| CN | 203873601 U | 10/2014 |
| CN | 203885342 U | 10/2014 |

(Continued)

OTHER PUBLICATIONS

Invitation to Pay Additional Fees received for PCT Patent Application No. PCT/US2024/040545, mailed on Dec. 16, 2024, 17 pages.
(Continued)

*Primary Examiner* — Elizabeth M Kerr
*Assistant Examiner* — Keith Brian Assante
(74) *Attorney, Agent, or Firm* — Mintz, Levin, Cohn, Ferris, Glovsky and Popeo, P.C.

(57) ABSTRACT

Various embodiments of a cooking system are described herein. In an aspect, a device may include a cooking system, comprising: a cooking device, comprising: a housing having a cavity extending upward from a bottom surface; a heating element positioned within the cavity; and an air movement device configured to direct air over the heating element and from the cavity; and a vessel having a cavity therein and a upper surface defining an opening, wherein the cooking device is configured to be removably positioned over the vessel such that the bottom surface aligns with the upper surface, creating a cooking chamber within the cavity to perform a cooking operation.

23 Claims, 48 Drawing Sheets

Related U.S. Application Data

(60) Provisional application No. 63/670,400, filed on Jul. 12, 2024, provisional application No. 63/616,182, filed on Dec. 29, 2023, provisional application No. 63/516,980, filed on Aug. 1, 2023.

(51) Int. Cl.
*A47J 36/06* (2006.01)
*F24C 15/32* (2006.01)

(56) References Cited

U.S. PATENT DOCUMENTS

| | | | |
|---|---|---|---|
| 11,619,394 B1 | 4/2023 | Elliston et al. | |
| 11,930,595 B2 | 3/2024 | Yin et al. | |
| D1,056,602 S | 1/2025 | Hansen | |
| 2003/0192526 A1* | 10/2003 | DeMars | A47J 37/0763 126/41 R |
| 2004/0084464 A1 | 5/2004 | Koo | |
| 2005/0000368 A1* | 1/2005 | Siegel | A47J 37/1242 126/41 R |
| 2005/0173402 A1* | 8/2005 | White | A47J 27/004 219/432 |
| 2006/0021611 A1* | 2/2006 | Johnson | A47J 37/0763 126/41 R |
| 2008/0164258 A1* | 7/2008 | Raichlen | A47J 37/0786 220/485 |
| 2009/0321410 A1 | 12/2009 | Moon | |
| 2012/0006824 A1 | 1/2012 | Antal, Sr. et al. | |
| 2012/0006826 A1* | 1/2012 | McIntyre | A47J 45/071 220/573.1 |
| 2012/0248116 A1 | 10/2012 | Smyers et al. | |
| 2013/0000492 A1* | 1/2013 | Lin | A47J 37/0641 99/348 |
| 2013/0298781 A1* | 11/2013 | Ganuza | A47J 37/0623 99/447 |
| 2014/0021191 A1* | 1/2014 | Moon | A23B 2/90 34/220 |
| 2014/0246419 A1* | 9/2014 | Li | A47J 37/0664 219/403 |
| 2015/0136111 A1* | 5/2015 | Bizal | A47J 37/108 126/25 R |
| 2019/0045973 A1 | 2/2019 | Gill et al. | |
| 2019/0254476 A1 | 8/2019 | Anthony et al. | |
| 2020/0146497 A1* | 5/2020 | Shi | A23L 5/12 |
| 2020/0229638 A1 | 7/2020 | Lu | |
| 2020/0315389 A1 | 10/2020 | Stewart et al. | |
| 2021/0085128 A1* | 3/2021 | Kennedy | A47J 27/0813 |
| 2021/0121011 A1 | 4/2021 | Elliston et al. | |
| 2021/0137298 A1* | 5/2021 | Zakowski | A47J 36/16 |
| 2021/0219777 A1 | 7/2021 | Floessholzer | |
| 2021/0219778 A1 | 7/2021 | Senders | |
| 2022/0117439 A1* | 4/2022 | Mo | A47J 27/0802 |
| 2022/0125240 A1* | 4/2022 | McCullough | A47J 36/32 |
| 2022/0296042 A1* | 9/2022 | Currid | A47J 37/0763 |
| 2022/0369862 A1 | 11/2022 | Zhang | |
| 2023/0055266 A1 | 2/2023 | Chen | |
| 2023/0131171 A1* | 4/2023 | Martin | A47J 37/0641 426/523 |
| 2023/0200584 A1* | 6/2023 | Kennedy | A21B 1/26 99/403 |
| 2023/0233022 A1* | 7/2023 | Kennett | F23N 5/203 126/25 R |
| 2023/0270275 A1* | 8/2023 | Zhou | A47J 27/086 99/337 |
| 2023/0276982 A1* | 9/2023 | Han | A47J 37/0641 99/341 |
| 2023/0397763 A1* | 12/2023 | Hillstrom | A47J 37/0713 |
| 2024/0049910 A1* | 2/2024 | Hardin | A47J 37/0664 |
| 2024/0081579 A1 | 3/2024 | Klostermann et al. | |
| 2024/0172890 A1 | 5/2024 | Wang et al. | |
| 2024/0180364 A1 | 6/2024 | Wang et al. | |
| 2024/0306846 A1 | 9/2024 | Biegeleisen et al. | |
| 2024/0306847 A1 | 9/2024 | Dai et al. | |

FOREIGN PATENT DOCUMENTS

| | | |
|---|---|---|
| CN | 204889693 U | 12/2015 |
| CN | 205493593 U | 8/2016 |
| CN | 108577580 A | 9/2018 |
| CN | 209058897 U | 7/2019 |
| CN | 112754319 A | 5/2021 |
| CN | 112842100 A | 5/2021 |
| CN | 213129206 U | 5/2021 |
| CN | 113243777 A | 8/2021 |
| CN | 215016306 U | 12/2021 |
| CN | 215605076 U | 1/2022 |
| CN | 114246491 A | 3/2022 |
| CN | 216724257 U | 6/2022 |
| CN | 114766922 A | 7/2022 |
| CN | 217792631 U | 11/2022 |
| CN | 217852524 U | 11/2022 |
| CN | 218009408 U | 12/2022 |
| CN | 218164978 U | 12/2022 |
| CN | 219088975 U | 5/2023 |
| CN | 116616624 A | 8/2023 |
| CN | 219645559 U | 9/2023 |
| CN | 219720488 U | 9/2023 |
| CN | 117100126 A | 11/2023 |
| CN | 116509212 B | 12/2023 |
| CN | 221931819 U | 11/2024 |

OTHER PUBLICATIONS

"Insights, Does Putting Lids on Posts Really Cook Food Faster?", Retrieved on Jan. 30, 2024. Retrieved from the Internet: URL:<https://www.entergynewsroom.com/article/does-putting-lids-on-pots-really-cook-food-faster/#:~:text=When%20you%20cook%20food%2C%20the,heat%20stays%20in%20the%20pot>, Nov. 24, 2021, 5 Pages.

* cited by examiner

COOKING DEVICES AND COMPONENTS THEREOF

CROSS-REFERENCE TO RELATED APPLICATIONS

The present application is a continuation application of International Application No. PCT/US24/40545, filed Aug. 1, 2024, and entitled "COOKING DEVICES AND COMPONENTS THEREOF," which claims priority under 35 U.S.C. § 119(e) to U.S. Provisional Patent Application No. 63/516,980 titled "COOKING DEVICES, METHODS, AND COMPONENTS THEREOF", filed on Aug. 1, 2023, U.S. Provisional Patent Application No. 63/616,182 titled "COOKING DEVICES AND COMPONENTS THEREOF", filed on Dec. 29, 2023, and U.S. Provisional Patent Application No. 63/670,400 titled "COOKING DEVICES, METHODS, AND COMPONENTS THEREOF", filed on Jul. 12, 2024, the entire contents of which are hereby expressly incorporated by reference herein.

FIELD

A countertop cooking system including one or more heating and air movement elements, a cooking chamber, and one or more thermal protection elements, are provided.

BACKGROUND

An air fryer is a kitchen appliance that cooks by rapidly circulating hot air around food within a basket positioned in a cooking chamber. Some air fryers may come with adjustable temperature and timer knobs that allow for more precise cooking. Typically, heat is created by a heating coil and a mechanical fan circulates the hot air around the food at high speed. This cooking method produces a crispy layer on the food thanks to Maillard reactions. By creating and circulating heated air at temperatures, the air fryer is able to fry foods like potato chips, chicken, fish, pastries and more using much less oil than a traditional deep-fryer. Various brands of air fryers claim to use as much as 80% less cooking oil in comparison to traditional deep-fryers.

SUMMARY

In some aspects, the techniques described herein relate to a cooking system, including: a cooking device, including: a housing having a cavity extending upward from a bottom surface; a heating element positioned within the cavity; and an air movement device configured to direct air over the heating element and from the cavity; and a vessel having a cavity therein and a upper surface defining an opening, wherein the cooking device is configured to be removably positioned over the vessel such that the bottom surface aligns with the upper surface, creating a cooking chamber within the cavity to perform a cooking operation.

In some aspects, the techniques described herein relate to a cooking system, wherein the cooking device seals to the vessel via the bottom surface and the upper surface.

In some aspects, the techniques described herein relate to a cooking system, wherein the housing of the cooking device has a cross-sectional shape identical to a cross-sectional shape of the vessel.

In some aspects, the techniques described herein relate to a cooking system, wherein an extender plate is positioned between the bottom surface and the upper surface.

In some aspects, the techniques described herein relate to a cooking system, wherein a crisper plate is positioned within the vessel.

In some aspects, the techniques described herein relate to a cooking system, wherein the cooking device is configured to be vertically removed from the vessel to access the cooking chamber.

In some aspects, the techniques described herein relate to a cooking system, wherein a storage lid is configured to be removably positioned over the vessel to seal the cavity of the vessel.

In some aspects, the techniques described herein relate to a cooking system, including: a vessel, including: a cavity configured to receive a food product therein; an opening positioned in a wall of the vessel and configured for accessing the cavity; and a contacting surface positioned about the opening; a cooking device, including: a housing having an outlet therein; a heating element; and an air movement device configured to direct air over the heating element to create a heated airflow, wherein the cooking device is configured to selectively abut the contacting surface of the vessel, and the heated airflow is directed out of the outlet and into the cavity of the vessel; and a lid configured to selectively abut the contacting surface of the vessel and connect to the vessel.

In some aspects, the techniques described herein relate to a cooking system, wherein the lid is subsequently positioned on the vessel after the cooking device is positioned on the vessel for a cooking process.

In some aspects, the techniques described herein relate to a cooking system, wherein the lid includes a seal configured to abut the contacting surface of the vessel when the lid is positioned on the vessel.

In some aspects, the techniques described herein relate to a cooking system, wherein the lid includes a clamping member configured to positively mechanically connect the lid to the vessel.

In some aspects, the techniques described herein relate to a cooking system, wherein a crisper tray is configured to be positioned within the cavity of the vessel.

In some aspects, the techniques described herein relate to a cooking system, wherein the vessel includes a base positioned on a bottom surface of the vessel.

In some aspects, the techniques described herein relate to a cooking system, including: a cooking device, including: a housing having a first outlet and a second outlet therein; a heating element; and an air movement device configured to direct air over the heating element to create a heated airflow, wherein the heated airflow is directed out of the first outlet, and configured to produce a cooling airflow which is isolated from the heated airflow within the housing, wherein the cooling airflow is directed out of the second outlet; an adaptor housing removably attached to the cooking device and positioned adjacent the first outlet, the adaptor housing including a first inlet and a first channel extending therefrom, and a second inlet and a second channel extending therefrom, wherein the heated airflow passes into the first inlet from the first outlet and through the first channel, and the cooling airflow passes into the second inlet from the second outlet and through the second channel; a vessel, including: a cavity configured to receive a food product therein; an opening positioned in a wall of the vessel and configured for accessing the cavity, wherein the heated airflow passes from the first channel and through the opening into the cavity, and the cooling airflow passes over the wall of the vessel outside of the cavity.

In some aspects, the techniques described herein relate to a cooking system, wherein the second outlet at least partially surrounds the first outlet.

In some aspects, the techniques described herein relate to a cooking system, wherein the second channel at least partially surrounds the first channel.

In some aspects, the techniques described herein relate to a cooking system, wherein the heated airflow in the first channel is isolated from the cooling airflow in the second channel.

In some aspects, the techniques described herein relate to a cooking system, wherein the second channel is formed within the adaptor housing between an outer shell and a body of the adaptor housing, wherein the body is positioned within the outer shell.

In some aspects, the techniques described herein relate to a cooking system, wherein at least a portion of the first channel is radially outward of the first outlet.

In some aspects, the techniques described herein relate to a cooking system, wherein at least a portion of the second channel is radially outward of the second outlet.

In some aspects, the techniques described herein relate to a cooking system, including: a heat generating device including a housing and having an outlet therein, the heat generating device configured to generate a heated airflow from the housing through the outlet; a vessel including a cavity therein, the vessel configured to receive the heated airflow within the cavity; a base configured to abut the vessel and rest on a support surface, the base including an insulating body configured to reduce heat transfer from the vessel to the support surface while the vessel receives the heated airflow.

In some aspects, the techniques described herein relate to a cooking system, wherein a gap is positioned between a bottom surface of the vessel and a top surface of the insulating body.

In some aspects, the techniques described herein relate to a cooking system, wherein a gap is positioned between a bottom surface of the base and the support surface.

In some aspects, the techniques described herein relate to a cooking system, wherein the insulating body is positioned between the support surface and the bottom surface of the vessel.

In some aspects, the techniques described herein relate to a cooking system, wherein the insulating body is formed from a non-conductive material.

In some aspects, the techniques described herein relate to a cooking system, wherein the base is formed from a non-conductive material.

In some aspects, the techniques described herein relate to a cooking system, including: a cooking device, including: a housing having a cavity extending upward from a bottom surface; a heating element positioned within the cavity; and an air movement device configured to direct air over the heating element and from the cavity; a first vessel having a first cavity therein and a first opening; a second vessel having a second cavity therein and a second opening, wherein the cooking device is configured to removably cover the first opening and the second opening one at a time.

In some aspects, the techniques described herein relate to a cooking system, wherein a first lid is configured to cover the first opening after removal of the cooking device from the first opening.

In some aspects, the techniques described herein relate to a cooking system, wherein a second lid is configured to cover the second opening after removal of the cooking device from the second opening.

In some aspects, the techniques described herein relate to a cooking system, wherein the first opening and the second opening have identical cross-sectional shapes.

In some aspects, the techniques described herein relate to a cooking system, wherein the first vessel includes a first volume and the second vessel includes a second volume, the first volume being smaller than the second volume.

In some aspects, the techniques described herein relate to a cooking system, including: a cooking device, including: a housing having a cavity extending upward from a bottom surface; a heating element positioned within the cavity; and an air movement device configured to direct air over the heating element and from the cavity; at least one leg protruding from the bottom surface, wherein the at least one leg is configured to contact a mounting surface; and a vessel having a cavity therein and a contacting surface, wherein the cooking device is configured to removably contact the contacting surface.

In some aspects, the techniques described herein relate to a cooking system, wherein the cooking device includes four legs.

In some aspects, the techniques described herein relate to a cooking system wherein two of the legs extend from a first side of the cooking device and two of the legs extend from a second side of the cooking device.

In some aspects, the techniques described herein relate to a cooking system, wherein the at least one leg includes a trapezoidal shape.

In some aspects, the techniques described herein relate to a cooking system, wherein the at least one leg includes a length between about 0.5 inches and about 1.5 inches.

In some aspects, the techniques described herein relate to a cooking system, including: a cooking device, including: a housing having a cavity extending upward from a bottom surface; a heating element positioned within the cavity; an air movement device configured to direct air over the heating element and from the cavity; and at least one microswitch including at least one plunger, wherein the at least one microswitch is coupled to the bottom surface; and a vessel having a cavity therein and a contacting surface, wherein the cooking device is configured to be removably positioned over the vessel such that the contacting surface depresses the at least one plunger.

In some aspects, the techniques described herein relate to a cooking system, wherein the cooking device includes a first microswitch and a second microswitch.

In some aspects, the techniques described herein relate to a cooking system, wherein the first microswitch is positioned on a first end of the bottom surface and the second microswitch is positioned on a second end of the bottom surface.

In some aspects, the techniques described herein relate to a cooking system, wherein a third microswitch is positioned between the first microswitch and the second microswitch on the bottom surface.

In some aspects, the techniques described herein relate to a cooking system, further including a controller, wherein the controller is configured to compare the positions of the first microswitch, the second microswitch, and the third microswitch to determine activation of a first cooking mode or a second cooking mode.

In some aspects, the techniques described herein relate to a cooking system, wherein in a first cooking mode, the first microswitch, the second microswitch, and the third microswitch are in a retracted position, and in a second cooking mode, the first microswitch and the second microswitch are in the retracted position, and the third microswitch is in an extended position.

In some aspects, the techniques described herein relate to a cooking system, wherein the cooking device is configured to calibrate the heating element based on the determination of the first cooking mode or the second cooking mode.

In some aspects, the techniques described herein relate to a cooking system, including: a cooking device, including: a housing having a cavity extending upward from a bottom surface; a heating element positioned within the cavity; and an air movement device configured to direct air over the heating element and from the cavity; a vessel having a cavity therein and a contacting surface; a crisper tray having an aperture therein and configured to be positioned within the cavity; and a lid, including: a top surface; a bottom surface; and a projection extending from the bottom surface, wherein the projection is configured to correspond with the aperture positioned within the crisper tray in order to retain the crisper tray adjacent to the bottom surface.

In some aspects, the techniques described herein relate to a cooking system, wherein the projection is a circular projection with a corresponding cross-sectional shape to a cross-sectional shape of the aperture.

In some aspects, the techniques described herein relate to a cooking system, wherein the projection further includes radial projections extending radially outward.

In some aspects, the techniques described herein relate to a cooking system, wherein an outer diameter formed by the radial projections is greater than a diameter of the aperture.

In some aspects, the techniques described herein relate to a cooking system, wherein the radial projections are flexible.

In some aspects, the techniques described herein relate to a cooking system, wherein the projection is positioned in a center of the bottom surface.

In some aspects, the techniques described herein relate to a cooking system, including: a cooking device, including: a housing having a cavity extending upward from a bottom surface; a heating element positioned within the cavity; and an air movement device configured to direct air over the heating element and from the cavity; a vessel having a cavity therein and a contacting surface; a crisper tray having an aperture therein and configured to be positioned within the cavity; and a lid, including: a center body having an outer edge portion and a center portion; a clamping member positioned in the outer edge portion, wherein the clamping member is connected to the center portion via a living hinge; and a projection positioned on a lateral side of the clamping member, wherein the projection is configured to abut the outer edge portion when the clamping member is in a closed position.

In some aspects, the techniques described herein relate to a cooking system, wherein the projection extends across a gap formed between the clamping member and the outer edge portion.

In some aspects, the techniques described herein relate to a cooking system, wherein a second projection is positioned on a second lateral side of the clamping member, the second lateral side opposite the lateral side.

In some aspects, the techniques described herein relate to a cooking system, wherein the vessel further includes a channel positioned under the contacting surface.

In some aspects, the techniques described herein relate to a cooking system, wherein the clamping member further includes a bent section configured to be positioned within the channel when the clamping member is in a closed position.

In some aspects, the techniques described herein relate to a cooking system, wherein the lid includes a seal positioned radially inward of the clamping member, and is configured to abut the contacting surface of the vessel when the lid is positioned on the vessel.

In some aspects, the techniques described herein relate to a cooking system, including: a cooking device, including: a housing having a cavity extending upward from a bottom surface; a heating element positioned within the cavity; and an air movement device configured to direct air over the heating element and from the cavity; a vessel having a cavity therein, a contacting surface, and a sidewall having a first indent and a first dedent positioned thereon, wherein the cooking device is configured to removably contact the contacting surface; a base positioned vertically underneath the vessel; and a connector plate extending from the base and including a second indent and a second dedent.

In some aspects, the techniques described herein relate to a cooking system, wherein the base further includes: a first support arm extending from the base; a second support arm extending from the base; and a handlebar positioned between the first support arm and the second support arm, wherein the connector plate is positioned between the first support arm, the second support arm, and the handlebar.

In some aspects, the techniques described herein relate to a cooking system, wherein a gap is positioned between the connector plate and the first support arm, the second support arm, and the handlebar, the gap being a thermal break between the connector plate and the handlebar.

In some aspects, the techniques described herein relate to a cooking system, wherein the first support arm, the second support arm, and the handlebar can move relative to the connector plate.

In some aspects, the techniques described herein relate to a cooking system, wherein the first dedent is received within the second indent, and the second dedent is received within the first indent when the base is connected to the vessel.

In some aspects, the techniques described herein relate to a cooking system, wherein a bottom surface of the vessel is spaced from a top surface of the base by a gap.

In some aspects, the techniques described herein relate to a cooking system, wherein the base further includes a support foot extending downward from a bottom surface of the base, wherein a gap is formed between the bottom surface of the base and a cooking surface the base is resting upon.

In some aspects, the techniques described herein relate to a cooking system, wherein the connector plate is flexible.

In some aspects, the techniques described herein relate to a cooking system, wherein the vessel further includes a third indent and a third dedent positioned on an opposite side of the sidewall relative to the first indent and the first dedent.

In some aspects, the techniques described herein relate to a cooking system, wherein the base further includes a second connector plate extending from the base and including a fourth indent and a fourth dedent.

In some aspects, the techniques described herein relate to a cooking system, wherein the third dedent is received within the fourth indent, and the fourth dedent is received within the third indent when the base is connected to the vessel.

In some aspects, the techniques described herein relate to a cooking system, including: a cooking device, including: a housing having a cavity extending upward from a bottom surface; a heating element positioned within the cavity; and an air movement device including a first fan configured to direct air over the heating element and from the cavity to generate a heated airflow, and a second fan positioned within the housing and configured to direct air to outlets positioned on the bottom surface of the housing to generate a cooling air flow; a vessel having a cavity therein, a contacting surface, and a sidewall, wherein the cooking device is configured to removably contact the contacting surface; and a base positioned vertically underneath the vessel and configured to be removably positioned on the vessel, the base including: a first support arm extending from the base; a second support arm extending from the base; and a handlebar positioned between the first support arm and the second support arm.

In some aspects, the techniques described herein relate to a cooking system, wherein the handlebar is positioned vertically below the cooking device.

In some aspects, the techniques described herein relate to a cooking system, wherein the base abuts a bottom surface of the vessel.

In some aspects, the techniques described herein relate to a cooking system, wherein a gap is positioned between the handlebar and the sidewall of the vessel.

In some aspects, the techniques described herein relate to a cooking system, wherein the handlebar extends radially outward from the vessel.

In some aspects, the techniques described herein relate to a cooking system, including: a cooking device, including: a housing having a cavity extending upward from a bottom surface; a heating element positioned within the cavity; an air movement device configured to direct air over the heating element and from the cavity; and at least one microswitch including at least one plunger, wherein the at least one microswitch is coupled to the bottom surface; an adapter housing, including: an outer shell including a first portion having first cross-sectional area, and a second portion having a second cross-sectional area, wherein the first cross-sectional area is smaller than the second cross-sectional area; and a body positioned within the outer shell, the body having a top surface and a bottom surface; and a vessel having a cavity therein and a contacting surface, wherein the adaptor housing is configured to be removably positioned over the vessel such that bottom surface of the body contacts the contacting surface of the vessel, and the top surface of the body depresses the at least one plunger.

In some aspects, the techniques described herein relate to a cooking system, wherein the cooking device includes a first microswitch and a second microswitch.

In some aspects, the techniques described herein relate to a cooking system, wherein the first microswitch is positioned on a first end of the bottom surface and the second microswitch is positioned on a second end of the bottom surface.

In some aspects, the techniques described herein relate to a cooking system, wherein the top surface of the body is configured to depress the first microswitch and the second microswitch when the adapter housing is positioned between the vessel and the cooking device.

In some aspects, the techniques described herein relate to a cooking system, wherein a third microswitch is positioned between the first microswitch and the second microswitch on the bottom surface.

In some aspects, the techniques described herein relate to a cooking system, wherein the body includes an aperture therein, the aperture configured to allow the third microswitch to pass through the body without being depressed.

In some aspects, the techniques described herein relate to a cooking system, wherein the body can move relative to the outer shell in the vertical direction.

In some aspects, the techniques described herein relate to a cooking system, wherein the body is connected to the outer shell via springs.

In some aspects, the techniques described herein relate to a cooking system, wherein the first portion of the outer shell contacts the cooking device, and the second portion of the outer shell contacts the vessel.

In some aspects, the techniques described herein relate to a cooking system, wherein the adapter housing is releasably connected to the housing of the cooking device.

In some aspects, the techniques described herein relate to a cooking device, wherein the adapter housing includes a flexible portion having a projection configured to releasably engage the housing of the cooking device.

In some aspects, the techniques described herein relate to a cooking system, including: a cooking device, including: a housing having a cavity extending upward from a bottom surface; a heating element positioned within the cavity; and an air movement device configured to direct air over the heating element and from the cavity; a first vessel having a first cavity therein having a first volume and a first contacting surface defining a first opening having a first cross-sectional area; a second vessel having a second cavity therein having a second volume and a second contacting surface defining a second opening having a second cross-sectional area, wherein the cooking device is configured to removably cover the first opening and the second opening one at a time.

In some aspects, the techniques described herein relate to a cooking system, wherein the first volume is smaller than the second volume.

In some aspects, the techniques described herein relate to a cooking system, wherein the first cross-sectional area is identical to the second cross-sectional area.

In some aspects, the techniques described herein relate to a cooking system, wherein the first cross-sectional area is smaller than the second cross-sectional area.

In some aspects, the techniques described herein relate to a cooking system, the cooking device further including a first microswitch and a second microswitch positioned on the bottom surface of the housing.

In some aspects, the techniques described herein relate to a cooking system, wherein the first vessel depresses the first microswitch and the second microswitch when the cooking device is placed on the first vessel.

In some aspects, the techniques described herein relate to a cooking system, wherein the second vessel depresses only the first microswitch when the cooking device is placed on the first vessel.

In some aspects, the techniques described herein relate to a cooking system, further including an adapter housing configured to be positioned between the cooking device and the second vessel only.

In some aspects, the techniques described herein relate to a cooking system, including: a cooking device, including: a housing having a first cavity extending upward from a bottom surface, and a second cavity positioned vertically above the first cavity within the housing; a heating element positioned within the first cavity; and an air movement device including a first fan configured to direct air over the heating element and from the first cavity to generate a heated airflow, and a second fan positioned within the second cavity and configured to direct air through the second cavity to outlets positioned on the bottom surface of the housing to generate a cooling air flow; a vessel having a cavity therein, a contacting surface, and a sidewall, wherein the cooking device is configured to removably contact the contacting surface; and a base positioned vertically underneath the vessel and configured to be removably positioned on the vessel, the base including: a first support arm extending from the base; a second support arm extending from the base; and a handlebar positioned between the first support arm and the second support arm, wherein the outlets are configured to direct the cooling airflow over the sidewall of the vessel.

In some aspects, the techniques described herein relate to a cooking system, wherein the outlets are positioned on an outer perimeter of the housing, and are radially outward of the contacting surface of the vessel.

In some aspects, the techniques described herein relate to a cooking system, wherein the outlets are configured to direct the cooling airflow away from the handlebar.

In some aspects, the techniques described herein relate to a cooking system, wherein the base further includes: a third support arm extending from the base; a fourth support arm extending from the base; and a second handlebar positioned between the third support arm and the fourth support arm.

In some aspects, the techniques described herein relate to a cooking system, wherein the outlets are configured to direct the cooling airflow away from the second handlebar.

In some aspects, the techniques described herein relate to a cooking system, wherein the outlets direct cooling air along the sidewall between the handlebar and the second handlebar.

In some aspects, the techniques described herein relate to a cooking device, including: a housing including an upper portion and a lower portion; a heating element positioned in the lower portion; an air movement device positioned in the lower portion; a user interface positioned on the upper portion, the user interface configured to control operation of at least one of the heating element and the air movement device; a handle configured for lifting the cooking device positioned on an exterior surface of the upper portion of the housing, wherein the handle at least partially surrounds the upper portion of the housing.

In some aspects, the techniques described herein relate to a cooking device, wherein the handle is formed as a channel within the upper portion of the housing.

In some aspects, the techniques described herein relate to a cooking device, wherein the user interface is on a top surface of the housing.

In some aspects, the techniques described herein relate to a cooking device, wherein a motor of rotating the air movement device is positioned in the upper portion of the housing.

In some aspects, the techniques described herein relate to a cooking device, wherein the upper portion includes a cross-sectional area which is smaller than a cross-sectional area of the lower portion.

In some aspects, the techniques described herein relate to a cooking device, wherein the upper portion includes a circular cross-section and the lower portion includes a square cross-section.

In some aspects, the techniques described herein relate to a cooking device, including: a housing having a cavity extending upward from a bottom surface and on outlet positioned on the bottom surface; a heating element positioned within the cavity; and an air movement device configured to create a heated air flow by directing air over the heating element and through the outlet; at least one leg protruding from the bottom surface, wherein the at least one leg is configured to contact a support surface to create an insulating air gap between the outlet and the support surface such that a heat transfer to the support surface from the heating element is reduced.

In some aspects, the techniques described herein relate to a cooking device, wherein the at least one leg includes a first leg, a second, leg, a third leg, and a fourth leg each positioned at a corner of the housing.

In some aspects, the techniques described herein relate to a cooking device, wherein the first leg, the second, leg, the third leg, and the fourth leg are each identical in length.

In some aspects, the techniques described herein relate to a cooking device, wherein the at least one leg is formed from a non-conductive material.

In some aspects, the techniques described herein relate to a cooking device, wherein the at least one leg tapers away from the bottom surface of the housing.

In some aspects, the techniques described herein relate to a cooking device, including: an outer shell having an inlet, a first outlet, and a second outlet therein; an inner shell positioned radially inward of the outer shell; a channel positioned between the outer shell and the inner shell; a heating element positioned radially inward of the inner shell; and an air movement device positioned radially inward of the inner shell and configured to direct air over the heating element to create a heated airflow, wherein the heated airflow is configured to be directed out of the first outlet into an enclosed volume, and to produce a cooling airflow within the channel, wherein the cooling airflow is configured to be directed out of the second outlet to an open environment.

In some aspects, the techniques described herein relate to a cooking device, wherein the cooling air flow is isolated from the heated airflow within the housing.

In some aspects, the techniques described herein relate to a cooking device, wherein the inlet is positioned on a top portion of the housing and is fluidly connected to the channel.

In some aspects, the techniques described herein relate to a cooking device, wherein the first outlet and the second outlet are positioned on a bottom surface of the housing.

In some aspects, the techniques described herein relate to a cooking device, wherein a third outlet is positioned on a sidewall of the housing.

In some aspects, the techniques described herein relate to a cooking device, wherein the second outlet is radially outward of the first outlet.

In some aspects, the techniques described herein relate to a cooking device, including: a housing having a cavity extending upward from a bottom surface; a heating element positioned within the cavity; an air movement device configured to direct air over the heating element and from the cavity; and a sensor, wherein the sensor is positioned on the bottom surface, wherein the sensor is configured to receive an input related to a type of vessel when the housing is positioned on a cooking vessel along the bottom surface.

In some aspects, the techniques described herein relate to a cooking device, wherein the sensor is a plurality of microswitches.

In some aspects, the techniques described herein relate to a cooking device, wherein all of the microswitches of the plurality of microswitches are engaged when the housing is placed on a first cooking vessel, and at least one microswitch of the plurality of microswitches is unengaged when the housing is placed on a second cooking vessel.

In some aspects, the techniques described herein relate to a cooking device, wherein a portion of the sensor extends outward from the bottom surface of the housing.

In some aspects, the techniques described herein relate to a cooking device, including: a housing having bottom surface, a first exterior surface, and a second exterior surface; a heating element positioned within the housing; and an air movement device positioned within the housing and configured to direct air over the heating element to create a heated airflow; a first engagement member positioned on the first exterior surface; and a second engagement member positioned on the second exterior surface; wherein the first engagement member and the second engagement member are configured to contact corresponding engagement members of an adaptor housing removably attached to the housing along the bottom surface.

In some aspects, the techniques described herein relate to a cooking device, wherein the first exterior surface is on an opposite side of the housing compared to the second exterior surface.

In some aspects, the techniques described herein relate to a cooking device, wherein the first engagement member is a projection extending outward from the housing.

In some aspects, the techniques described herein relate to a cooking device, wherein second engagement member is a projection extending outward from the housing.

In some aspects, the techniques described herein relate to a cooking device, wherein the first engagement member forms a portion of the bottom surface.

In some aspects, the techniques described herein relate to a vessel assembly, including: a vessel including an opening and a cavity therein, the vessel configured to receive a heated airflow through the opening and into the cavity from a cooking device covering the opening; a base positioned on a bottom surface of the vessel and configured to rest on a support surface, the base including an insulating body configured to protect the support surface from heat radiating from the vessel due to the heated airflow.

In some aspects, the techniques described herein relate to a vessel assembly, wherein a gap is positioned between the bottom surface of the vessel and a top surface of the insulating body.

In some aspects, the techniques described herein relate to a vessel assembly, wherein a gap is positioned between a bottom surface of the base and the support surface.

In some aspects, the techniques described herein relate to a vessel assembly, wherein the insulating body is positioned between the support surface and the bottom surface of the vessel.

In some aspects, the techniques described herein relate to a vessel assembly, wherein the insulating body is formed from a non-conductive material.

In some aspects, the techniques described herein relate to a vessel assembly, wherein the insulating body includes at least one leg extending downward from a bottom surface of the insulating body, and at least one projection extending upward from a top surface of the insulating body.

In some aspects, the techniques described herein relate to a vessel assembly, including: a vessel, including: a cavity configured to receive a food product therein; an opening positioned in a wall of the vessel and configured for accessing the cavity; a base configured to abut the vessel and rest on a support surface, the base including: a connector plate extending from the base and configured to connect to a sidewall of the vessel; a support arm extending from the base; a handlebar positioned on the support arm and configured to be contacted by a user; and a gap positioned between the connector plate and the support arm, the gap configured to be a thermal break between the connector plate and the handlebar.

In some aspects, the techniques described herein relate to a vessel assembly, wherein the support arm and handlebar are offset from the wall of the vessel.

In some aspects, the techniques described herein relate to a vessel assembly, wherein the connector plate connects to the base along a bottom edge.

In some aspects, the techniques described herein relate to a vessel assembly, wherein the base is formed from a non-conductive material.

In some aspects, the techniques described herein relate to a vessel assembly, wherein heat energy transferred to the connector plate subsequently passes through the base prior to passing into the support arm.

In some aspects, the techniques described herein relate to a vessel assembly, wherein an insulating air gap is formed between the wall of the vessel and the handlebar.

In some aspects, the techniques described herein relate to a vessel assembly, wherein a second thermal break is positioned between a portion of the handlebar and the support arm.

In some aspects, the techniques described herein relate to a vessel assembly, including: a vessel having a cavity therein and a sidewall having a first indent and a first dedent positioned thereon; a base positioned below a bottom surface of the vessel; and a connector plate extending from the base and including a second indent and a second dedent, wherein the first dedent is received within the second indent, and the second dedent is received within the first indent when the base is connected to the vessel.

In some aspects, the techniques described herein relate to a vessel assembly, wherein the connector plate is flexible.

In some aspects, the techniques described herein relate to a vessel assembly, wherein the vessel further includes a third indent and a third dedent positioned on an opposite side of the sidewall relative to the first indent and the first dedent.

In some aspects, the techniques described herein relate to a vessel assembly, wherein the base further includes a second connector plate extending from the base and including a fourth indent and a fourth dedent.

In some aspects, the techniques described herein relate to a vessel assembly, wherein the third dedent is received within the fourth indent, and the fourth dedent is received within the third indent when the base is connected to the vessel.

In some aspects, the techniques described herein relate to a vessel assembly, wherein the first connector plate and the second connector plate connect to the base along a bottom edge, respectively.

In some aspects, the techniques described herein relate to a vessel assembly, including: a vessel including a cavity therein and a contacting surface defining an opening configured to allow access to the cavity; a crisper tray having an aperture therein and configured to be positioned within the cavity; and a lid, including: a top surface; a bottom surface; and a projection extending from the bottom surface, wherein the projection is configured to correspond with the aperture positioned within the crisper tray in order to retain the crisper tray adjacent to the bottom surface.

In some aspects, the techniques described herein relate to a vessel assembly, wherein the projection is a circular projection with a corresponding cross-sectional shape to a cross-sectional shape of the aperture.

In some aspects, the techniques described herein relate to a vessel assembly, wherein the projection further includes radial projections extending radially outward.

In some aspects, the techniques described herein relate to a vessel assembly, wherein an outer diameter formed by the radial projections is greater than a diameter of the aperture.

In some aspects, the techniques described herein relate to a vessel assembly, wherein the radial projections are flexible.

In some aspects, the techniques described herein relate to a vessel assembly, wherein the projection is positioned in a center of the bottom surface.

In some aspects, the techniques described herein relate to a vessel assembly, including: a vessel including a cavity therein and a contacting surface defining an opening configured to allow access to the cavity; a lid, including: a center body having an outer edge portion and a center portion; a clamping member positioned in the outer edge portion, wherein the clamping member is connected to the center portion via a living hinge; and a projection positioned on a lateral side of the clamping member, wherein the projection is configured to abut the outer edge portion when the clamping member is in a closed position.

In some aspects, the techniques described herein relate to a vessel assembly, wherein the projection extends across a gap formed between the clamping member and the outer edge portion.

In some aspects, the techniques described herein relate to a vessel assembly, wherein a second projection is positioned on a second lateral side of the clamping member, the second lateral side opposite the lateral side.

In some aspects, the techniques described herein relate to a vessel assembly, wherein the vessel further includes a channel positioned under the contacting surface.

In some aspects, the techniques described herein relate to a vessel assembly, wherein the clamping member further includes a bent section configured to be positioned within the channel when the clamping member is in a closed position.

In some aspects, the techniques described herein relate to a vessel assembly, wherein the lid includes a seal positioned radially inward of the clamping member, and is configured to abut the contacting surface of the vessel when the lid is positioned on the vessel.

In some aspects, the techniques described herein relate to a base, including: a connector plate extending from the base having an engagement member thereon; a support arm extending from the base adjacent the connector plate; a handlebar positioned on the support arm and configured to be contacted by a user; and a gap positioned between the connector plate and the support arm, the gap configured to be a thermal break between the connector plate and the handlebar.

In some aspects, the techniques described herein relate to a base, wherein the connector plate connects to the base along a bottom edge.

In some aspects, the techniques described herein relate to a base, wherein the support arm encompasses the connector plate.

In some aspects, the techniques described herein relate to a base, wherein heat energy transferred to the connector plate subsequently passes through the base prior to passing into the support arm.

In some aspects, the techniques described herein relate to a base, wherein a second thermal break is positioned between a portion of the handlebar and the support arm.

In some aspects, the techniques described herein relate to a base, including: an insulating body having a top surface and a bottom surface; a projection extending upward from the top surface and configured to contact a vessel positioned on the base, forming a first gap having a first height; and a leg extending downward from the bottom surface and configured to contact a support surface, forming a second gap having a second height, wherein the ratio of the second height to the first height is within the range of 2.3:1 to 2.7:1.

In some aspects, the techniques described herein relate to a base, wherein the first height is within a range of 5.0 millimeters to 6.0 millimeters.

In some aspects, the techniques described herein relate to a base, wherein the second height is within a range of 13.5 millimeters to 14.5 millimeters.

In some aspects, the techniques described herein relate to a base, wherein the ratio of the second height to the first height is 2.5:1.

In some aspects, the techniques described herein relate to a base, wherein the first gap thermally insulates the base from the vessel positioned thereon.

In some aspects, the techniques described herein relate to a base, wherein the second gap thermally insulates the support surface from the base.

In some aspects, the techniques described herein relate to an adaptor housing, including: an outer shell; a body positioned within the outer shell, the body having a top surface and a bottom surface; and at least one biasing member configured to connect the outer shell to the body such that the body can move relative to the outer shell; wherein the adaptor housing is configured to be selectively connected to a cooking device and removably positioned over a vessel such that the bottom surface of the body contacts the vessel, and the top surface of the body interacts with a sensor of the cooking device to provide an input to the cooking device.

In some aspects, the techniques described herein relate to an adaptor housing, wherein the body is a radiation shield configured to absorb radiation generated by the cooking device.

In some aspects, the techniques described herein relate to an adaptor housing, wherein the sensor is a microswitch positioned within the cooking device.

In some aspects, the techniques described herein relate to an adaptor housing, wherein an air channel is positioned between the outer shell and the body and configured to direct a cooling airflow through the adaptor housing.

In some aspects, the techniques described herein relate to an adaptor housing, wherein the body includes an aperture positioned therein and configured to allow a portion of a second sensor to pass therethrough.

In some aspects, the techniques described herein relate to an adaptor housing, wherein the outer shell includes an engagement member configured to selectively connect the outer shell to the cooking device.

In some aspects, the techniques described herein relate to an adaptor housing, including: an outer shell; a body positioned within the outer shell, the body having a top surface and a bottom surface; a first inlet and a first channel extending therefrom positioned within the body; and a second inlet and a second channel extending therefrom positioned between the outer shell and the body, wherein a heated airflow passes into the first inlet and through the first channel, and a cooling airflow passes into the second inlet and through the second channel, wherein the heated airflow passes from the first channel and into a vessel, and the cooling airflow passes over an exterior wall of the vessel.

In some aspects, the techniques described herein relate to an adaptor housing, wherein the second channel at least partially surrounds the first channel.

In some aspects, the techniques described herein relate to an adaptor housing, wherein the heated airflow in the first channel is isolated from the cooling airflow in the second channel.

In some aspects, the techniques described herein relate to an adaptor housing, wherein the body can move relative to and within the outer housing.

In some aspects, the techniques described herein relate to an adaptor housing, wherein the second channel is radially outward of the first channel.

In some aspects, the techniques described herein relate to an adaptor housing, wherein the cooling airflow is directed away from a handle positioned on the vessel.

In some aspects, the techniques described herein relate to an adaptor housing, including: an outer shell having a bottom surface; a body positioned within the outer shell, the body configured to be moveable within and relative to the outer shell; and at least one leg protruding from the bottom surface, wherein the at least one leg is configured to contact a support surface to create an insulating air gap between the outlet and the support surface such that a heat transfer to the support surface from a cooking device connected to the outer shell is reduced.

In some aspects, the techniques described herein relate to an adaptor housing, wherein the at least one leg includes a first leg, a second, leg, a third leg, and a fourth leg each positioned at a corner of the outer shell.

In some aspects, the techniques described herein relate to an adaptor housing, wherein the first leg, the second, leg, the third leg, and the fourth leg are each identical in length.

In some aspects, the techniques described herein relate to an adaptor housing, wherein the at least one leg is formed from a non-conductive material.

In some aspects, the techniques described herein relate to an adaptor housing, wherein the at least one leg tapers away from the bottom surface of the outer shell.

In some aspects, the techniques described herein relate to an adaptor housing, wherein the at least one leg includes centering tabs positioned on an inner surface of the at least one leg.

In some aspects, the techniques described herein relate to an adaptor housing, including: an outer shell including a first exterior surface and a second exterior surface; a body positioned within the outer shell, the body configured to be moveable within and relative to the outer shell; a first engagement member positioned on the first exterior surface; and a second engagement member positioned on the second exterior surface; wherein the first engagement member and the second engagement member are configured to contact corresponding engagement members of a cooking device removably attached to the outer shell.

In some aspects, the techniques described herein relate to an adaptor housing, wherein the first exterior surface is on an opposite side of the outer shell compared to the second exterior surface.

In some aspects, the techniques described herein relate to an adaptor housing, wherein the first engagement member is a projection extending inward from the outer shell.

In some aspects, the techniques described herein relate to an adaptor housing, wherein second engagement member is a projection extending inward from the outer shell.

In some aspects, the techniques described herein relate to an adaptor housing, wherein the first engagement member is a flexible tab configured to be deformed to connect to and release from a corresponding engagement feature of the cooking device.

In some aspects, the techniques described herein relate to an adaptor housing, wherein the second engagement member is a spring-biased tab which can be displaced to release the adaptor plate from the cooking device.

In some aspects, the techniques described herein relate to a method, including: positioning a food product within a cavity of a vessel, the vessel having an opening configured for accessing the cavity; positioning a cooking device over the opening; generating, via the cooking device, a heated airflow into the cavity; removing the cooking device from the opening; and positioning a lid over the opening, wherein the lid seals the food product within the vessel.

In some aspects, the techniques described herein relate to a method, wherein the lid includes a clamping member configured to positively mechanically connect the lid to the vessel.

In some aspects, the techniques described herein relate to a method, wherein the lid includes a seal configured to abut the vessel when the lid is positioned on the vessel.

In some aspects, the techniques described herein relate to a method, wherein the vessel includes a base positioned on a bottom surface of the vessel.

In some aspects, the techniques described herein relate to a method, wherein positioning the cooking device over the opening includes vertically positioning the cooking device over the vessel.

In some aspects, the techniques described herein relate to a method, wherein removing the cooking device from the opening including vertically lifting the cooking device off of the vessel.

In some aspects, the techniques described herein relate to a method, wherein a crisper tray is configured to be positioned within the cavity of the vessel.

In some aspects, the techniques described herein relate to a method, including: positioning an adaptor housing on a cooking device, the adaptor including an inlet and an outlet configured to receive and discharge a heated airflow from the cooking device; positioning the outlet of the adaptor housing over an opening of a vessel, the opening configured for accessing a cavity therein; displacing a moveable body positioned within the adaptor housing via contact with the vessel; contacting a sensor positioned within the cooking device with the moveable body to generate an input to a control system of the cooking device; and generating, via the cooking device, a heated airflow into the cavity based on the input.

In some aspects, the techniques described herein relate to a method, wherein the moveable body is a radiation shield configured to absorb radiation produced by the cooking device.

In some aspects, the techniques described herein relate to a method, wherein the sensor is a microswitch extending from a bottom surface of the cooking device.

In some aspects, the techniques described herein relate to a method, wherein the adaptor housing is selectively removable from the cooking device.

In some aspects, the techniques described herein relate to a method, wherein the adaptor housing includes an engagement member configured to selectively connect the adaptor housing to the cooking device.

In some aspects, the techniques described herein relate to a method, including: positioning a food product onto a crisper tray within a cavity of a vessel, the vessel having an opening configured for accessing the cavity; positioning a cooking device over the opening; generating, via the cooking device, a heated airflow into the cavity; removing the cooking device from the opening; removing the crisper tray from the cavity; positioning a projection extending from a bottom surface of a lid through an aperture within the crisper tray to retain the crisper tray to the bottom surface of the lid;

and positioning the lid over the opening, wherein the lid seals the food product within the vessel.

In some aspects, the techniques described herein relate to a method, wherein the projection is a circular projection with a corresponding cross-sectional shape to a cross-sectional shape of the aperture.

In some aspects, the techniques described herein relate to a method, wherein the projection further includes radial projections extending radially outward.

In some aspects, the techniques described herein relate to a method, wherein an outer diameter formed by the radial projections is greater than a diameter of the aperture.

In some aspects, the techniques described herein relate to a method, wherein the radial projections are flexible.

In some aspects, the techniques described herein relate to a method, wherein the projection is positioned in a center of the bottom surface.

In some aspects, the techniques described herein relate to a method, including: positioning a lid over an opening of a vessel having a cavity therein and an overhanging lip; displacing a clamping member positioned on the lid to position a portion of the clamping member underneath the overhanging lip; displacing a projection positioned on a lateral side of the clamping member from a first side of the lid to a second side of the lid to abut against the second side of the lid, securing the clamping member in a closed position, wherein when the clamping member is in a closed position, the lid is positively mechanically connected to the vessel.

In some aspects, the techniques described herein relate to a method, wherein the projection extends across a gap formed between the clamping member and the outer edge portion.

In some aspects, the techniques described herein relate to a method, wherein a second projection is positioned on a second lateral side of the clamping member, the second lateral side opposite the lateral side.

In some aspects, the techniques described herein relate to a method, wherein the vessel further includes a channel positioned under the overhanging lip.

In some aspects, the techniques described herein relate to a method, wherein the clamping member further includes a bent section configured to be positioned within the channel when the clamping member is in the closed position.

In some aspects, the techniques described herein relate to a method, wherein the lid includes a seal positioned radially inward of the clamping member, and is configured to abut the vessel when the lid is positioned on the vessel.

In some aspects, the techniques described herein relate to a method, including: positioning a vessel having a first sidewall, a second sidewall, and a cavity therein onto a base, the base having a first connector plate and a second connector plate; positioning a first dedent of the base in a first indent on the first sidewall of the vessel; positioning a second dedent of the base in a second dedent on the second sidewall of the vessel; positioning a third dedent of the vessel in a third indent on the first connector plate of the base; and positioning a fourth dedent of the vessel in a fourth indent on the second connector plate of the base.

In some aspects, the techniques described herein relate to a method, wherein the first connector plate and the second connector plate are positioned on opposite sides of the base.

In some aspects, the techniques described herein relate to a method, wherein the first connector plate and the second connector plate are flexible and moveable relative to the base.

In some aspects, the techniques described herein relate to a method, wherein the base includes an insulating body positioned underneath the vessel.

In some aspects, the techniques described herein relate to a method, wherein the first indent and second indent are positioned on a lower portion of the vessel.

In some aspects, the techniques described herein relate to a method, including: positioning a vessel including a sidewall and a cavity therein onto a base, the base having a support arm extending from the base and a connector plate extending from the base for contacting the sidewall to connect the base to the vessel, wherein a gap is positioned between the connector plate and the support arm; positioning a food product within a cavity of a vessel, the vessel having an opening configured for accessing the cavity; positioning a cooking device over the opening; and generating, via the cooking device, a heated airflow into the cavity; wherein the gap is configured to be a thermal break between the connector plate and the handlebar.

In some aspects, the techniques described herein relate to a method, wherein the support arm encompasses the connector plate.

In some aspects, the techniques described herein relate to a method, wherein the connector plate connects to the base along a bottom edge.

In some aspects, the techniques described herein relate to a method, wherein heat energy transferred to the connector plate subsequently passes through the base prior to passing into the support arm.

In some aspects, the techniques described herein relate to a method, a second thermal break is positioned between a portion of the handlebar and the support arm.

In some aspects, the techniques described herein relate to a method, including: positioning a vessel including a sidewall and a cavity therein onto a base, the base having an insulating body having a top surface and a bottom surface, and a projection extending upward from the top surface and configured to contact the vessel positioned on the base, forming a first gap having a first height; positioning the base onto a support surface, wherein a leg extends downward from the bottom surface of the base and is configured to contact the support surface, forming a second gap having a second height; positioning a food product within a cavity of a vessel, the vessel having an opening configured for accessing the cavity; positioning a cooking device over the opening; and generating, via the cooking device, a heated airflow into the cavity; wherein the first gap is configured to be a thermal break between the vessel and the base, and the second gap is configured to be a thermal break between the base and the support surface.

In some aspects, the techniques described herein relate to a method, wherein the ratio of the second height to the first height is within the range of 2.3:1 to 2.7:1.

In some aspects, the techniques described herein relate to a method, wherein the first height is within a range of 5.0 millimeters to 6.0 millimeters.

In some aspects, the techniques described herein relate to a method, wherein the second height is within a range of 13.5 millimeters to 14.5 millimeters.

In some aspects, the techniques described herein relate to a method, wherein the ratio of the second height to the first height is 2.5:1.

In some aspects, the techniques described herein relate to a method, including: positioning a cooking device over a first opening of a first vessel, the first vessel having a first cavity therein; generating, via the cooking device, a first heated airflow into the first cavity; removing the cooking device from the first opening; positioning the cooking device over a second opening of a second vessel, the second vessel having a second cavity therein; and generating, via the cooking device, a second heated airflow into the second cavity.

In some aspects, the techniques described herein relate to a method, wherein a first lid is configured to cover the first opening after removal of the cooking device from the first opening.

In some aspects, the techniques described herein relate to a method, wherein a second lid is configured to cover the second opening after removal of the cooking device from the second opening.

In some aspects, the techniques described herein relate to a method, wherein the first opening and the second opening have identical cross-sectional shapes.

In some aspects, the techniques described herein relate to a method, wherein the first vessel includes a first volume and the second vessel includes a second volume, the first volume being smaller than the second volume.

DESCRIPTION OF DRAWINGS

These and other features will be more readily understood from the following detailed description taken in conjunction with the accompanying drawings, in which.

Figure 1A:
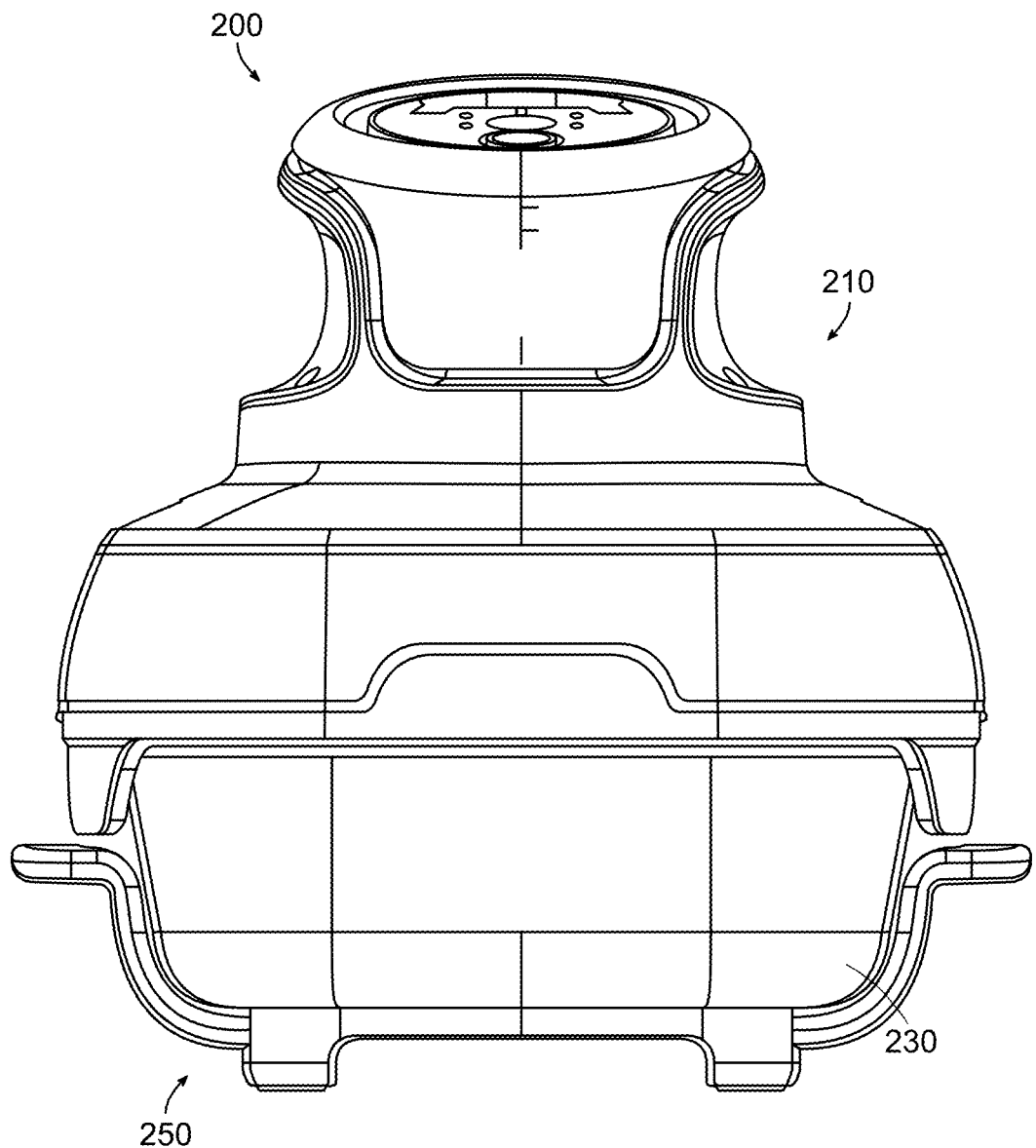
FIG. 1A is a front view of an aspect of a cooking system according to the subject matter described herein.
Figure 1B:
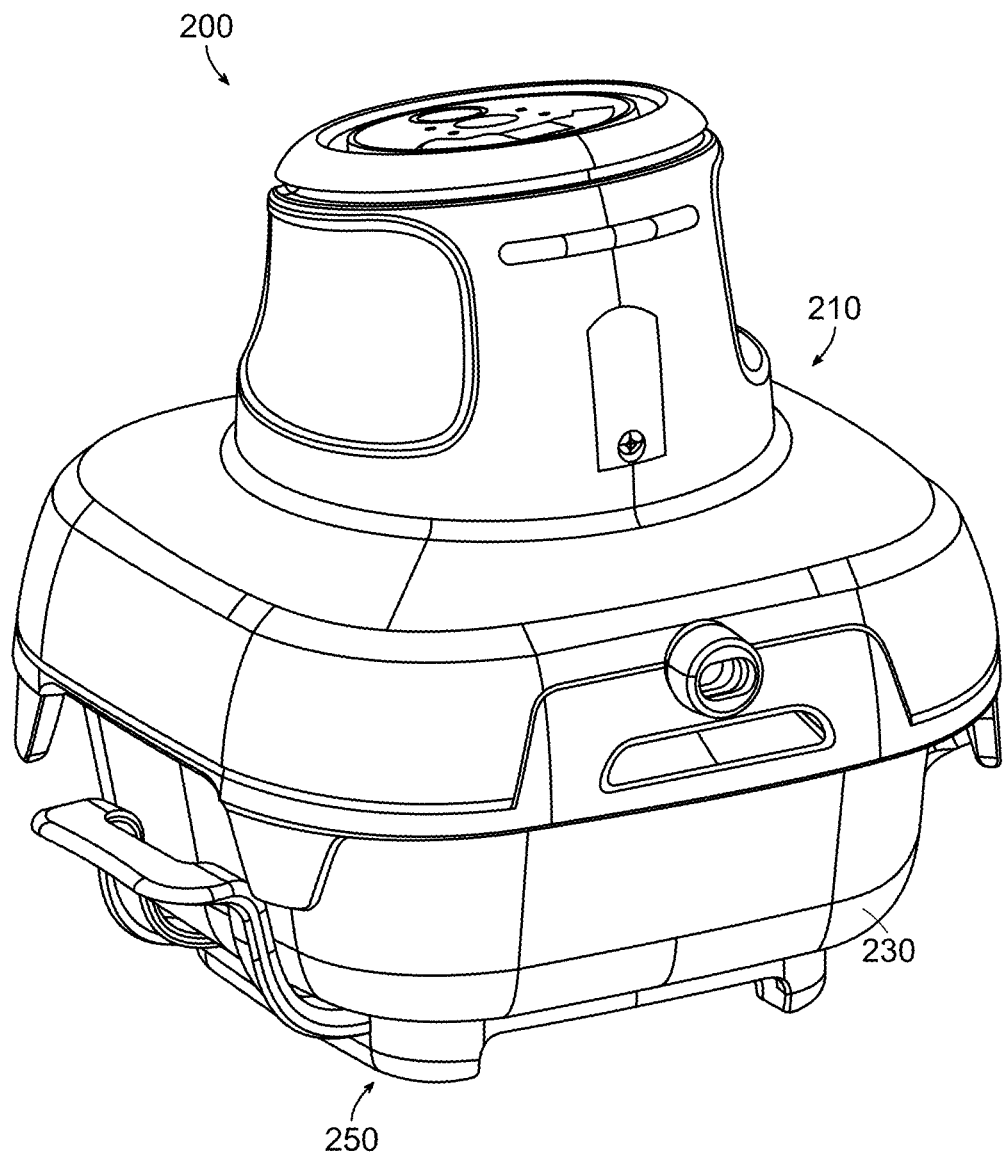
FIG. 1B is a perspective view of an aspect of a cooking system according to the subject matter described herein.
Figure 1C:
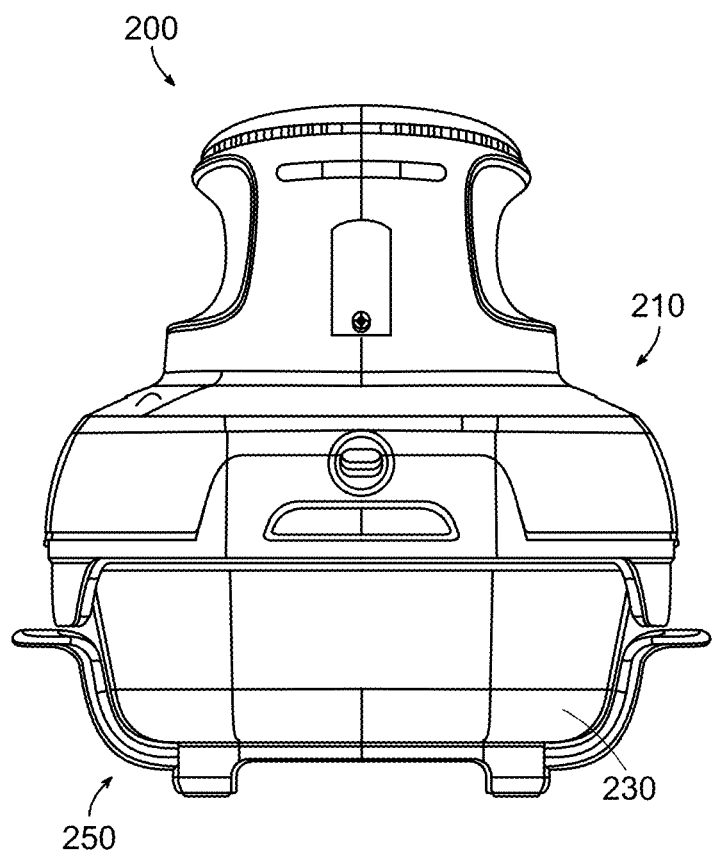
FIG. 1C is a side view of the cooking system of FIG. 1A.
Figure 1D:
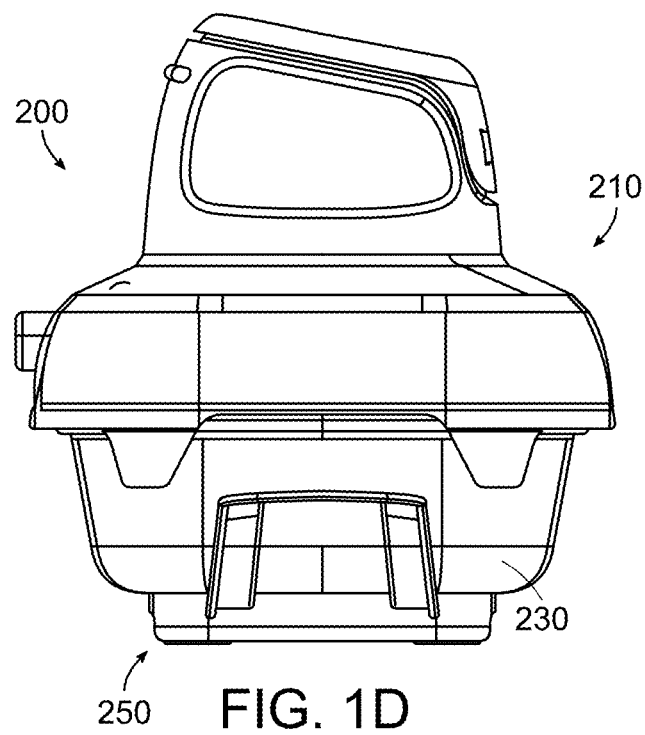
FIG. 1D is another side view of the cooking system of FIG. 1A.
Figure 2A:
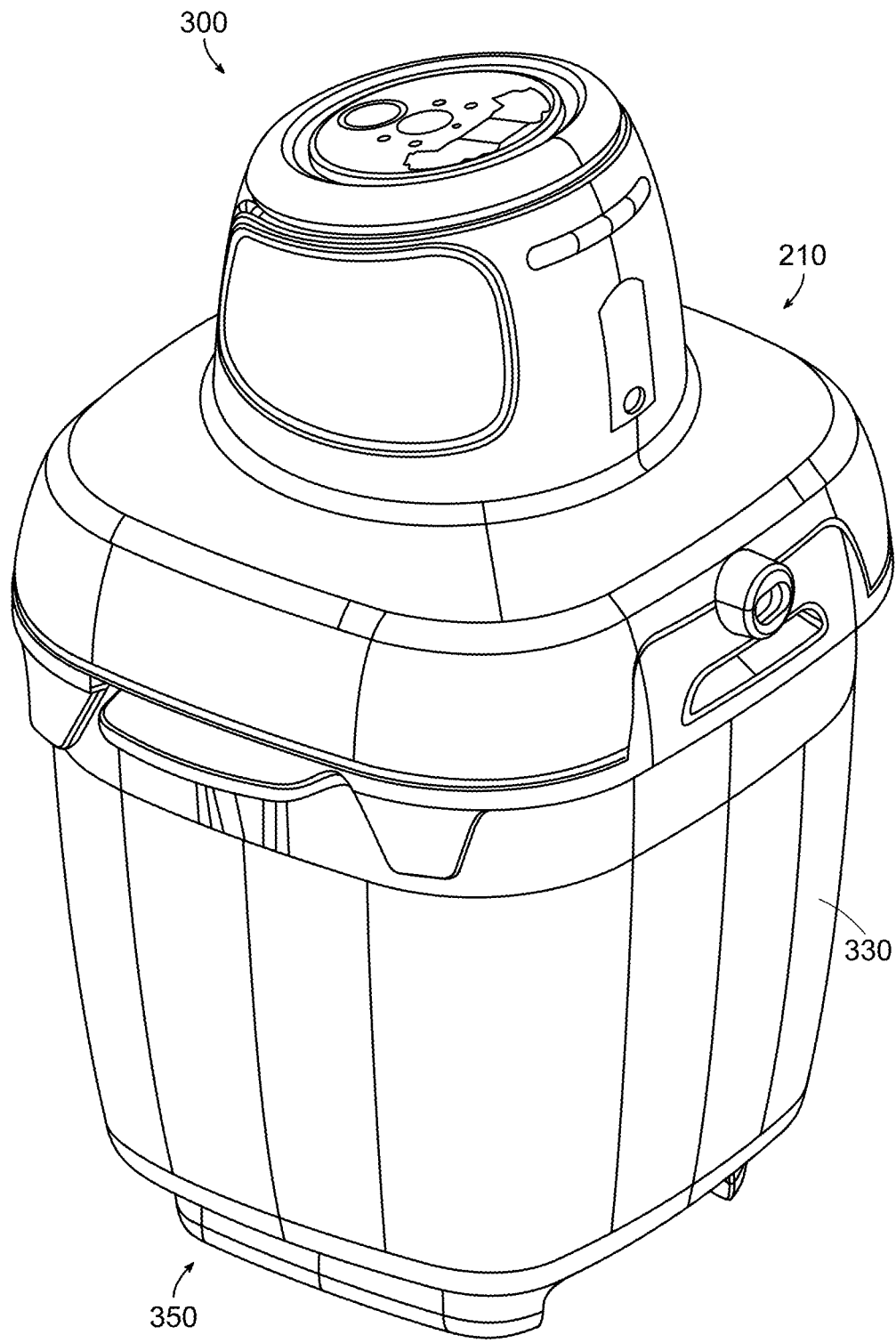
FIG. 2A is a perspective view of an aspect of a cooking system according to the subject matter described herein.
Figure 2B:
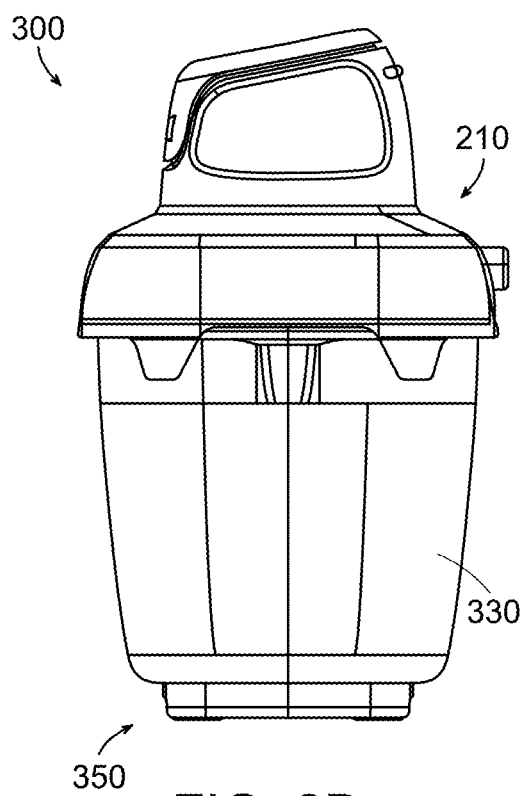
FIG. 2B is a side view of the cooking system of FIG. 2A.
Figure 2C:
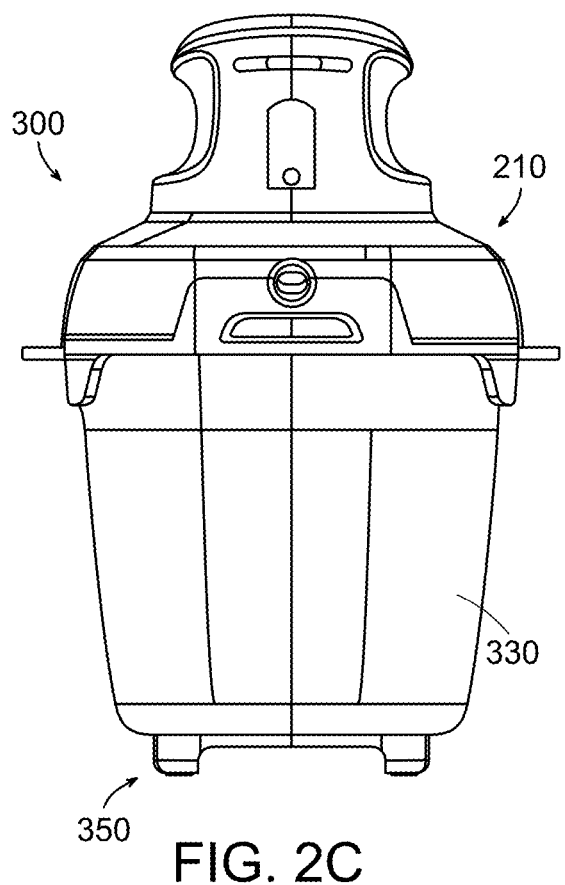
FIG. 2C is another side view of the cooking system of FIG. 2A.

It is noted that the drawings are not necessarily to scale. The drawings are intended to depict only typical aspects of the subject matter disclosed herein, and therefore should not be considered as limiting the scope of the disclosure.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Traditional countertop cooking systems, such as air fryers, typically consist of a heating element and a fan positioned overtop of a cooking cavity. These types of cooking devices can take a relative long amount of time to cook and/or reheat food due to the relatively slow nature of convective heat exchange and the relatively large thermal volume of the devices themselves. Air fryer system comprises a housing having a heating source and an air source located therein, with both sources preferably being supplied power for operation by an AC power cord. The fryer also includes a cooking chamber defined within the base, a cooking drawer which fits securely within the cooking chamber and substantially seals the chamber against heat loss during use, a handled food basket which detachably secures to the cooking drawer, an electronic controller within the base for controlling at least the heating source, the air source and the power source, and user controls attached to the base for powering on the fryer system and setting cooking conditions. Usually, the food basket is a large, heat conductive drawer that can accommodate a large volume of food. However, not all users require the large volume that traditional air fryers offer if they are only cooking a small meal. Additionally, both the food basket and a container in which the air fried food would be served would need to be cleaned after use.

The present device disclosed herein looks to combine both the cooking and storage aspect of a food product. For example, the present device utilizes the same container for both cooking of a food product, and storage of the food product. In order to achieve this efficiency, the container used is made from a thermal shock-resistant material such as borosilicate glass. Additionally, the cooking device used to generate a heated airflow is designed to be separate from the container in such a way that the whole of the cooking device can be removed from the container after a cooking process is completed. Further, the food product placed in the container for a cooking process can remain in the container after a cooking process without the need to be removed prior to storage. Instead of removing the food and cleaning the container, a user can use a lid correspondingly sized to the opening on the container to seal the food product within the container so that the container can be easily transported.

The cooking systems described herein may comprise a cooking device and a vessel. The cooking device (e.g., air fryer) may comprise a housing, a heating element, and an air movement device. The housing may comprise a cavity extending upward from a bottom surface. The cavity may be configured to receive the heating element. In other words, the heating element may be at least partially positioned within the cavity. The heating element may be configured to convert electrical energy into thermal energy. For example, the cooking device may further comprise an electrical conduit (e.g., wire) that may be electrically connected to the heating element. The electrical conduit may also be configured to couple to a power source, such as a wall outlet. The air movement device may be configured to facilitate air flow around the heating element. For example, the air movement device may pull in relatively cool air from an external environment and push the air through one or more fluid conduits such that the air flows around the heating element. The heating element may transfer heat to the air such that the now-heated air may flow into the vessel. Accordingly, the air movement device may facilitate convective heat transfer to any contents within the vessel.

Accordingly, embodiments of the cooking systems and methods described herein advantageously provide a system that can reheat and/or cook quickly using forced convection heat. Additional and/or alternative aspects of air frying technology are described in U.S. Pat. Nos. 11,619,394 and 11,490,761, and U.S. Patent Application No. 63/516,980, each of which are incorporated in their entirety by reference herein.

FIGS. 1A-1D and 2A-2D illustrate exemplary variations of cooking systems according to the subject matter described herein. For example, FIGS. 1A-1D illustrate an embodiment of a cooking system 200 according to the subject matter described herein. The cooking system 200 can include a cooking device 210 and a vessel 230 coupled to a thermal protection element 250. As another example, FIGS. 2A-2D illustrate another embodiment of a cooking system 300 that can include the cooking device 210 and a vessel 330 coupled to a thermal protection element 350. The cooking device 210 may be received by either of the vessels 230, 330. In some variations, the cooking device 210 may be releasably coupled to the vessels 230, 330 via one or more fasteners (e.g., screws, nails, bolts), adhesives, ties, ropes, hooks, or a combination thereof. The cooking device 210 may perform a cooking process (e.g., air frying, roasting, reheating) once a respective opening of the vessels 230, 330 is covered by the cooking device 210.

FIGS. 3A-3D further illustrate the cooking device 210. The cooking device 210 includes an upper housing 256 and a lower housing 216. The upper housing 256 is joined to the lower housing 216, where both housings can also be unitary with one another. The upper housing 256 is cylindrical in shape, and can be formed from a thermally nonconductive material, such as plastic. The upper housing 256 comprises a vent 263, which is used to pull in cool air from the ambient environment in order to cool the electrical components within the cooking device 210.

The upper housing 256 includes an input interface 214. The input interface 214 comprises a plurality of buttons configured to allow a user to control the cooking device 210. The input interface 214 is connected to a control unit (not shown) arranged within the cooking device 210. For example, a user may control a power status (e.g., on, off), a power setting, a cooking mode, or a combination thereof via the input interface 214. As shown, the input interface 214 is on a top surface of the upper housing 256. The upper housing 256 is configured to be handled by the user. As shown, the upper housing 256 comprises a depression 218 configured to receive a user's hand. Therefore, the user may easily and comfortably pick up or otherwise move the cooking device 210.

Figure 3A:
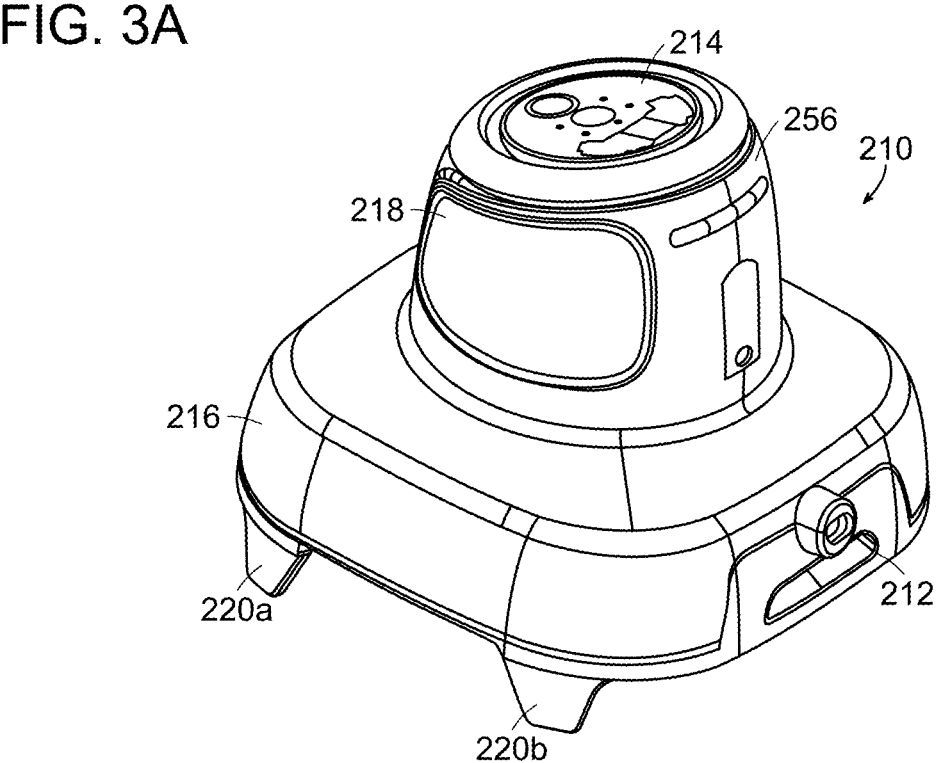
FIG. 3A is a perspective view of a cooking device of FIG. 1A.
Figure 3B:
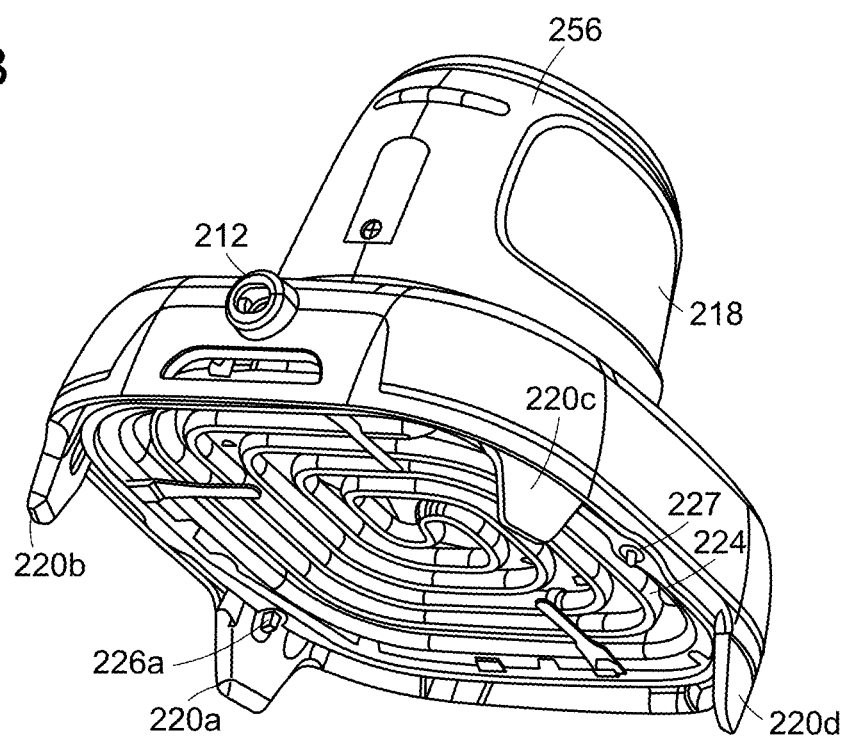
FIG. 3B is another perspective view of the cooking device of FIG. 3A.
Figure 3C:
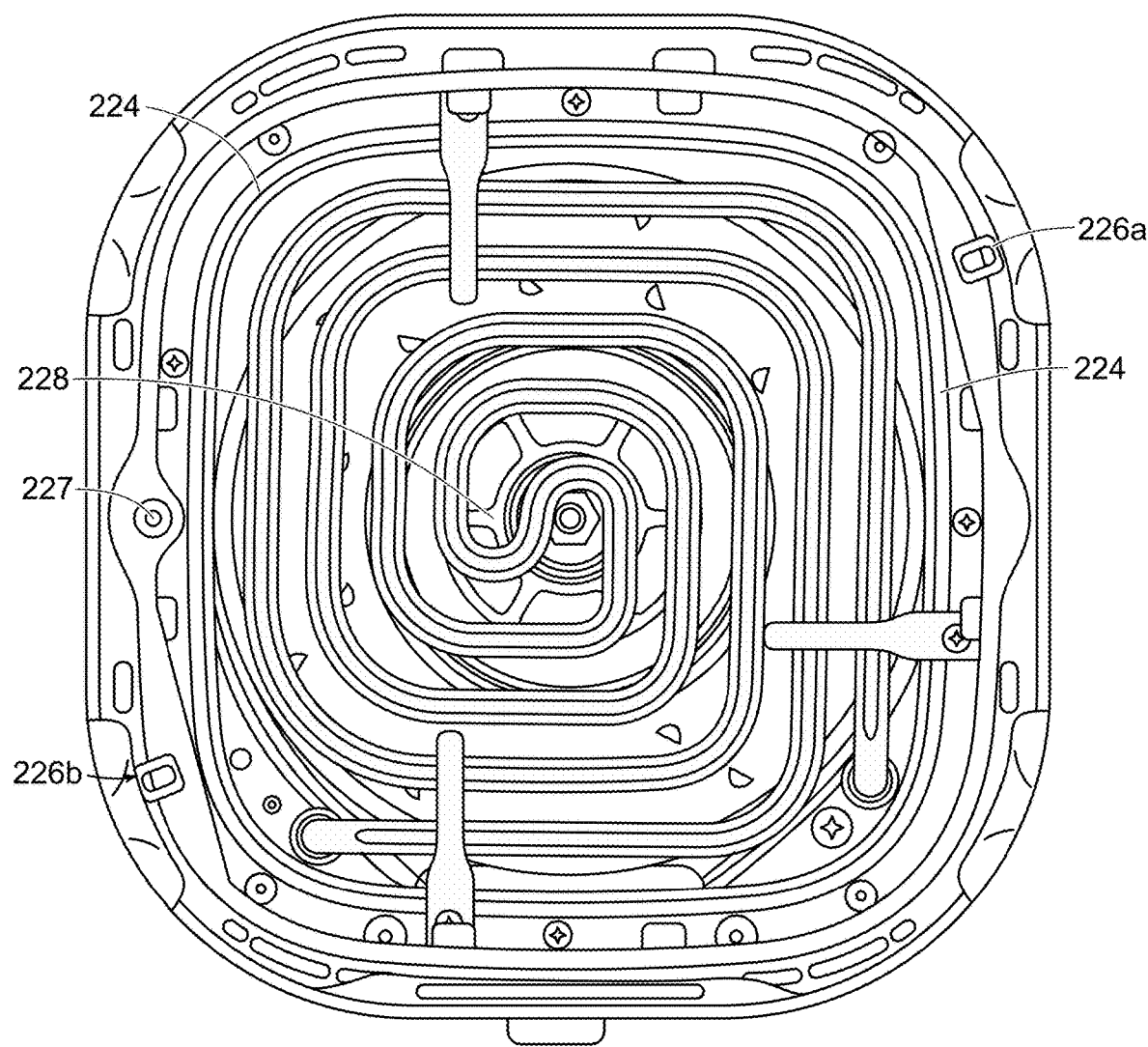
FIG. 3C is a bottom view of the cooking device of FIG. 3A.

The lower housing 216 extends radially outward from the upper housing 256, and is configured to cover a vessel wall positioned underneath the cooking device 210. The lower housing 216 can have a cross-section that corresponds to a vessel such that the cooking device 210 can be used with a vessel without the use of additional components. As shown in FIG. 3C, the lower housing 216 can be square, but other shapes such as circular or rectangular should be considered within the scope of this disclosure.

Figure 3D:
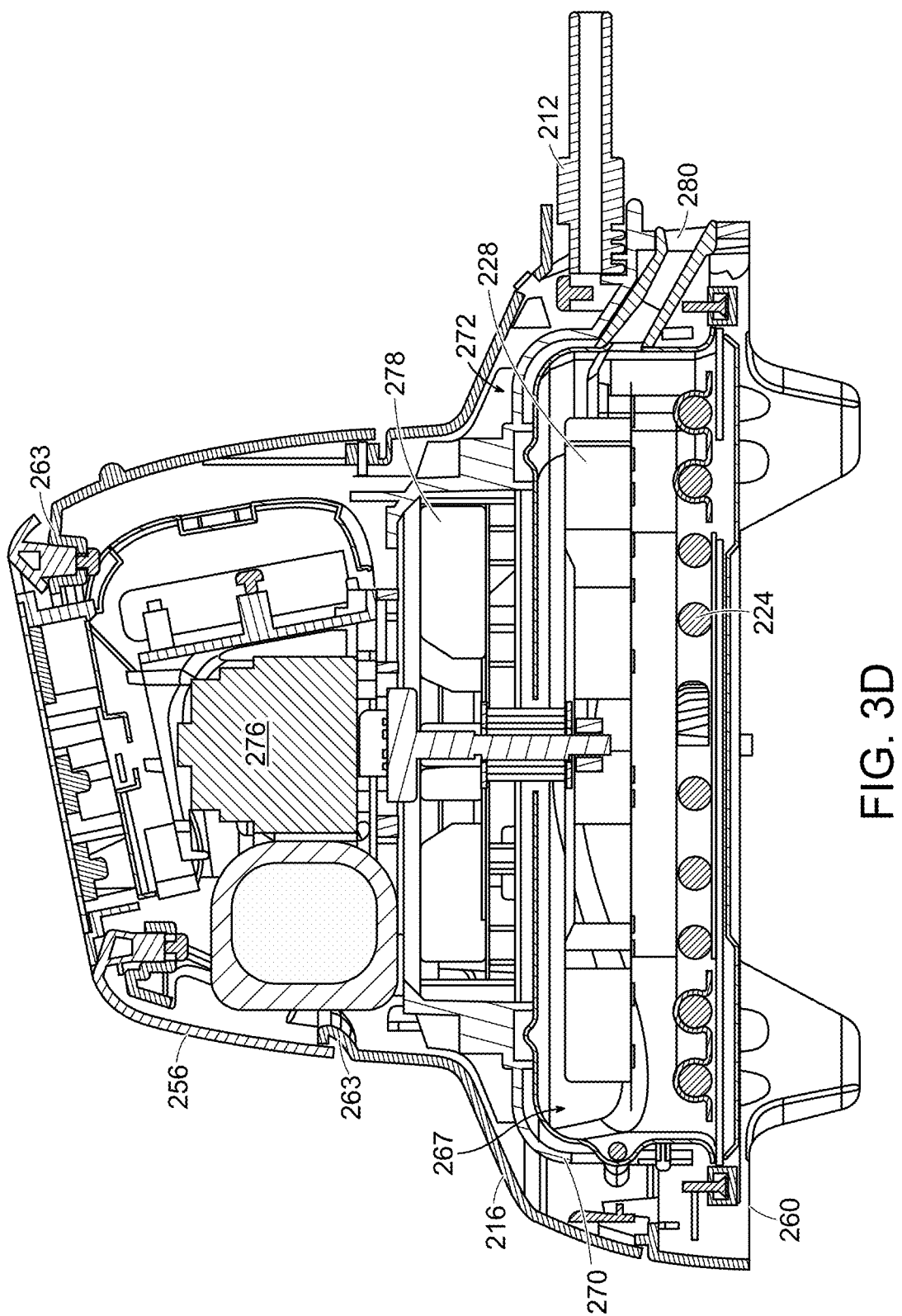
FIG. 3D is a cross-sectional view of the cooking device of FIG. 3A

As illustrated in FIG. 3D, the cooking device 210 includes a bottom surface 260 and an inner housing 270. The bottom surface 260 can abut and seal the contacting surface of a vessel such that heated air produced by the heating element 224 and fan 228 stays within the vessel and does not escape during the cooking process. The bottom surface 260 can include a temperature resistant sealing member such as a rubber or silicone seal, and can also be a metallic surface that rests against the vessel 230. A gap 272 is formed between the lower housing 216 and the inner housing 270, and is configured to act as an insulating gap to keep the outer surfaces of the cooking device 210 cool during the cooking process, and a cooling airflow channel to help direct a cooling airflow over heat-sensitive electrical components within the housing to cool them during a cooking process.

Arranged radially inward of the inner housing 270 is a cavity 267 that houses a heating element 224, a fan 228, and a temperature sensor (not shown). The temperature sensor can be a NTC or bimetallic temperature sensor which can shut off the heating element 224 in the event of overheating. Also positioned within the lower housing 216 is an exhaust vent 280, which can allow heated air to leave the cavity 267 during the cooking process.

The heating element 224 can be a radiative or convective heat source that, in combination with the fan 228, can produce a stream of heated air that can travel from the lower housing 216 to a vessel cavity within the vessel 230. In an aspect, the heating element 224 is a cal-rod, graphite, carbon fiber, or any other suitable heating source. An opening of the vessel 230 that leads to the vessel cavity allows for the transfer of heated air. Therefore, when a user activates the cooking device 210 via the dial input interface 214, the fan 228 and heating element 224 can activate in order to produce force convective airflow which will flow around the food arranged in the vessel cavity. In particular, the heating element 224 may convert electrical energy received via a power inlet 212 to thermal energy, such that the heating element 224 increases in temperature. Furthermore, the fan 228 may rotate in either a clockwise or counterclockwise direction, such that air may move through, over, or otherwise around the heating element 224. The operation of the heating element 224 in combination with the fan 228 may correspond to a cooking process.

The cooking devices described herein may facilitate flow of relatively cool air. For example, arranged within the upper housing 256 is a motor 276 that powers the fan 228. The motor 276 also powers a cooling fan 278 arranged vertically above and outside of the cavity 267. The motor 276, fan 228, and cooling 278 may together define an air movement device. The cooling fan 278 may facilitate a cooling process. For example, the cooling fan 278 is configured to draw in cool air from the vent 263, through the upper housing 256, and along the gap 272 in order to both cool the motor 276, the plastic inner structure, the outer housing, and electrical components within the cooking device 210. The cool air being drawn by the fan 278 is exhausted through the exhaust port 280. In some variations, the cooling process may be performed simultaneously with the cooking process. For example, the air flow provided by the air movement may travel around one or more electronic components (e.g., PCBA) of the cooking device. The air flow around the one or more electronic components may reduce the risk of the electronic components overheating from the heat generated by the heating element.

In further variations, the cooling process may be performed after the cooking process. For example, the cooking device 210 may remain coupled to the vessel after performing the cooking process. However, the vessel may radiate heat to the cooking device that may be sufficient to overheat the one or more electronic components. Therefore, the cooking device 210 may perform a cooling process by activating one or more of the fans 228, 278 (without activating the heating element 224) in order to facilitate relatively cool air flow around the one or more electronic components. In such a cooling process, one or more of the fans 228, 278 may rotate at a predetermined rate of rotation, such as between about 100 RPM and about 1000 RPM, including all values and sub-ranges therein. In an exemplary variation, the one or more fans rotate at about 700 RPM. Furthermore, the fans 228, 278 may rotate for a predetermined period of time, such as between about 30 seconds and about 5 minutes, including all values and sub-ranges therein. Any cooling process performed after the cooking process may be stopped at any point, such as by decoupling the cooking device 210 from the vessel. Advantageously, the cooling process performed after the cooking process may occur automatically (e.g., without user input) and/or quietly.

The cooking devices described herein may be configured to detect one or more characteristics of a vessel prior to performing a cooking process and/or cooling process. For example, the cooking device 210 may further comprise one or more vessel detection elements (e.g., detection sensors). The vessel detection elements may ensure that only vessels that meet one or more predetermined conditions may be used with the cooking devices described herein, which may be referred to as a vessel screening process. For example, the vessel detection elements may ensure that the cooking devices are used safely and in a manner that avoids overheating the vessels, and any contents therein, beyond a predetermined temperature limit. The predetermined temperature limit of the vessels described herein may be between about 200° F. and about 600° F., including all values and sub-ranges therein. The predetermined temperature limit may correspond to the volume of the vessel, such that relatively smaller vessels may have a relatively lower predetermined temperature limit. In particular, relatively smaller vessels may reflect, radiate, or otherwise magnify the heat provided by the cooking device such that any food contained therein may become hotter than in relatively larger vessels. Relatedly, the one or more vessel detection elements may avoid risks associated with false temperature readings by one or more temperature sensors of the cooking device. For example, the relatively hotter temperatures of any food contained within relatively smaller vessels may cause the one or more temperature sensors to read unacceptably high temperatures, when in fact the vessel itself may still be safely at or below the predetermined temperature limit.

As shown in FIG. 3C, the one or more vessel detection elements may be coupled to a bottom surface of the cooking device 210. The vessel detection elements may be configured to detect one or more specific design features of the vessels. For example, the cooking device 210 comprises a first detection sensor 226a and a second detection sensor 226b. Each of the detection sensors 226a, 226b is coupled to a bottom surface of the cooking device 210. The first detection sensor 226a is positioned near the third mounting leg 220c and the second detection sensor 226b is positioned near the first mounting leg 220a. Each of the detection sensors 226a, 226b comprises a microswitch comprising at least plunger and at least one spring coupled thereto. Each of the plungers are configured to be depressed by a vessel, such as the vessel 230 or the vessel 330. Depressing (e.g., applying a compressive force against) the one or more plungers may cause an electrical signal to change accordingly. If the change in the electrical signal meets a predetermined condition (e.g., based on current, voltage, polarity, or a combination thereof), the vessel may be qualified for use with the cooking device 210. If the predetermined condition is not met, the vessel may not be qualified for use with the cooking device so the cooking device may not operate. That is, the cooking device 210 requires each of the detection sensors 226a, 226b to be depressed by a predetermined magnitude in order to turn on and/or perform a cooking process. Accordingly, the detection sensors 226a, 226b ensure that only safe and properly qualified vessels may be used with the cooking device 210.

The cooking device may further comprise one or more vessel identification elements (e.g., identification sensors). The vessel identification elements may be used to identify a specific category, type, or other classification of containers. The vessel identification elements may be configured to identify one or more specific design features of the vessels (i.e., vessel identification features). The specific design features may be preselected or, in some variations, may be updated in real-time. For example, a vessel may have a lip that includes one or more protrusions, grooves, channels, dips, depressions, extensions, barcodes, colors, metallic strips, or combinations thereof. The one or more lip features may correspond to a size and/or manufacturer of the vessel. For example, as shown in FIG. 3C, the cooking device 210 comprises an identification sensor 227. The identification sensor 227 is coupled to a bottom surface of the cooking device 210. The identification sensor 227 is near the perimeter of the bottom surface and between the third and fourth mounting legs 220c, 220d. The identification sensor 227 comprises a microswitch comprising at least plunger and at least one spring coupled thereto. Accordingly, the plunger of the identification sensor 227 is configured to be depressed by a vessel, such as the vessel 230 or the vessel 330. The identification sensor 227 is configured to determine a volume of a vessel releasably coupled to the cooking device 210. For example, the vessel 230 may be configured to engage (e.g., depress) the identification sensor 227, whereas the vessel 330 may be configured to avoid depressing the identification sensor 227. Therefore, the identification sensor 227 will determine whether the cooking device 210 is releasably coupled to the vessel 230 or the vessel 330.

In some variations, the identification sensor 227 may comprise an optical sensor, a pressure sensor, a temperature sensor, an electrical sensor, an infrared sensor, time-of-flight sensor, or combination thereof. In an exemplary variation, the identification sensor 227 comprises an optical sensor may be coupled to a bottom portion (e.g., bottom surface) of the cooking device 210, such that the optical sensor may detect the presence or absence of an optical feature of a given vessel. That is, the vessel may comprise one or more colors positioned on an edge thereof, such that the optical sensor may detect the color and compare it to a predetermined condition. If the detected color meets the predetermined condition, the cooking device 210 may be used with the vessel. For example, vessels of a specific size (e.g., volume) may have comprise a material positioned on a lip thereof with a first color and vessels of a different size may comprise a material positioned on a lip thereof with a second color. In another exemplary variation, a barcode may be positioned on one or more lips of a vessel, such that the optical sensor may detect the barcode to determine the volume of the vessel.

In another exemplary variation, the identification sensor 227 comprises an electrical sensor may be coupled to a bottom portion of the cooking device 210. The electrical sensor may be configured to detect the presence or absence of a material with a predetermined resistance, capacitance, or similar electrical characteristic. That is, the vessel may comprise one or more materials positioned on an edge thereof, such that the electrical sensor may electrically couple to the material to measure one or more electrical characteristics. If the measured electrical characteristics meets the predetermined condition, the cooking device may be used with the vessel. For example, vessels of a specific size (e.g., volume) may have comprise a material positioned on a lip thereof with a first electrical characteristic and vessels of a different size may comprise a material positioned on a lip thereof with a second electrical characteristic.

In yet another exemplary variation, the identification sensor 227 comprises an infrared sensor may be coupled to a bottom portion of the cooking device 210. The infrared sensor may be configured to detect one or more dimensions of a vessel. For example, the infrared sensor may detect a distance between an contacting surface of a vessel, such as an edge or lid coupled thereto, and a ground surface, such as a countertop. That is, the infrared sensor may comprise a time-of-flight sensor configured to measure a time taken for a photon to travel from the sensor to the ground surface and back to the sensor. The detected distance and/or time may be compared to a predetermined condition. If the detected distance and/or time meets the predetermined condition, the cooking device may be used with the vessel.

The cooking device 210 may further comprise one or more thermal protection elements. The thermal protection elements may be referred to as insulators or insulation units. The thermal protection elements may advantageously mitigate risks associated with contacting one or more hot surfaces of the cooking system. For example, the cooking device 210 may reach elevated temperatures during or after a cooking process. Therefore, in an exemplary variation, the cooking device 210 may include one or more mounting legs configured to create an air gap between the heating element of the cooking device and a mounting surface (e.g., a countertop). That is, the cooking device 210 may be decoupled from the vessel after being used to heat food within the vessel, such that the heating element 224 may still be at an elevated temperature. Placing the heating element 224 in close proximity to the mounting surface may cause heat transfer from the heating element 224 to the mounting surface, which may contribute to undesirable burning and/or damage to the mounting surface. Therefore, the one or more mounting legs may function as a stand for the cooking device, such that the heating element is maintained at a safe device from the mounting surface. For example, as shown in FIG. 3B, the cooking device 210 comprises a first mounting leg 220a, a second mounting leg 220b, a third mounting leg 220c, and a fourth mounting leg 220d. Each of the mounting legs 220a-220d extends from a bottom surface 260 of the cooking device 210. Furthermore, each of the mounting legs 220a-220d is positioned along a perimeter of the bottom surface. In particular, the first and second mounting legs 220a, 220b are positioned on a first end of the cooking device 210 and the third and fourth mounting legs 220c, 220d are positioned on a second end of the cooking device 210. Additionally, each of the mounting legs 220a-220d are positioned near a corner of the bottom surface of the cooking device 210, such that the weight of the cooking device 210 is distributed relatively evenly between each of the mounting legs 220a-220d.

The mounting legs 220a-220d may be integrally formed with the housing 216 of the cooking device 210. In some variations, the mounting legs 220a-220d may be releasably coupled to the housing. Accordingly, the mounting legs 220a-220d may be manufactured from the same material as the housing but need not. In particular, the mounting legs 220a-220d may be manufactured from plastic, metal, glass, rubber, or a combination thereof. In some variations, cooking device may comprise any number of mounting legs, such as 2, 3, 4, 5, 6, 7, 8, 9, or more mounting legs. Each of the mounting legs 220a-220d may comprise a height. The height of the mounting legs 220a-220d may be between about 0.1 inches and about 2 inches, including about 0.1 inches, about 0.5 inches, about 1 inch, or about 1.5 inches. Each of the mounting legs 220a-220d may comprise the same height or different heights. For example, the mounting legs 220a-220d may comprise substantially equal heights, such that the cooking device 210 may be positioned level relative to a mounting surface.

The cooking devices described herein, such as the cooking device 210, may be used with a variety of vessels comprising a variety of sizes. The vessels, which may also be referred to as containers, may be configured to contain one or more goods intended for heating. For example, FIGS. 4A-4C further illustrate the vessel 230. The vessel 230 comprises a first sidewall 1212a, a second sidewall 1212b, a third sidewall 1212c, a fourth sidewall 1212d, and a bottom wall 1212e. The sidewalls 1212a-1212d each comprise an equivalent height and top edges thereof cooperate to define a lip 1230. The lip 1230 forms a contacting surface of the vessel 230. Furthermore, the vessel 230 comprises an opening 1232 in the top surface of the vessel 230. In other words, the lip 1230 extends around the opening 1232.

Figure 4A:
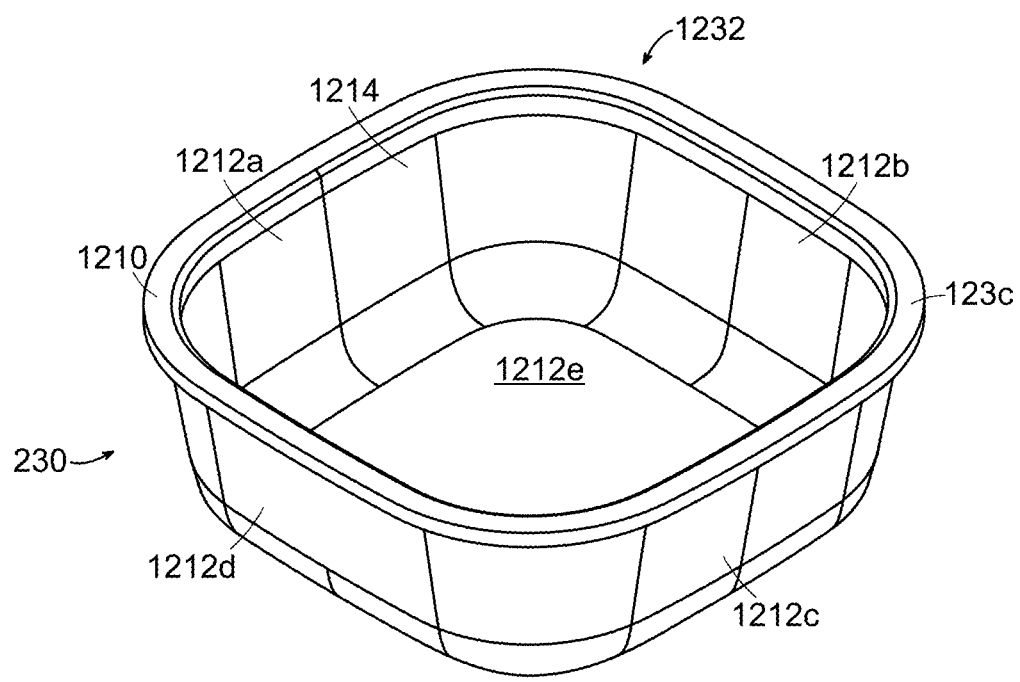
FIG. 4A is a perspective view of a vessel of the cooking system of FIG. 1A.
Figure 4B:
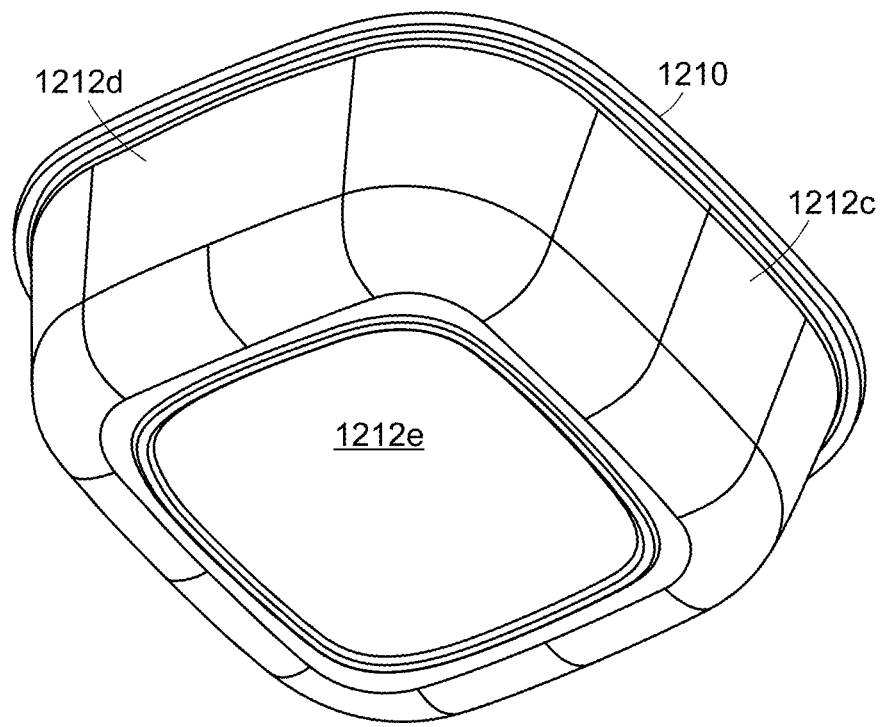
FIG. 4B is a side view of the vessel of FIG. 4A.
Figure 4C:
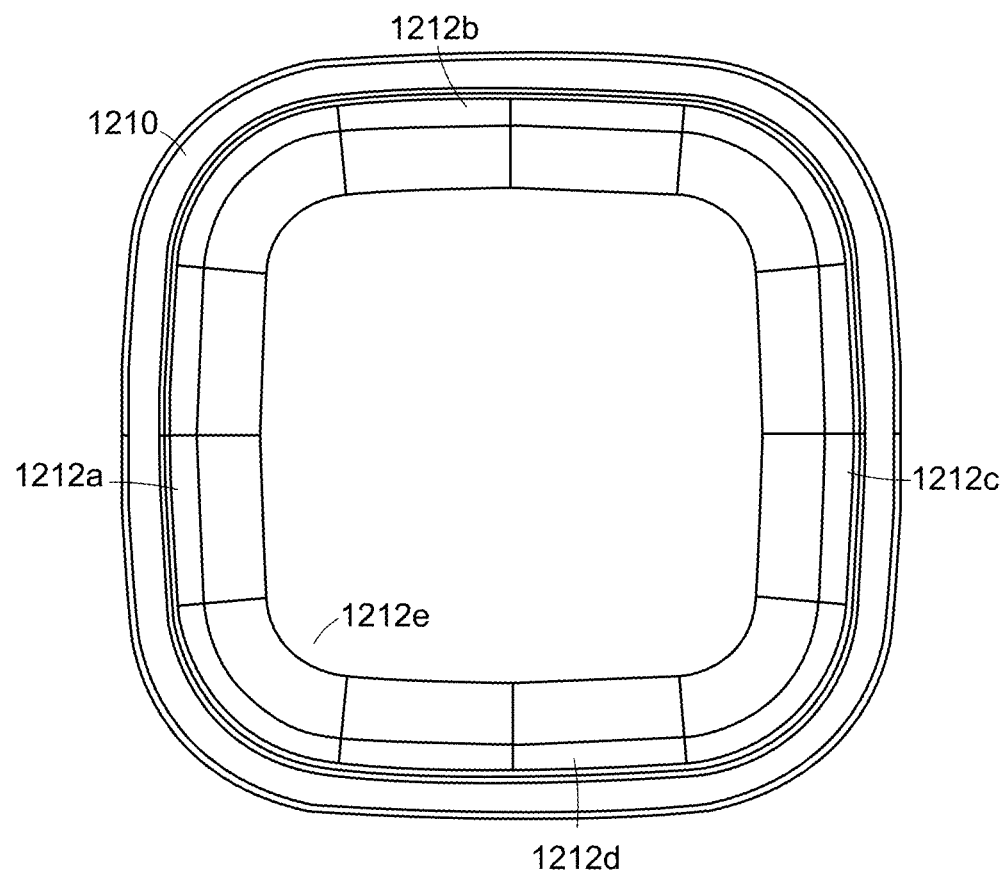
FIG. 4C is another side view of the vessel of FIG. 4A.

Additionally, as shown in FIG. 4A, the sidewalls 1212a-1212d define a vessel cavity 1214 (i.e., a cooking volume, cooking cavity, storage cavity). The vessel cavity 1214 comprises a volume between about 0.5 L and about 2 L. A contacting surface of the bottom wall 1212c, shown in FIG. 4A, is substantially planar and may be configured to receive food and/or facilitate easy cleaning thereof. A lower surface of the bottom wall 1212c, shown in FIG. 4B, comprises a plurality of grooves which may releasably engage with corresponding features of a thermal protection element, such as the thermal protection element 250. The one or more sidewalls 1212a-1212d may be substantially straight or may be curved. For example, the bottom wall 1212e comprises a first area, and an upper surface, defined by the lip 1230, comprises a second area greater than the first, such that the sidewalls 1212a-1212d each comprise a concave shape (e.g., curve, taper). In some variations, the vessel cavity 1214 may comprise a cross-sectional shape such as a circle, rectangle, triangle, oval, or combination thereof.

Figure 6A:
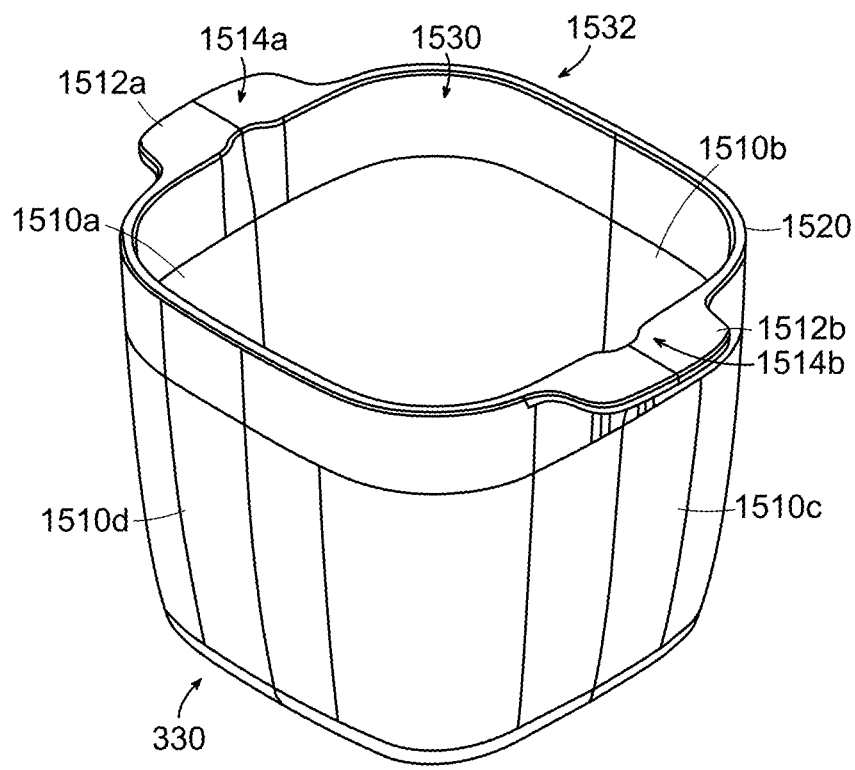
FIG. 6A is a perspective view of a vessel of the cooking system of FIG. 2A.
Figure 6B:
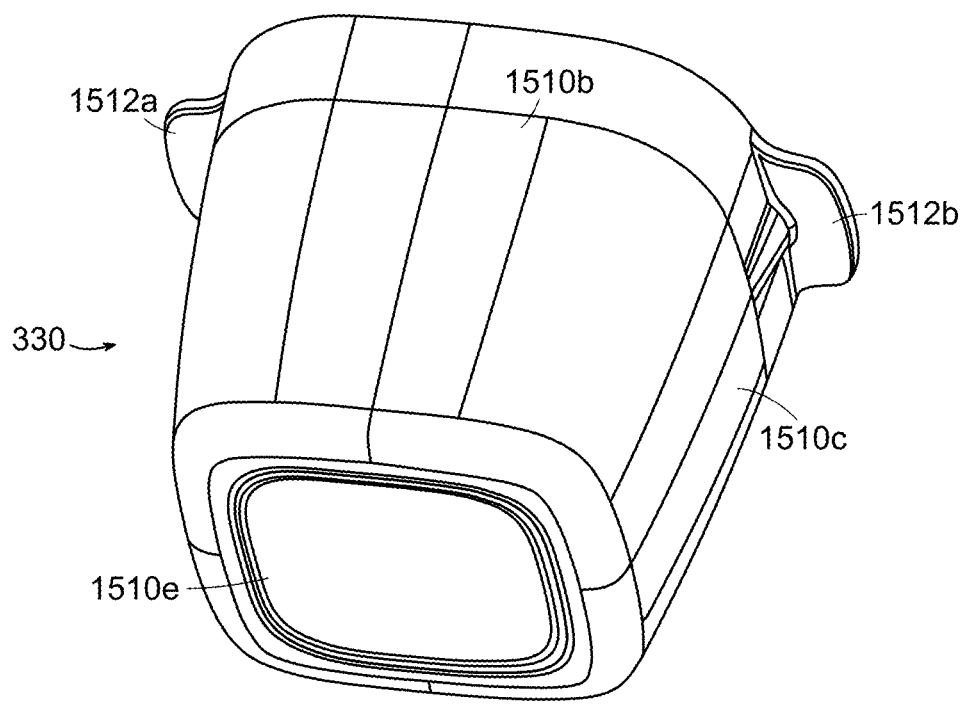
FIG. 6B is another perspective view of the vessel of FIG. 6A.
Figure 6C:
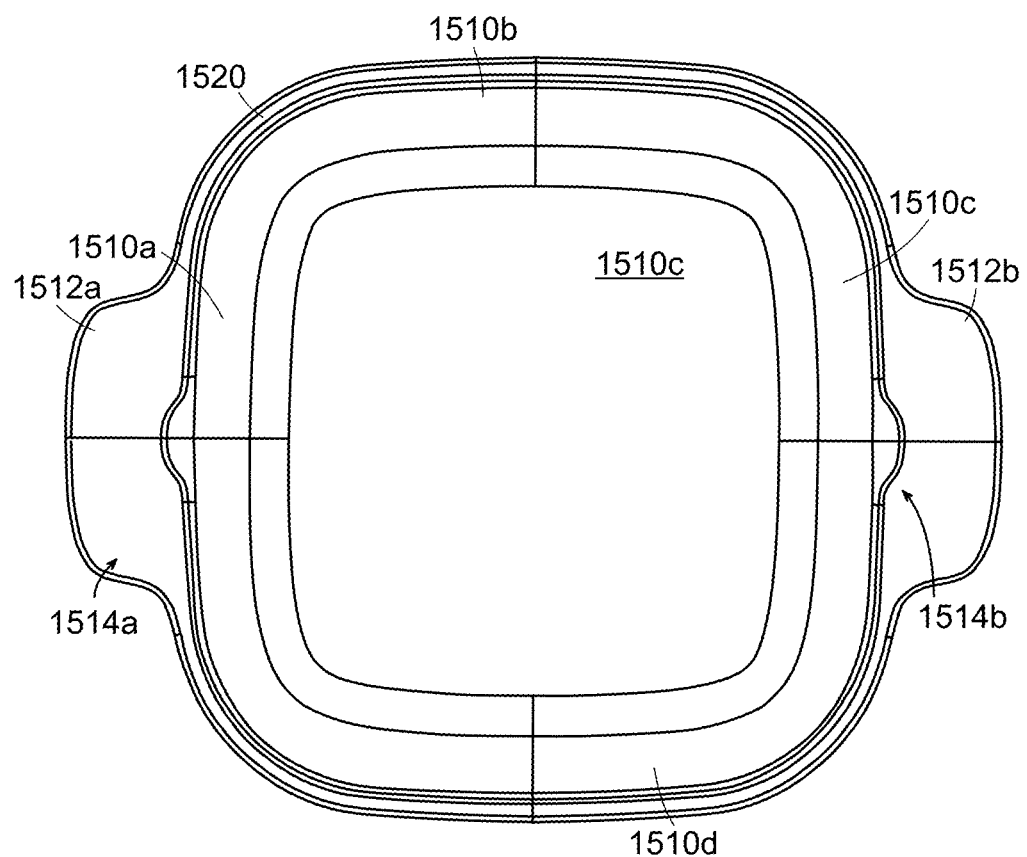
FIG. 6C is a top view of the vessel of FIG. 6A.
Figure 6D:
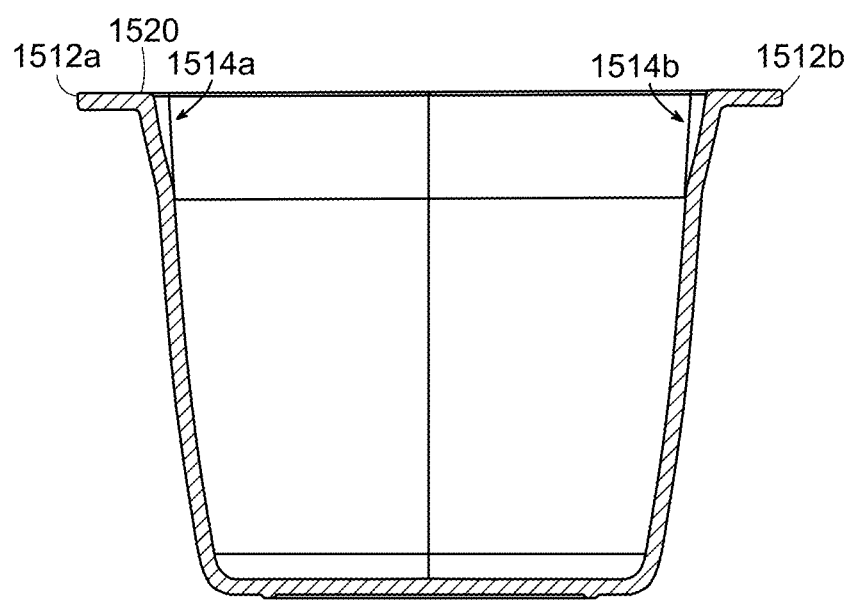
FIG. 6D is a cross-sectional view of the vessel of FIG. 6A.

In some variations, the vessel may comprise one or more depressions in a sidewall thereof. The one or more depressions may be positioned adjacent to the upper surface, such that the shape of the opening may be affected by the one or more depressions. The one or more depressions may correspond to a size of the vessel. For example, FIGS. 6A-6D further illustrate the vessel 330. The vessel 330 comprises a first sidewall 1512a, a second sidewall 1512b, a third sidewall 1512c, a fourth sidewall 1512d, and a bottom wall 1512c. In contrast to the vessel 230, the vessel 330 comprises a plurality of depressions. For example, as shown in FIGS. 6C and 6D, the vessel 330 comprises a first depression 1514a and a second depression 1514b. The first depression 1514a is positioned in the first sidewall 1510a and the second depression 1514b is positioned in the third sidewall 1510c. The first and second depressions 1514a, 1514b are positioned adjacent to the lip 1520. Accordingly, a user and/or cooking device may identify the vessels 230, 330 based on the presence and/or absence of at least one depression. That is, the depressions 1514a, 1514b may avoid engaging the identification sensor 227, such that the cooking device 210 may identify the vessel 330. Advantageously, the cooking device 210 may operate at a relatively higher temperature upon a determination that the cooking device 210 is releasably coupled to the vessel 330 rather than the vessel 230.

The vessel 330 may comprise a top surface configured to contact the cooking device 210. For as example, as shown in FIG. 6A, a top edge of each of the sidewalls 1512a-1512d define a lip 1520. The lip 1520 also corresponds to a top surface of the vessel 330. Furthermore, the vessel 330 comprises an opening 1532 in the top surface of the vessel 330. In other words, the lip 1520 extends around the opening 1532. Additionally, the sidewalls 1512a-1512d define a vessel cavity 1530. The vessel cavity 1530 comprises a volume between about 2 L and about 8 L. An upper surface of the bottom wall 1512e is substantially planar and may be configured to receive food and/or facilitate easy cleaning thereof.

In some variations, the vessel may further comprise one or more handles. The vessel handles may be configured to be handled by a user, such as to pick up or otherwise move the vessel. For example, one or more vessel handles may extend from outer surface of an upper portion of the vessel. Furthermore, the one or more vessel handles may extend from one or more sides of the vessel. For example, the vessel 330 comprises a plurality of handles. As shown in FIGS. 6A-6D, the vessel 330 comprises a first vessel handle 1512a and a second vessel handle 1512b. The first vessel handle 1512a extends from first sidewall 1510a and the second vessel handle 1512b extends from third sidewall 1510c. Each of the vessel handles 1512a, 1512b extends at a midpoint of the respective sidewalls 1510a, 1510c. Each of the vessel handles 1512a, 1512b may be configured to be grasped or otherwise handled by a user. For example, the vessel handles 1512a, 1512b may be used by a user to pick up or otherwise move the vessel 330, particularly when the vessel 330 is not at an elevated temperature that would otherwise injure the user. The vessel and/or vessel handles described herein may be manufactured from a metal, plastic, glass, or combination thereof. The materials of the vessel and/or vessel handles may be selected based on one or more of thermal conductivity, density, expansion characteristics, compressive strength, tensile strength, and other material properties.

In some variations, the cooking systems described herein may comprise more than one vessel. In such a variation, the plurality of vessels may be configured to be stacked on top of one another. Each of the plurality of vessels may comprise the same volume or different volumes. For example, the vessel 230 may be at least partially positioned within the vessel 330. In such a configuration, a lip of the vessel 230 may be positioned above or otherwise on top of a lip of the vessel 330. Advantageously, stacking two or more vessels on top of each other may reduce a total height of the stacked vessels, which may facilitate easier storage of the stacked vessels. In some variations, the cooking device 210 may be releasably coupled to the vessel 230 that may be on the top of the stack to perform a cooking process therein. That is, the vessel 230 may be safely used in the cooking process even when in a stacked configuration.

In some variations, the vessels described herein may be configured for heating and eating. For example, each of the vessels 230, 330 may be configured for a predetermined portion of food for a given user. Therefore, the user may heat food within each of the vessels 230, 330 and subsequently eat the food directly from the respective vessel. Advantageously, combining the functionality of heating and eating food according to a predetermined portion may reduce a quantity of dishes used by the user in the heating and/or eating processes as well as reduce the time required to perform one or both of those processes.

Figure 12A:
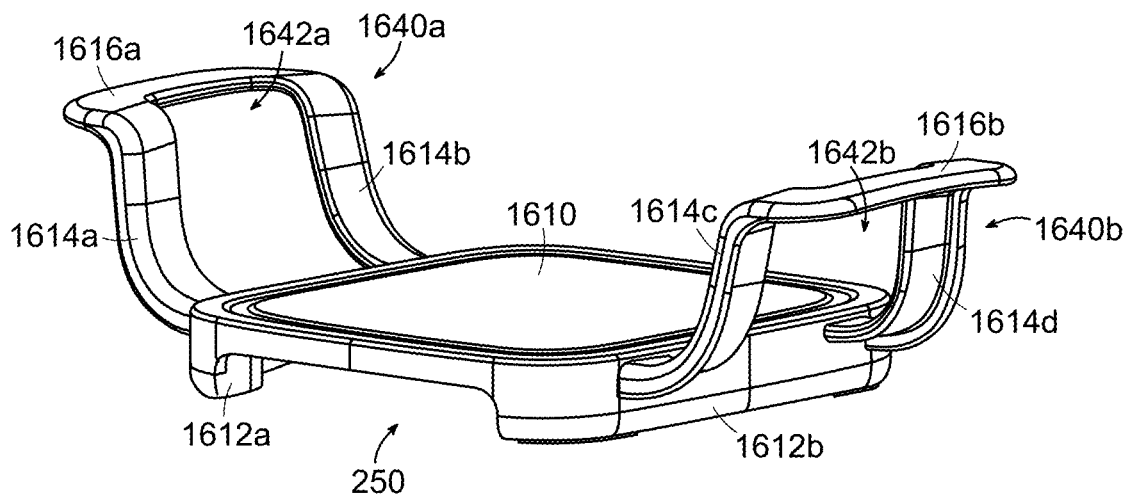
FIG. 12A is a perspective view of a thermal protection element of the cooking system of FIG. 1A.
Figure 12B:
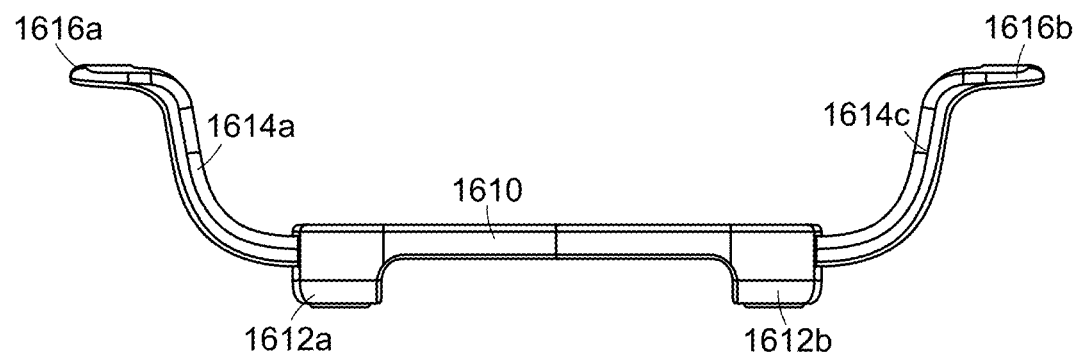
FIG. 12B is a side view of the thermal protection element of FIG. 12A.
Figure 12C:
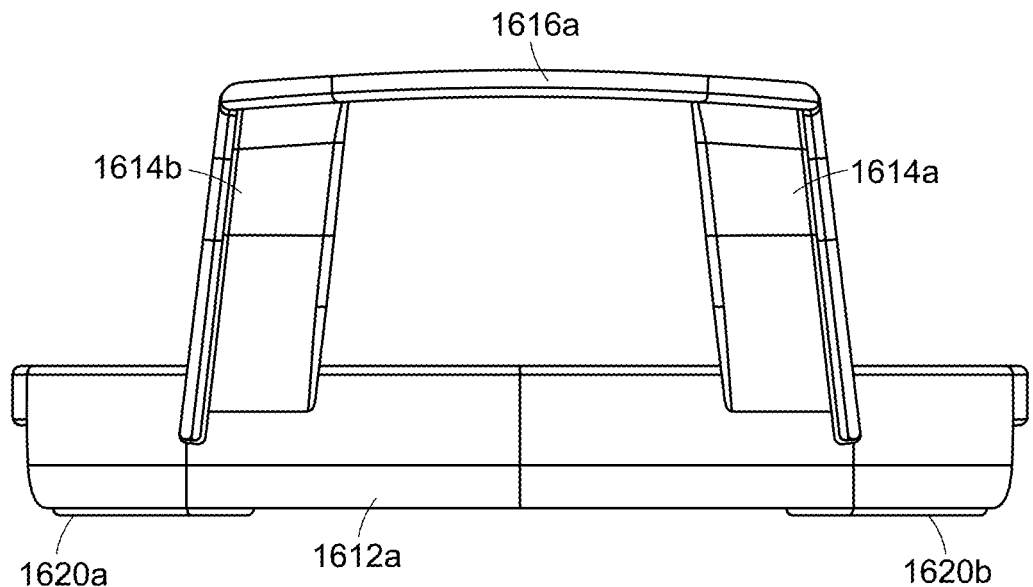
FIG. 12C is another side view of the thermal protection element of FIG. 12A.
Figure 12D:
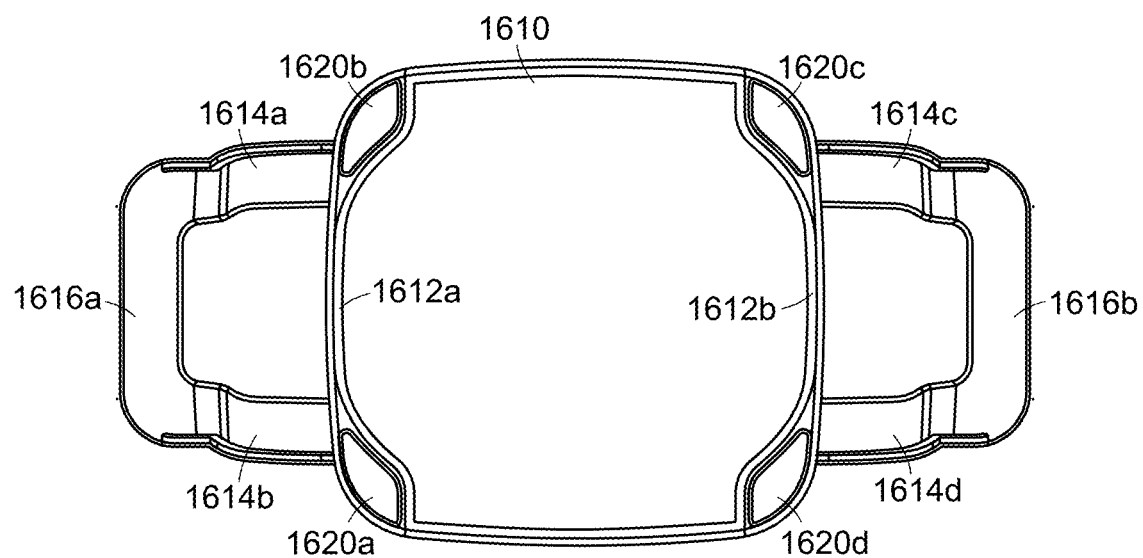
FIG. 12D is a bottom view of the thermal protection element of FIG. 12A.

One or more thermal protection elements may be coupled to the vessels described herein. For example, the vessels 230, 330 may reach elevated temperatures during and/or after a cooking process. Therefore, reducing or preventing heat transfer from the vessels 230, 330 to the user and/or countertop may prevent injuries, damage, burns, or a combination thereof. The thermal protection element may comprise a base (e.g., a trivet, mat) that may be releasably coupled to a bottom surface of a vessel. For example, FIGS. 12A-12C illustrate the thermal protection element 250. The thermal protection element 250 comprises a base 1610. The base 1610 may be configured to reduce or eliminate heat transfer from the vessel 230 to a mounting surface (e.g., countertop) to avoid burning or otherwise damaging the mounting surface. Accordingly, the base 1610 may be made of rubber, plastic, metal, or combination thereof. The base 1610 may comprise one or more depressions, grooves, or valleys configured to receive the vessel. Accordingly, the vessel 230 may be coupled to the vessel protection element 250 by a friction fit. For example, the vessel 230 may be snapped or pushed into the one or more depressions, grooves, or valleys. In further variations, the vessel 230 may be releasably coupled to the base 1610 by a fastener (e.g., screw, nail, bolt) and/or an adhesive.

Figure 16:
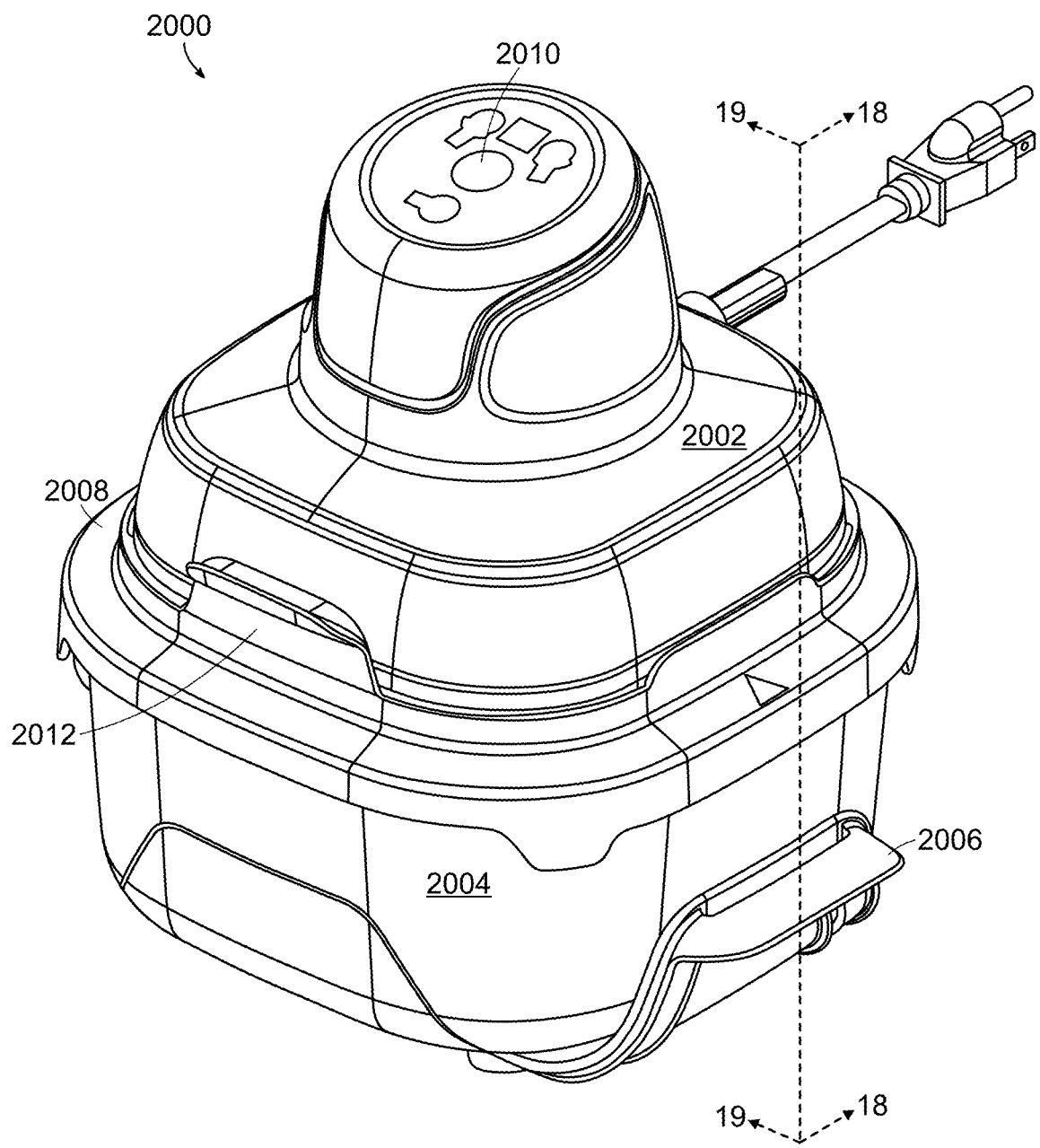
FIG. 16 is a perspective view of an aspect of a cooking system according to the subject matter described herein.

In some variations, the bases described herein may be coupled to, or integrally formed with, one or more base mounting legs. Similar to the mounting legs described with respect to the cooking device, the base mounting legs may be configured to reduce heat transfer to the mounting surface, such as from the vessel and/or base. For example, as shown in FIGS. 12A-12D, the thermal protection element 250 further comprises a first leg 1612a and a second leg 1612b. Each of the legs 1612a, 1612b are integrally formed with the base 1610. The first leg 1612a extends from the first end of the base 1610 and second leg 1612b extends from the second end of the base 1610. Each of the legs 1612a, 1612b comprise a plurality of feet. For example, as shown in FIG. 16D, the first leg 1612a comprises a first foot 1620a and a second foot 1620b. The first and second feet 1620a, 1620b are positioned on opposite sides of the first end, such that each of the first and second feet 1620a, 1620b are positioned underneath a corner of the base 1610. Likewise, the second leg 1612b comprises a third foot 1620c and a fourth foot 1620d. The third and fourth feet 1620c, 1620d are positioned on opposite sides of the second end, such that each of the third and fourth feet 1620c, 1620d are positioned underneath a corner of the base 1610.

Each of the one or more base mounting legs described herein may comprise a height. For example, the height of each of the legs 1612a, 1612b may be between about 0.1 inches and about 2 inches, including about 0.1 inches, about 0.25 inches, or about 0.5 inches. Each of the legs 1612a, 1612b may comprise the same height or different heights. Accordingly, an air gap between the base 1610 and the mounting surface may be formed such that heat transfer therebetween may be diminished or eliminated.

One or more vessel protection handles configured to be handled by a user may extend from the base. For example, a vessel protection handle may extend from a base in a direction opposite to the base mounting legs. Accordingly, the vessel protection handle may be in contact with a sidewall of the vessel. For example, as shown in FIG. 12A, the thermal protection element 250 comprises a first handle 1640a (i.e., a first vessel protection handle) and a second handle 1640b (i.e., a second vessel protection handle). Each of the handles 1640a, 1640b comprise a plurality of support arms and a handlebar. For example, as shown, the first handle 1640a comprises a first support arm 1614a, a second support arm 1614b, and a first handlebar 1616a. The first and second support arm 1614a, 1614b each extend from the base 1610 from a first end thereof. Each of the first and second support arms 1614a, 1614b are coupled to the first handlebar 1616a. The first handlebar 1616a is configured to be grasped or otherwise handled by a user. The second handle 1640b comprises similar features. For example, as shown, the second handle 1640b comprises a third support arm 1614c, a fourth support arm 1614d, and a second handlebar 1616b. The first and second support arm 1614a, 1614b each extend from the base 1610 from a second end thereof, where the second end is opposite the first end. Each of the third and fourth support arms 1614c, 1614d are coupled to the second handlebar 1616b. The first support arm 1614a, second support arm 1614b, and first handlebar 1616a together define a first handlebar opening 1642a. The first handlebar opening 1642a may be sized such that a user may easily and comfortably fit at least a portion of their hand therethrough in order to firmly grasp (e.g., envelope) the first handlebar 1616a.

The handles 1640a, 1640b may comprise a height corresponding to a height of the vessel 230, such as about ¼, about ½, about ¾, or about 4/4 of the height of the vessel 230. The height of the handles 1640a, 1640b may be such that the vessel 230 may not tip over or otherwise fall out of the base 1610 while a user handles the handles 1640a, 1640b. Furthermore, the height of the handles 1640a, 1640b may be such that air flow from the cooling fan 278 may flow around the handles 1640a, 1640b, which may further reduce the temperature thereof. Additionally, the handles 1640a, 1640b may not be as thermally conductive as the vessel.

Therefore, a temperature of the handles 1640a, 1640b may be relatively lower than the vessel 230. Accordingly, a user may safely grasp the handlebars 1616a, 1616b rather than the vessel 230 directly in order to avoid risks associated with high temperatures of the vessel 230.

Figure 5:
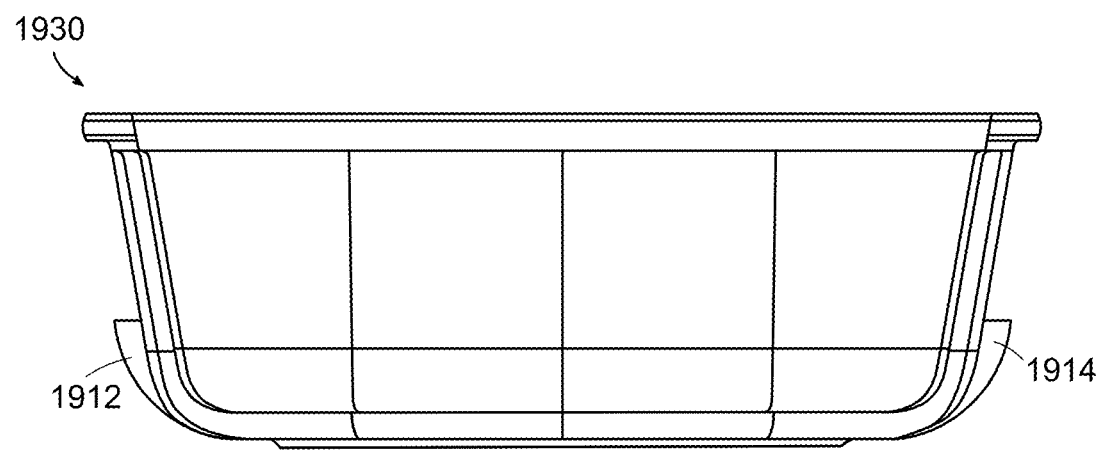
FIG. 5 is a perspective view of a storage lid and a crisper tray of the cooking system of FIG. 1A.

The vessel protection handles described herein may engage with one or more surface features of a vessel sidewall. For example, one or more protrusions may extend from an outer surface of a sidewall, such that the vessel protection handle may releasably couple (e.g., via friction fit) thereto. For example, FIG. 5 illustrates a vessel 1930 with a first protrusion 1912 and a second protrusion 1914. The vessel 1930 may otherwise correspond to the features and descriptions of the vessel 230. The first and second protrusions 1912, 1914 may be configured to receive a handlebar of a thermal protection element. For example, the first protrusion 1912 may be configured to receive the first handlebar 1616a of the thermal protection element 250 and the second protrusion 1914 may be configured to receive the second handlebar 1616b of the thermal protection element 250. In some variations, the protrusions of the vessel 1930, or any other vessel in accordance with the descriptions provided herein, may comprise a hook, a latch, a rod, a fastener, an adhesive, or a combination thereof. Accordingly, a thermal protection element may be releasably or permanently coupled to a vessel.

As another example of a thermal protection element, FIGS. 15A-15D illustrate the thermal protection element 350 that comprises a base 1710. The base 1710 may be configured to reduce or eliminate heat transfer from the vessel 230 to a mounting surface (e.g., countertop) to avoid burning or otherwise damaging the mounting surface. The base 1710 may comprise similar materials as the base 1610. Furthermore, the base 1710 may engage with the vessel 330 in a similar fashion as the description provided for the base 1610 engaging with the vessel 230. That is, the vessel 330 may be coupled to the base 1710 via a friction fit (e.g., with one or more depressions, grooves, or valleys of the base 1710), a fastener, and/or an adhesive.

Similar to the thermal protection element 250, the thermal protection element 350 comprises a plurality of legs. As shown in FIGS. 15A-15D, the thermal protection element 350 comprises a first leg 1712a and a second leg 1712b. Each of the legs 1712a, 1712b are integrally formed with the base 1710. The first leg 1712a extends from the first end of the base 1710 and second leg 1712b extends from the second end of the base 1710. Each of the legs 1712a, 1712b comprise a plurality of feet. For example, as shown in FIG. 17D, the first leg 1712a comprises a first foot 1720a and a second foot 1720b. The first and second feet 1720a, 1720b are positioned on opposite sides of the first end, such that each of the first and second feet 1720a, 1720b are positioned underneath a corner of the base 1710. Likewise, the second leg 1712b comprises a third foot 1720c and a fourth foot 1720d. The third and fourth feet 1720c, 1720d are positioned on opposite sides of the second end, such that each of the third and fourth feet 1720c, 1720d are positioned underneath a corner of the base 1710.

Similar to the description provided for the legs 1612a, 1612b, each of the legs 1712a, 1712b of the thermal protection element 350 may comprise a height. For example, the height of each of the legs 1712a, 1712b may be between about 0.1 inches and about 2 inches, including about 0.1 inches, about 0.25 inches, or about 0.5 inches. Each of the legs 1712a, 1712b may comprise the same height or different heights. Accordingly, an air gap between the base 1710 and the mounting surface may be formed such that heat transfer therebetween may be diminished or eliminated.

In some variations, the bases 1610, 1710 may further comprise a thermal radiation shield. The thermal radiation shield may prevent at least some heat from radiating from the bases 1610, 1710 and/or vessel to a mounting surface. The thermal radiation shield may cover at least a portion of a bottom surface of the bases 1610, 1710. In an aspect, the thermal radiation shield can include exposed metal components on any surface of the base or handles, including on a top surface or a bottom surface of the base and handles to further absorb and block radiation and heat from the container. The size and/or position of the thermal radiation shield may be adjusted to accommodate the base mounting legs. That is, the thermal radiation shield may comprise a shape with one or more cut-outs to accommodate the base mounting legs. The thermal radiation shield may be manufactured from a thermally insulating material, such as a metal, plastic, or combination thereof.

Figure 15A:
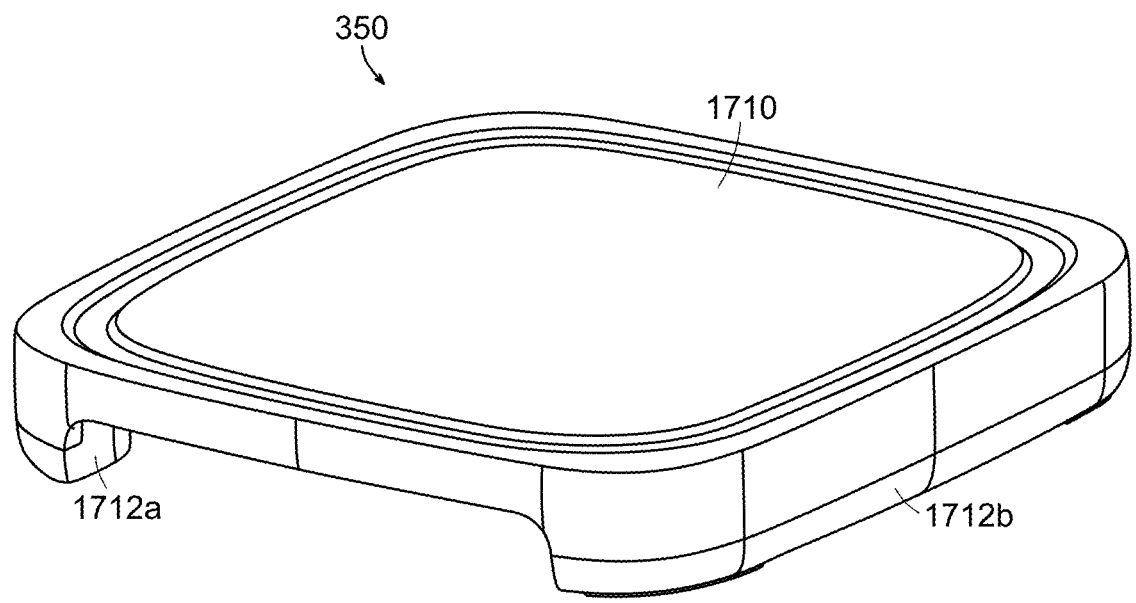
FIG. 15A is a perspective view of a thermal protection element of the cooking system of FIG. 2A.
Figure 15B:
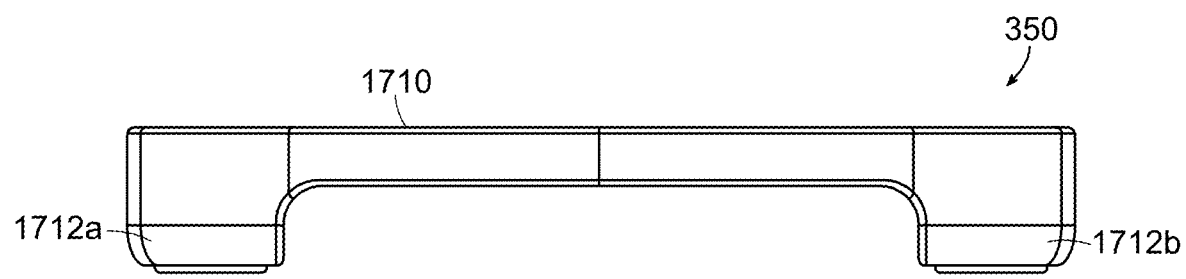
FIG. 15B is a side view of the thermal protection element of FIG. 15A.
Figure 15C:
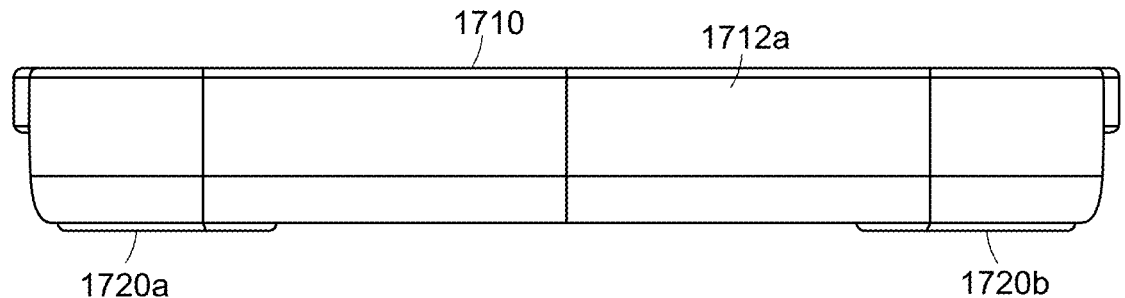
FIG. 15C is another side view of the thermal protection element of FIG. 15A.
Figure 15D:
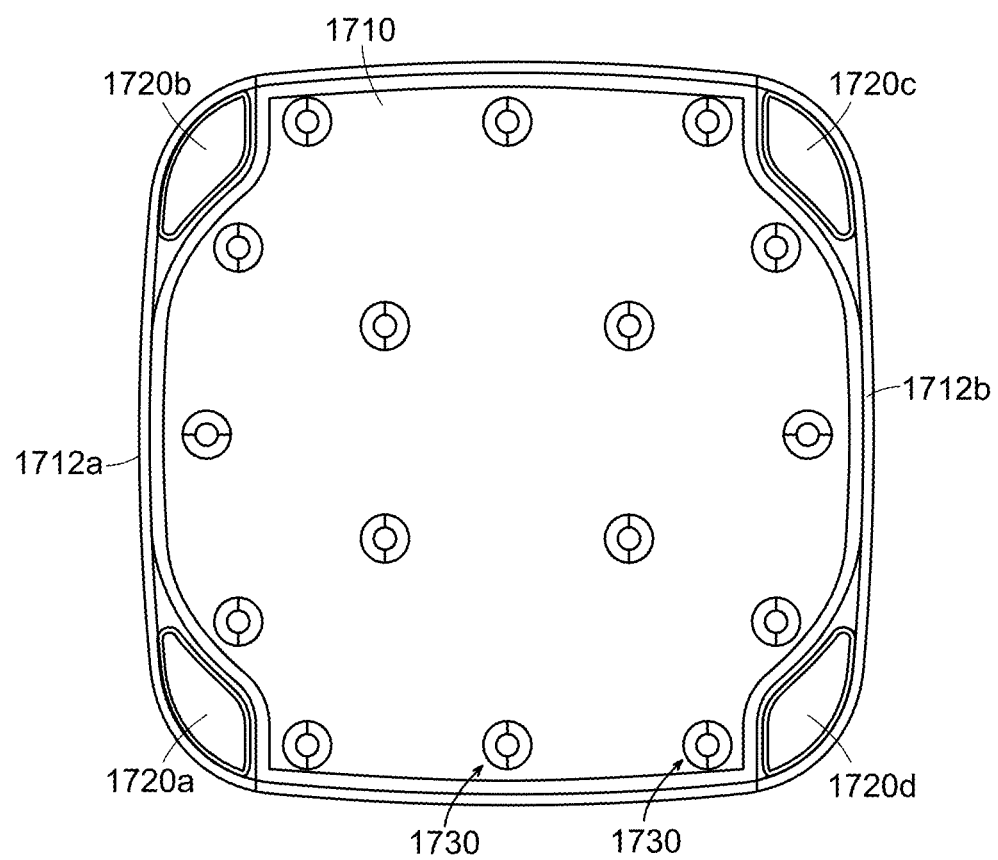
FIG. 15D is a bottom view of the thermal protection element of FIG. 15A.

As shown in FIG. 15D, the thermal protection element 350 further comprises a plurality of depressions 1730 configured to facilitate coupling to a thermal radiation shield. The plurality of depressions 1730 may be in a bottom surface of the thermal protection element 350. In particular, the plurality of depressions 1730 may be configured to receive a fastener. For example, a thermal radiation shield (not shown) may be coupled to the thermal protection element 350 via a fastener (e.g., screw) positioned in each of the plurality of depressions 1730. In some variations, one or more of the thermal protection element 350 and thermal radiation shield may be further fastened to the vessel 330. The thermal radiation shield may cover at least a portion of the bottom surface of the base 1710. The thermal radiation shield may be manufactured from a thermally insulating material, such as a metal, plastic, or combination thereof. A similar thermal radiation shield may be coupled to any of the vessels or thermal protection elements described herein, such as the thermal protection element 250. Accordingly, the thermal radiation shield may prevent at least some heat from radiating from the bases 1610, 1710 and/or vessels 230, 330 to a mounting surface.

Figure 9A:
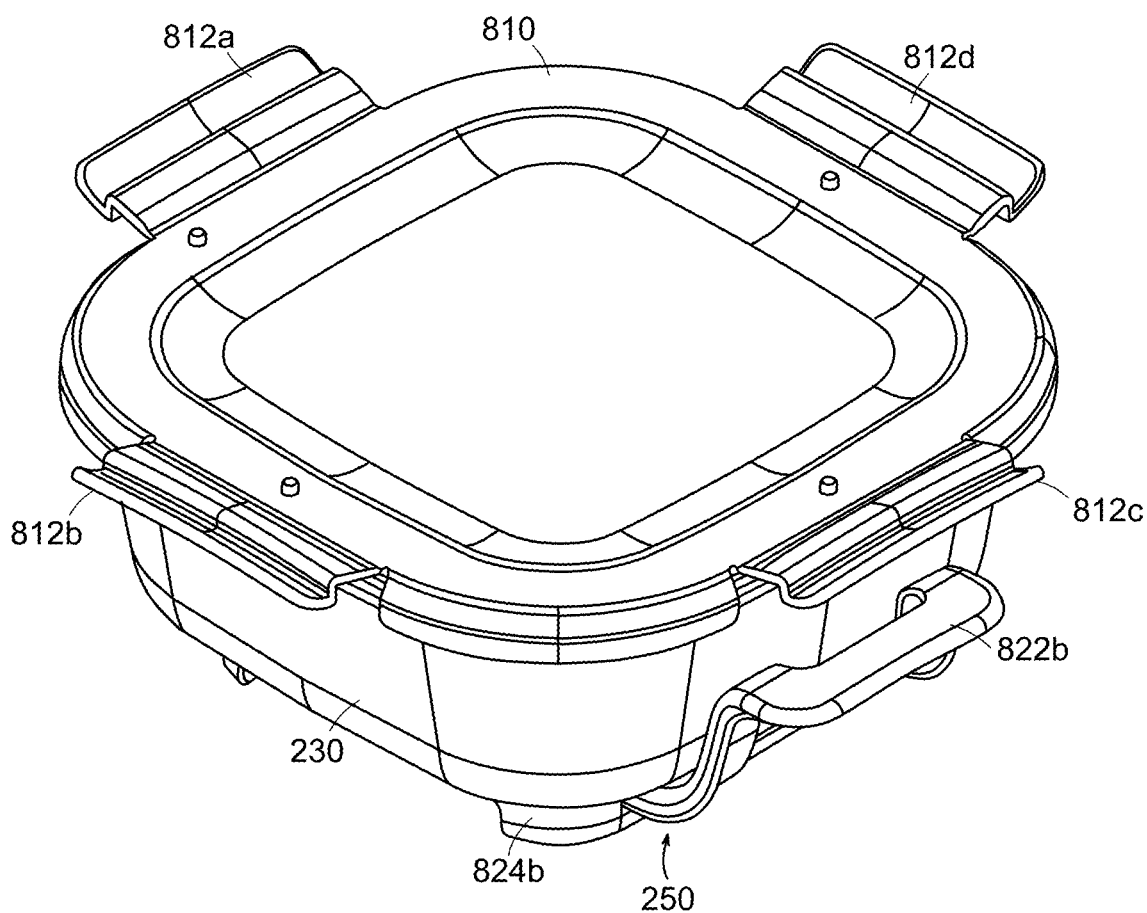
FIG. 9A is a perspective view of a vessel, a storage lid, and a thermal protection element according to the subject matter described herein.
Figure 9B:
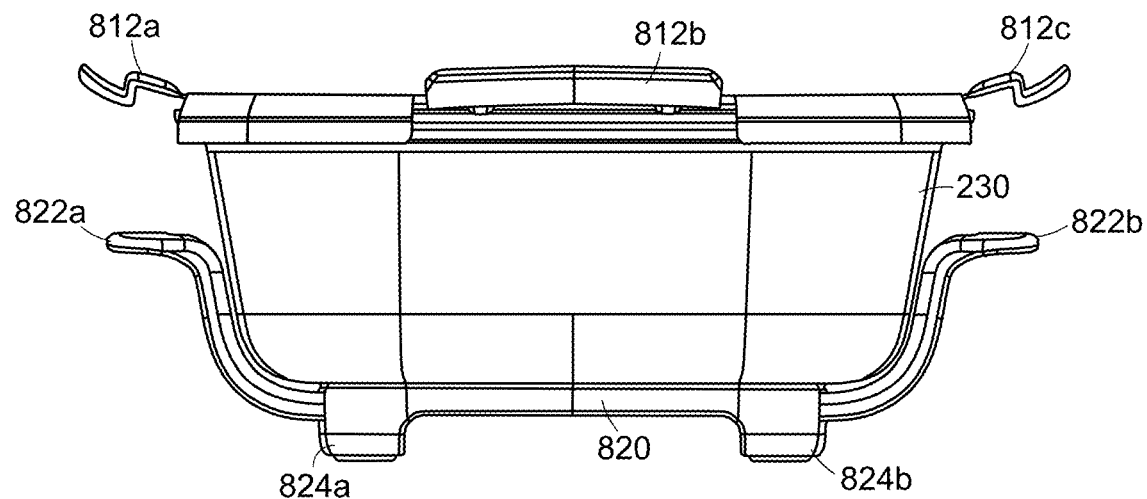
FIG. 9B is a side view of the vessel, storage lid, and thermal protection element of FIG. 9A.
Figure 9C:
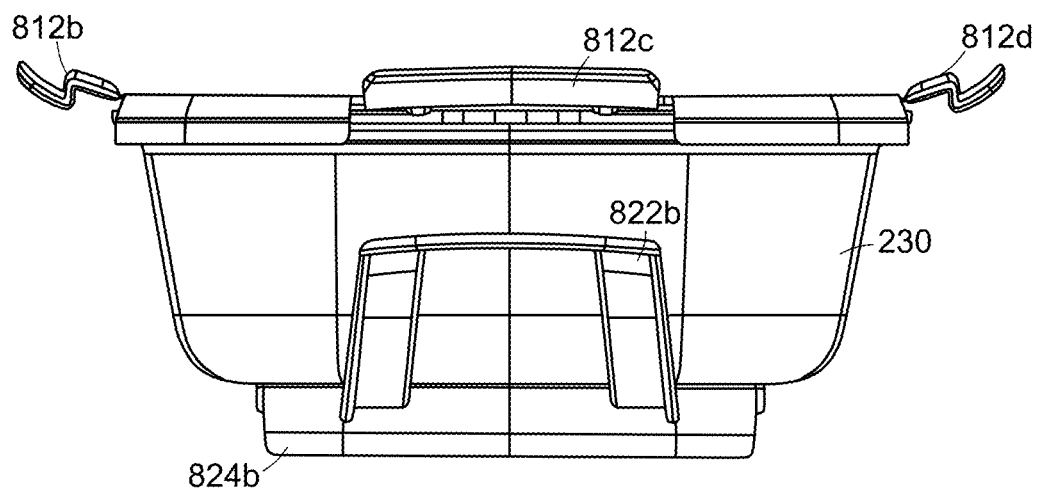
FIG. 9C is another side view of the vessel, storage lid, and thermal protection element of FIG. 9A.

In some variations, the vessels described herein may further comprise a lid configured to cover the opening when not otherwise covered by a cooking device. The lid (e.g., a storage lid) may provide an air-tight seal of the opening, such that any food contained within the cavity may be isolated from an external environment. The storage lid may be releasably coupled to the vessel by one or more clamps positioned around a perimeter of the storage lid. For example, FIGS. 9A-9C illustrate the vessel 230 releasably coupled to a storage lid 810. The storage lid 810 comprises a first clamp 812a, a second clamp 812b, a third clamp 812c, and a fourth clamp 812d. Each of the clamps 8412a-812d is configured to releasably couple to a sidewall of the vessel 230. The clamps 812a-812d may rotate about a clamp joint (i.e., pivot point) such that each clamp may engage with an edge (e.g., lip) of the vessel's opening.

Figure 10A:
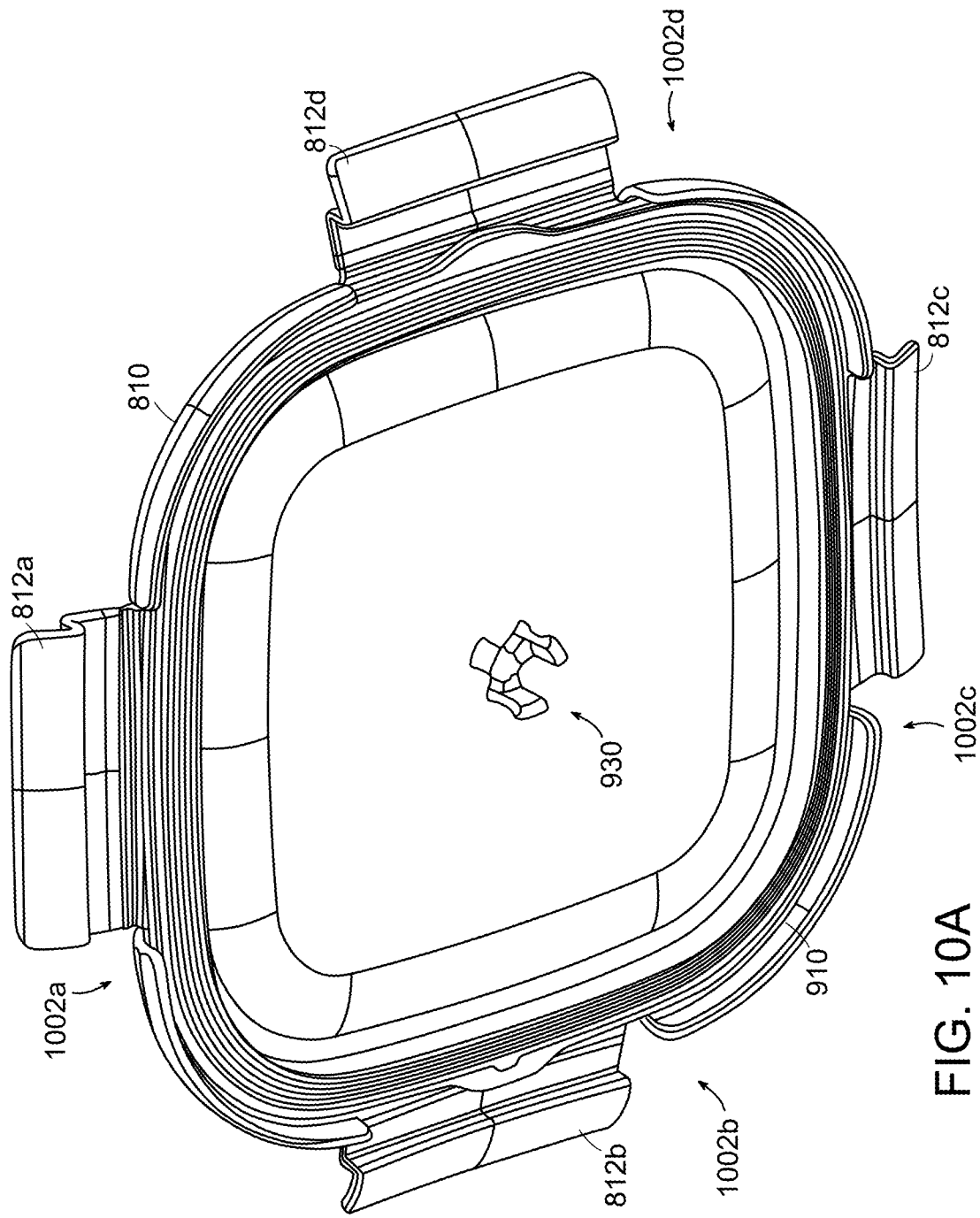
FIG. 10A is a perspective view of the storage lid of FIG. 9A.
Figure 10B:
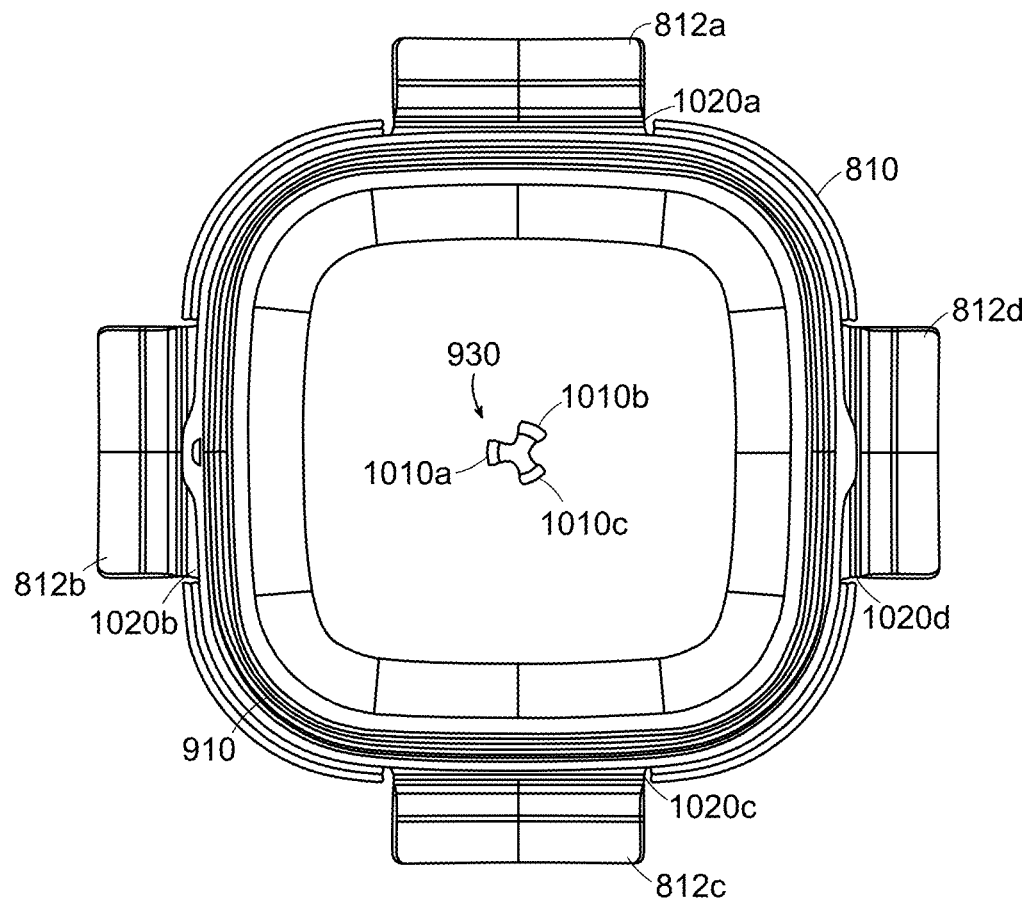
FIG. 10B is a bottom view of the storage lid of FIG. 10A.
Figure 10C:
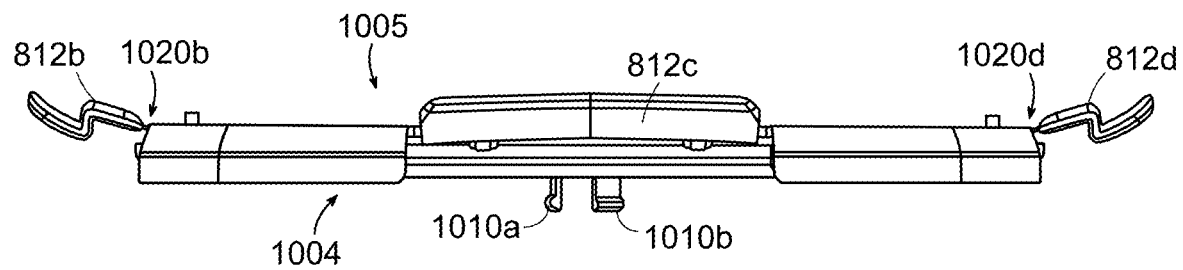
FIG. 10C is a side view of the storage lid of FIG. 10A.

FIGS. 10A-10C illustrate further details of the storage lid 810. The storage lid 810 comprises a first surface 1004 (e.g., a bottom surface) and a second surface 1005 (e.g., a top surface). Additionally, the storage lid 810 comprises a rectangular shape defined by a first side 1002a, a second side 1002b, a third side 1002c, and a fourth side 1002d. Each of the clamps 812a-812d are positioned at a midpoint of a length of each respective side 1002a-1002d. In particular, the first clamp 812a extends from the first side 1002a, the second clamp 812b extends from the second side 1002b, the third clamp 812c extends from the third side 1002c, and the fourth clamp 812d extends from the fourth side 1002d. Each of the clamps 812a-812d are configured to rotate about a pivot joint. For example, the storage lid 810 comprises a first clamp joint 1020a coupled to the first clamp 812a, a second clamp joint 1020b coupled to the second clamp 812b, a third clamp joint 1020c coupled to the third clamp 812c, and a fourth clamp joint 1020d coupled to the fourth clamp 812d.

In some variations, the storage lid may further comprise a seal, such as a rubber seal, that may be configured to further reduce fluid (e.g., air) transfer between the cavity and the external environment. For example, as shown in FIG. 10B, the storage lid 810 comprises a seal 910. The seal 910 extends around a perimeter of the storage lid 810. The seal 910 is configured to contact a lip of a vessel, such as the vessel 230. Once in contact with the vessel 230, the clamps 812a-812d may be engaged with the sidewalls of the vessel 230 in order to squeeze the seal 910 closely with the lip of the vessel 230. For example, rotation of the clamps 812a-812d about the respective clamp joints 1020a-1020d and/or the positioning of the clamps 812a-812d relative to the lengths of the sides 1002a-1002d facilitates relatively even distribution of forces around the perimeter of the storage lid 810 and the seal 910. Accordingly, an air-tight seal may be formed between the storage lid 810 and the vessel 230.

In some variations, the storage lids described herein may also function as thermal protection elements. That is, after a cooking device may be decoupled from the vessel, the vessel may be hot and the opening may be uncovered. Therefore, the vessel protection lid may be placed over the opening such that opening may be substantially sealed. The vessel protection lid may further comprise one or more lid handles. The one or more lid handles may extend from one or more sides of the vessel protection lid. In some variations, the one or more lid handles may be configured to cover one or more handles of the vessel. In particular, the one or more lid handles may surround at least a portion of the vessel handles such that a user may grasp the lid handles rather than the vessel handles. Advantageously, avoiding contact with the vessel handles may avoid risks associated with high temperatures, such as burns or other injuries. The vessel protection lid may be used alone or in combination with any of the thermal protection elements described herein.

Figure 13A:
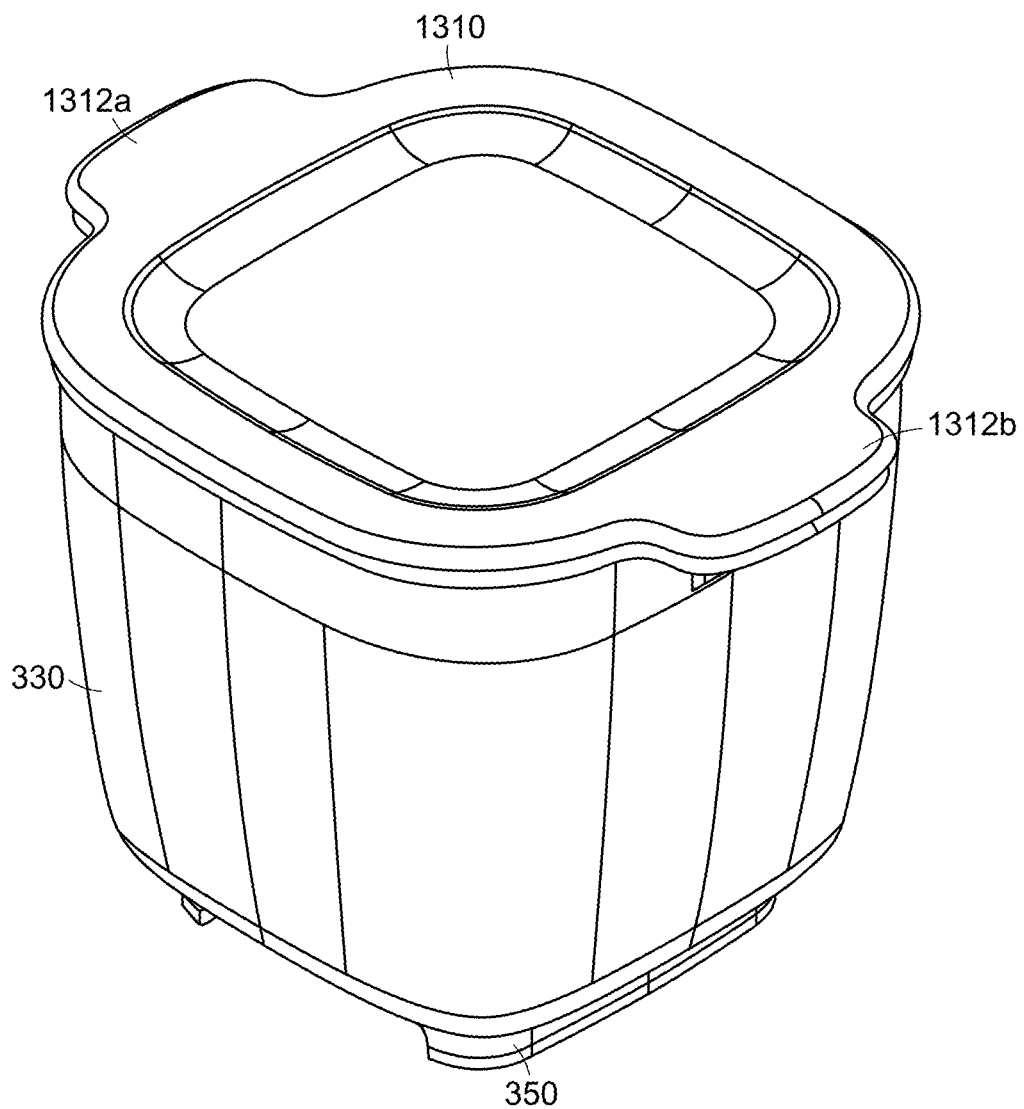
FIG. 13A is a perspective view of a vessel of the cooking system of FIG. 2A.
Figure 13B:
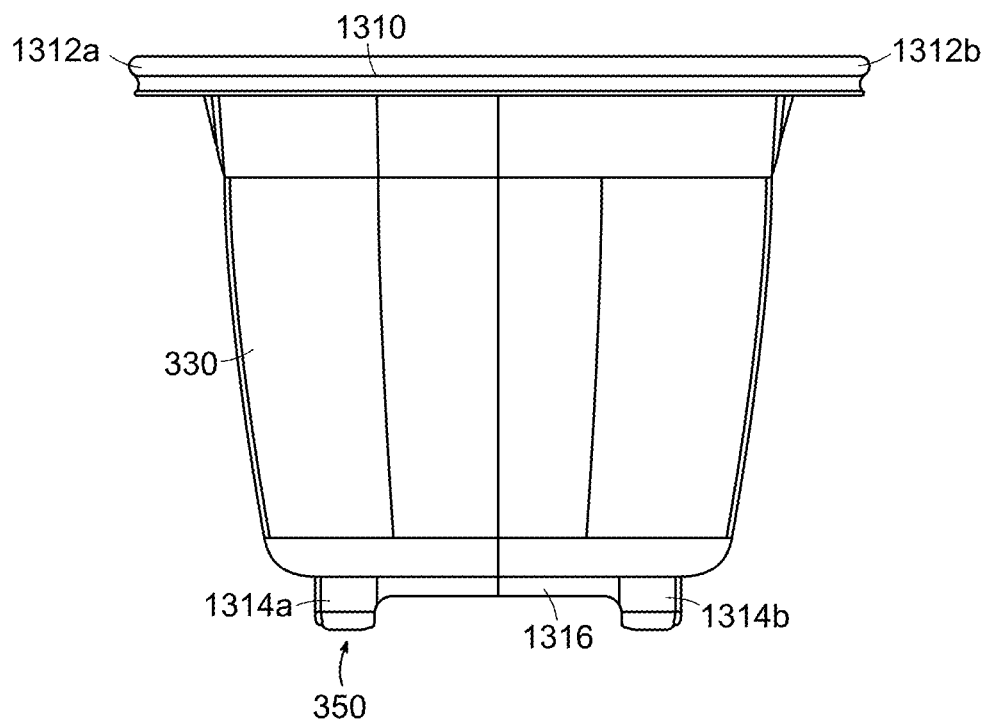
FIG. 13B is a side view of the vessel of FIG. 13A.
Figure 13C:
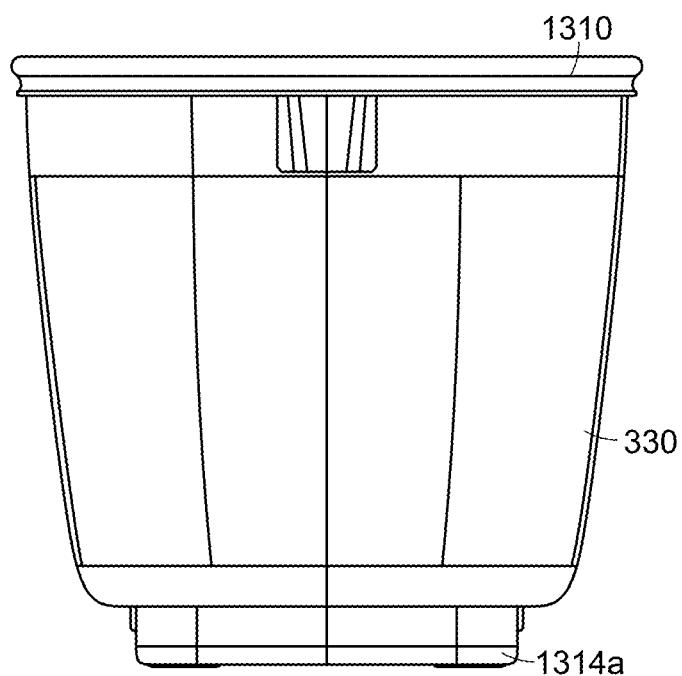
FIG. 13C is another side view of the vessel of FIG. 13A.
Figure 14A:
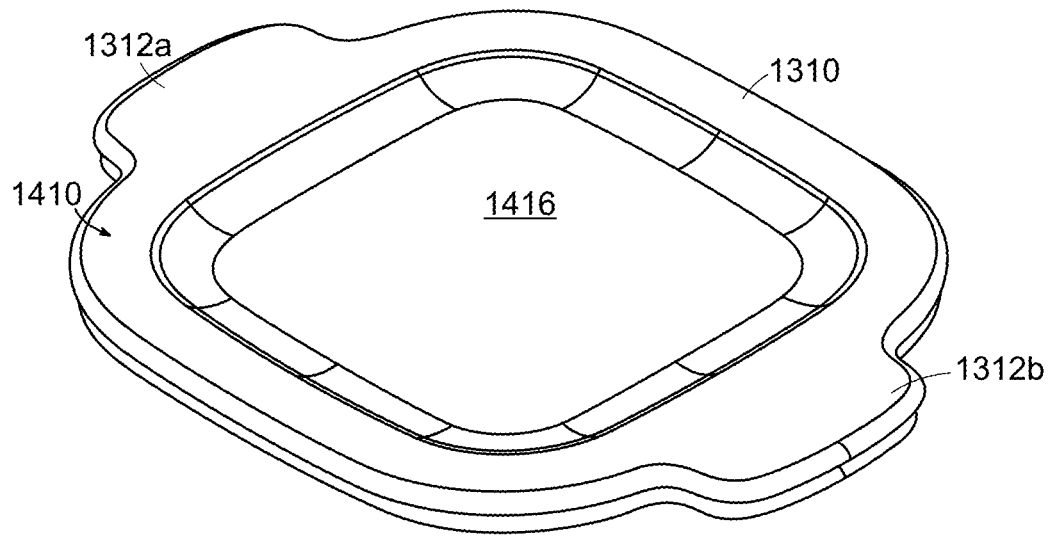
FIG. 14A is a perspective view of a lid of the vessel of FIG. 13A.
Figure 14B:
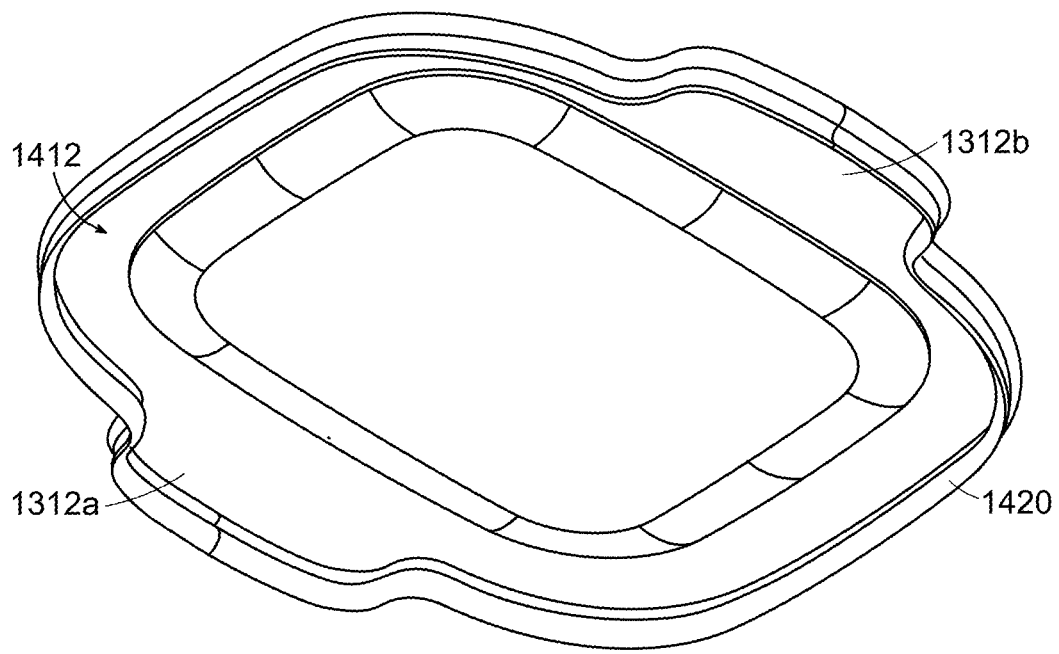
FIG. 14B is another perspective view of the lid of FIG. 14A.

For example, FIGS. 13A-13C illustrate the vessel 330 releasably coupled to a vessel protection lid 1310. The vessel protection lid 1310 comprises a first lid handle 1312a and a second lid handle 1312b. Each of the lid handles 1312a, 1312b cover at least a portion of a vessel handle (not shown). The vessel protection lid 1310 comprises a first surface 1410 and a second surface 1412. The first surface 1410 comprises a depression 1416. The depression 1416 is configured receive another vessel. Extending around a periphery of the second surface 1412 is a flange 1420. The flange 1420 is configured to receive a lip of the vessel 330. In particular, the flange 1420 comprises a groove and an extension, such that the lip of the vessel may be received within the groove and the extension contacts an outer surface of the vessel. The flange 1420 comprises a thin, flexible component such that an air-tight seal may be formed when releasably coupled to the vessel. The vessel protection lid 1310 comprises a thermally non-conductive material, such as rubber or a plastic.

Figure 7A:
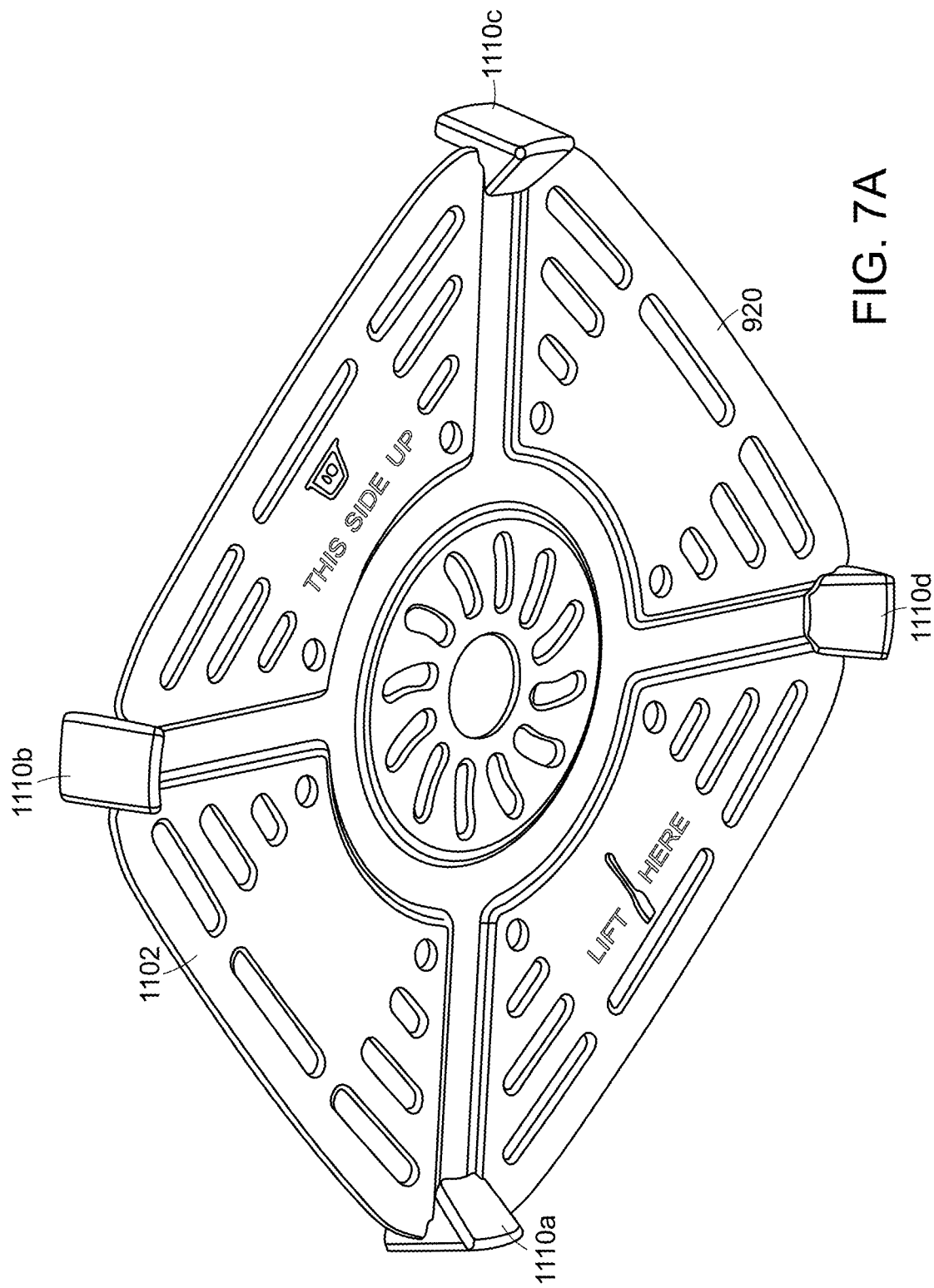
FIG. 7A is a perspective view of the crisper tray of the cooking system of FIG. 1A.
Figure 7B:
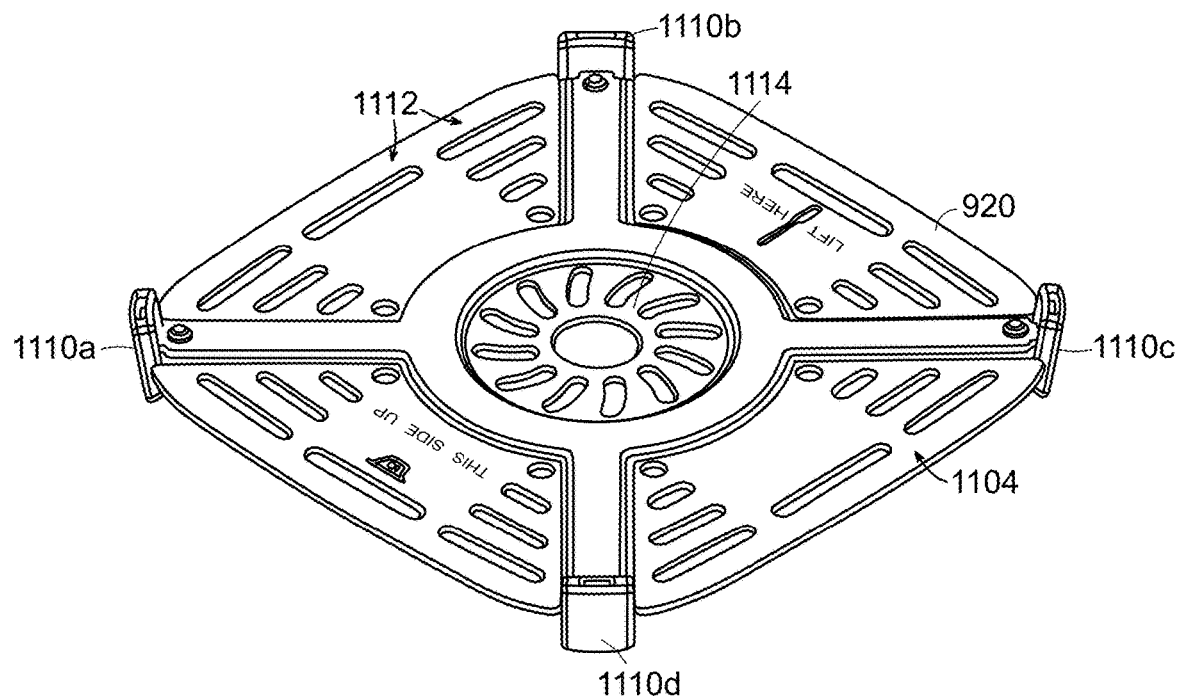
FIG. 7B is another perspective view of the crisper tray of FIG. 7A.
Figure 7C:
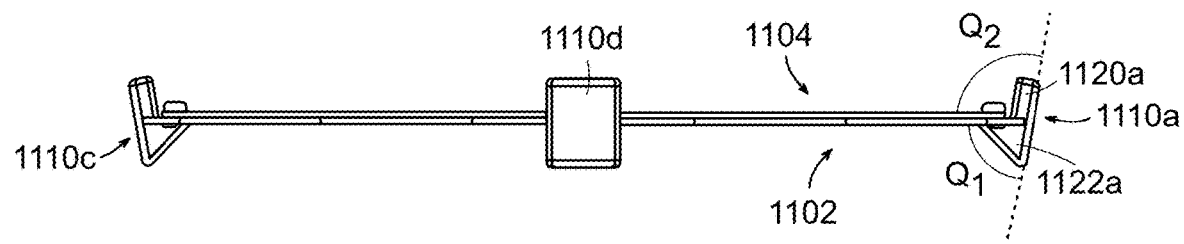
FIG. 7C is a side view of the crisper tray of FIG. 7A.

The cooking device may comprise one or more crisper trays that may be slidably received by the vessel cavities described herein. The crisper tray may be used to increase heat transfer to food contained within the vessel. The increase in heat transfer facilitated by the crisper tray may increase a temperature of the food within the vessel and thus increase a level of crispiness of an external surface of the food. The crisper tray may comprise a planar base. For example, FIGS. 7A-7C illustrate a crisper tray 920. The crisper tray 920 comprises a planar base with a first surface 1102 and a second surface 1104. Either of first or second surfaces 1102, 1104 may be an upper surface, such that the crisper tray 920 may be reversible. The planarity of the crisper tray 920 may facilitate relatively even heat transfer between the crisper tray 920 and one or more of a heating element and food within a vessel.

Furthermore, the crisper tray may comprise one or more openings to facilitate fluid flow. For example, air may flow through the one or more openings to and/or from any food within the vessel, which may contribute to a crisping effect of the food. As shown in FIGS. 7A-7C, the crisper tray 920 comprises a plurality of openings 1112 and a central opening 1114. The plurality of openings 1112 are positioned in a grid pattern and comprise a combination of circular, oval, and rectangular openings with rounded corners. The rectangular openings may comprise a length and a width, where the length is greater than the width. The circular openings may comprise a diameter, and the circular openings may be positioned at a central axis of the planar base. The plurality of openings 1112 may be arranged across the crisper tray 920 in a grid pattern.

One or more openings of the plurality of openings 1112 may be configured to receive a tool (e.g., a fork). The tool may be used to releasably engage the crisper tray in order to pick up and/or move the crisper tray 920. Accordingly, the tool may advantageously mitigate risks associated with a user directly touching the crisper tray 920. For example, the one or more openings of the plurality of openings 1112 may be arranged proximate to an edge of the base, such that a distance between a user's hand and the crisper tray may be maximized. Advantageously, maximizing the distance between the user's hand and the crisper tray may mitigate risks (e.g., burns, injuries) associated with heat transfer from the crisper tray to the user's hand.

The crisper tray may comprise one or more protrusions configured to contact an inner surface of a vessel cavity. The height at which the crisper tray is positioned within the vessel cavity may correspond to one or more protrusions. For example, the one or more protrusions may extend from one or more edges of the planar base and may be angled relative to the planar base, such that the angled protrusions contact the inner surface of the vessel cavity and the base avoids contact with the inner surface of the vessel cavity. As shown in FIGS. 7A-7C, the crisper tray 920 comprises a first protrusion 1110a, a second protrusion 1110b, a third protrusion 1110c, and a fourth protrusion 1110d. Each of the protrusions 1110a-1110d are angled relative to the first and second surfaces 1102, 1104. For example, the protrusion 1110a comprises a first portion 1120a angled at an angle $\theta_1$ relative to the first surface 1102 and a second portion 1122a angled at an angle $\theta_2$ relative to the second surface 1104. The angles $\theta_1$ and $\theta_2$ are different than each other, and each may be between about 5 degrees and about 60 degrees. Each of the protrusions 1110a-1110d may comprise a height relative to the first and second surfaces 1102, 1104. The height of the protrusions 1110a-1110d may be between about 0.1 inches and about 2 inches, including about 0.1 inches, about 0.25 inches, or about 0.5 inches. Each of the protrusions 1110a-1110d may comprise the same height or different heights. For example, the four protrusions 1110a-1110d may comprise a substantially equal height, such that the crisper tray 920 may be positioned level within the vessel. The relative angle and/or height of the protrusions 1110a-1110d may correspond to the height at which the crisper tray 920 is positioned relative to the bottom of the vessel cavity. In particular, the crisper tray 920 may be positioned at a relatively lower position within the vessel cavity when the first surface 1102 is facing the bottom of the vessel cavity (i.e., a first configuration) and be positioned at a relatively higher position within the vessel cavity when the second surface 1104 is facing the bottom of the vessel cavity (i.e., a second configuration). Advantageously, a user may alternate between the first and second configurations by using the tool and openings described previously to turn the crisper tray 920 over.

Figure 8:
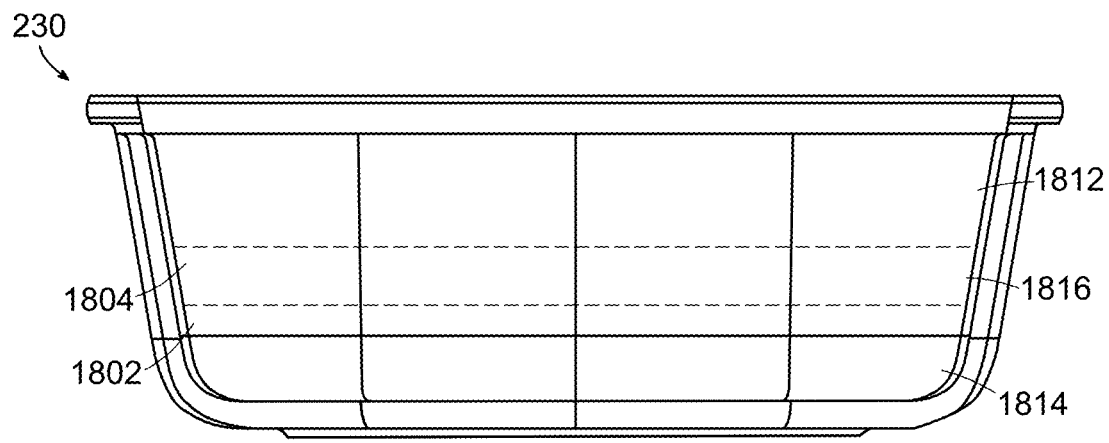
FIG. 8 is a cross-sectional view of the vessel of FIG. 4A.

The reversibility of the crisper trays described herein may facilitates cooking zones of various sizes. For example, FIG. 8 illustrates the vessel 230 with a crisper tray in a first position 1802 (i.e., the first configuration) and a second position 1804 (i.e., the second configuration). The first position 1802 may correspond to a relatively lower position of the crisper tray within the vessel cavity when a first surface, such as the first surface 1102 shown in FIGS. 7A-7C, is facing the bottom of the vessel cavity. The second position 1804 may correspond to a relatively higher position of the crisper tray within the vessel cavity when a second surface, such as the second surface 1104 of FIGS. 7A-7C, is facing the bottom of the vessel cavity. When the crisper tray is in the first position 1802, a first cooking volume 1814 may be defined below the crisper tray and a second cooking volume 1812 may be defined above the crisper tray. Accordingly, a first food may be positioned in the first cooking volume 1814 and/or a second food may be positioned in the second cooking volume 1812 during a cooking process. When the crisper tray is in the second position 1804, a third cooking volume 1816 may be added to the first cooking volume 1814 and thus subtracted from second cooking volume 1812. Accordingly, a larger portion of food may be positioned within the combined first and third cooking volumes 1814, 1816 and a smaller portion of food may be positioned within the second cooking volume 1812. In either position of the crisper tray, foods positioned above the crisper tray may receive relatively more heat from the cooking device than foods positioned above the crisper tray. For example, food that may be relatively sensitive to heat (e.g., starches, vegetables) may be positioned underneath the crisper tray whereas relatively more durable food (e.g., proteins) may be positioned above the crisper tray. A crisper tray may be used with any of the vessels described herein.

In some variations, the crisper tray 920 may comprise 1, 2, 3, 5, 6, 7, 8, 9, or more protrusions positioned circumferentially around a perimeter of the planar base. In variations with a plurality of protrusions, each of the protrusions may be spaced equally around the perimeter of the planar base but need not. The one or more protrusions may be manufactured from a rubber (e.g., silicone), plastic, metal, or combination thereof. The one or more protrusions may or may not be the same material as the planar base.

Figure 11:
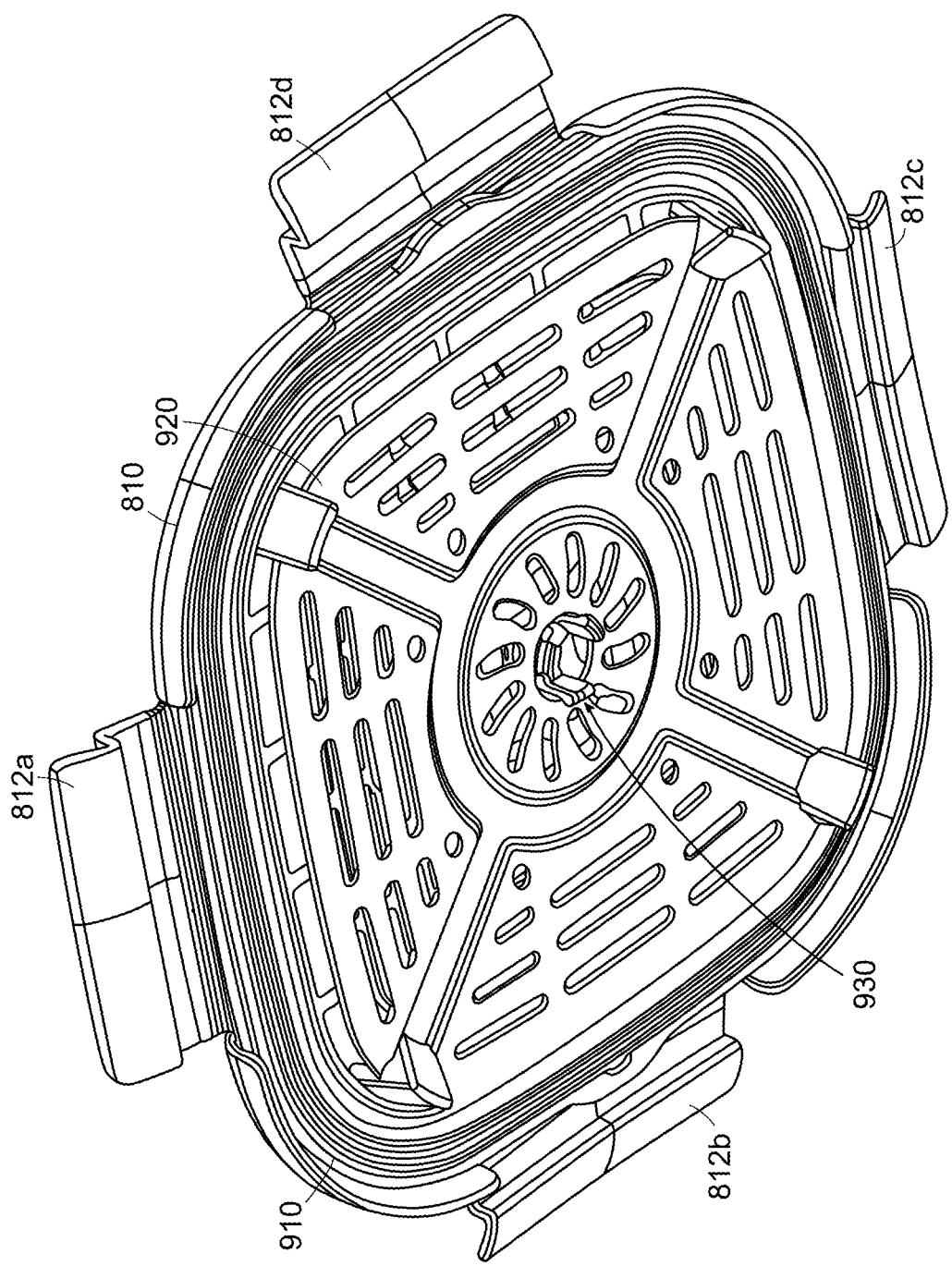
FIG. 11 is a perspective view of a storage lid and a crisper tray.

The crisper tray may be configured to be releasably coupled to the storage lid of a given vessel when not in use. For example, FIG. 11 illustrates the storage lid 810 releasably coupled to the crisper tray 920. The storage lid 810 and crisper tray 920 may be releasably coupled to facilitate compact storage thereof. The crisper tray 920 may be coupled to a bottom surface of the storage lid 810. In particular, the storage lid 810 comprises a plurality of hooks 930 configured to releasably couple to the crisper tray 920. The plurality of hooks 930 elastically deflect in order to accommodate an opening of the crisper tray 920, such that the crisper tray 920 may be easily coupled and decoupled from the storage lid 810. As shown in FIG. 10B, the plurality of hooks 930 protrude from the first surface 1004. The plurality of hooks 930 comprises a first hook 1010a, a second hook 1010b, and a third hook 1010c. In an aspect, the plurality of hooks 930 can include only a first hook and a second hook positioned opposite from one another. Each of the hooks 1010a-1010c are configured to deflect in order to accommodate the circular opening 1114 of the crisper tray 920. Accordingly, the hooks 1010a-1010c are manufactured from an elastic material, such as plastic. Therefore, the crisper tray 920 and storage lid 810 may be stowed or stored as a kit and decoupled when needed by a user. That is, a user may decouple the crisper tray 920 from the storage lid 810 in order to use either of the crisper tray 920 or storage lid 810.

In addition to utilizing different height container, the cooking system disclosed herein can include larger containers that are shallow, but have a larger cross-sectional area at the opening of the vessel in order to increase the cooking surface area of a vessel. For example, FIGS. 16-22 illustrate an embodiment of a cooking system 2000 according to the subject matter described herein. The cooking system 2000 is similar to the cooking system 200, so like elements will not be described in detail. The cooking system 2000 can include a cooking device 2002 and a vessel 2004 coupled to a thermal protection element 2006 in the form of a base. Additionally, to accommodate a larger opening vessel, such as vessel 2004, an adapter housing 2008 can be positioned between the vessel 2004 and the cooking device 2002 in order to mate the smaller cooking device 2002 with the larger vessel 2004. The cooking device 2002 is similar to the cooking device 210, an includes a bottom surface 2016, air outlets 2025, guard 2018, heating elements 2026, exhaust fan 2030, and convection fan 2032.

Figure 17:
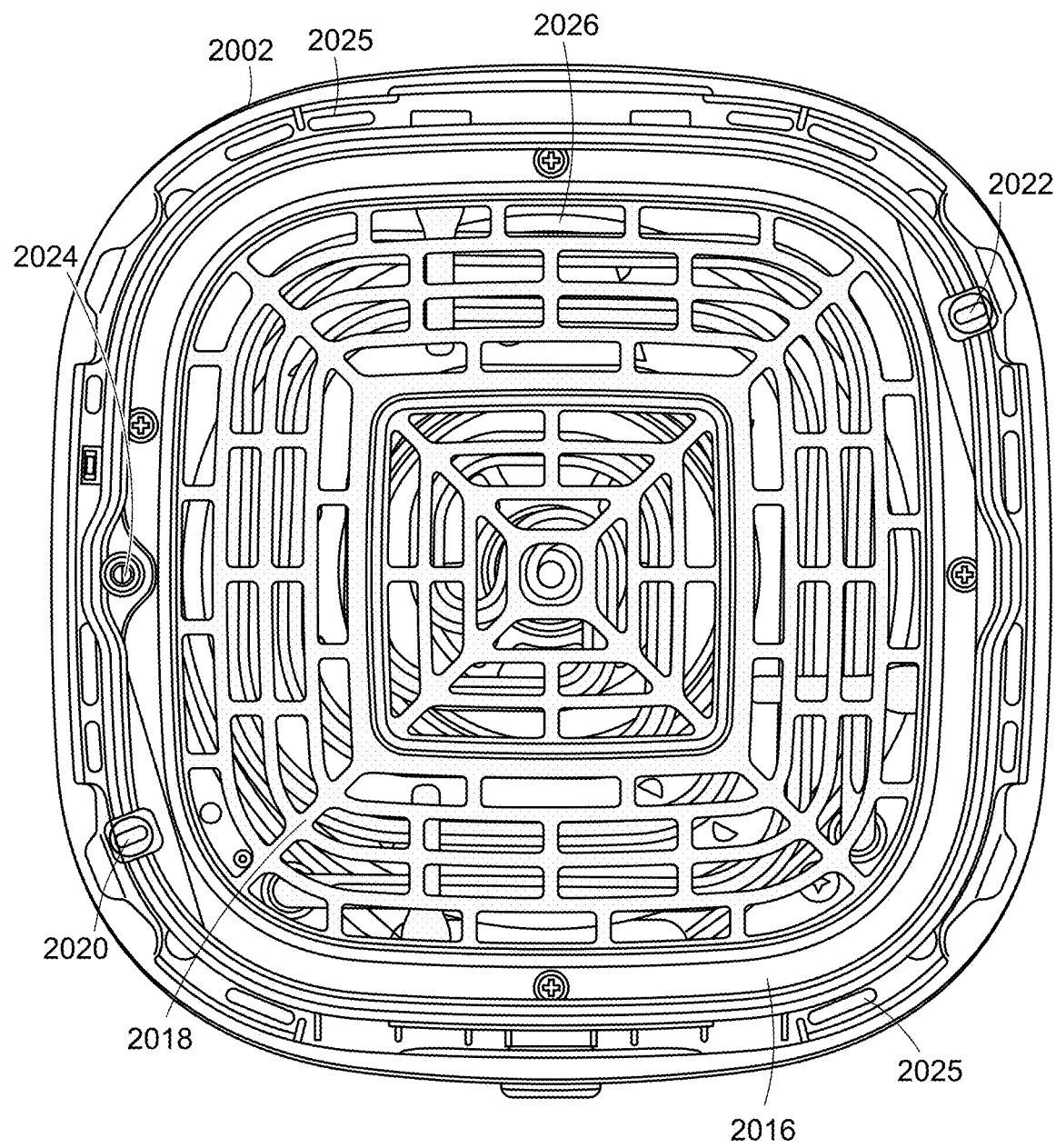
FIG. 17 is a bottom view of a cooking device of the cooking system of FIG. 16.
Figure 22:
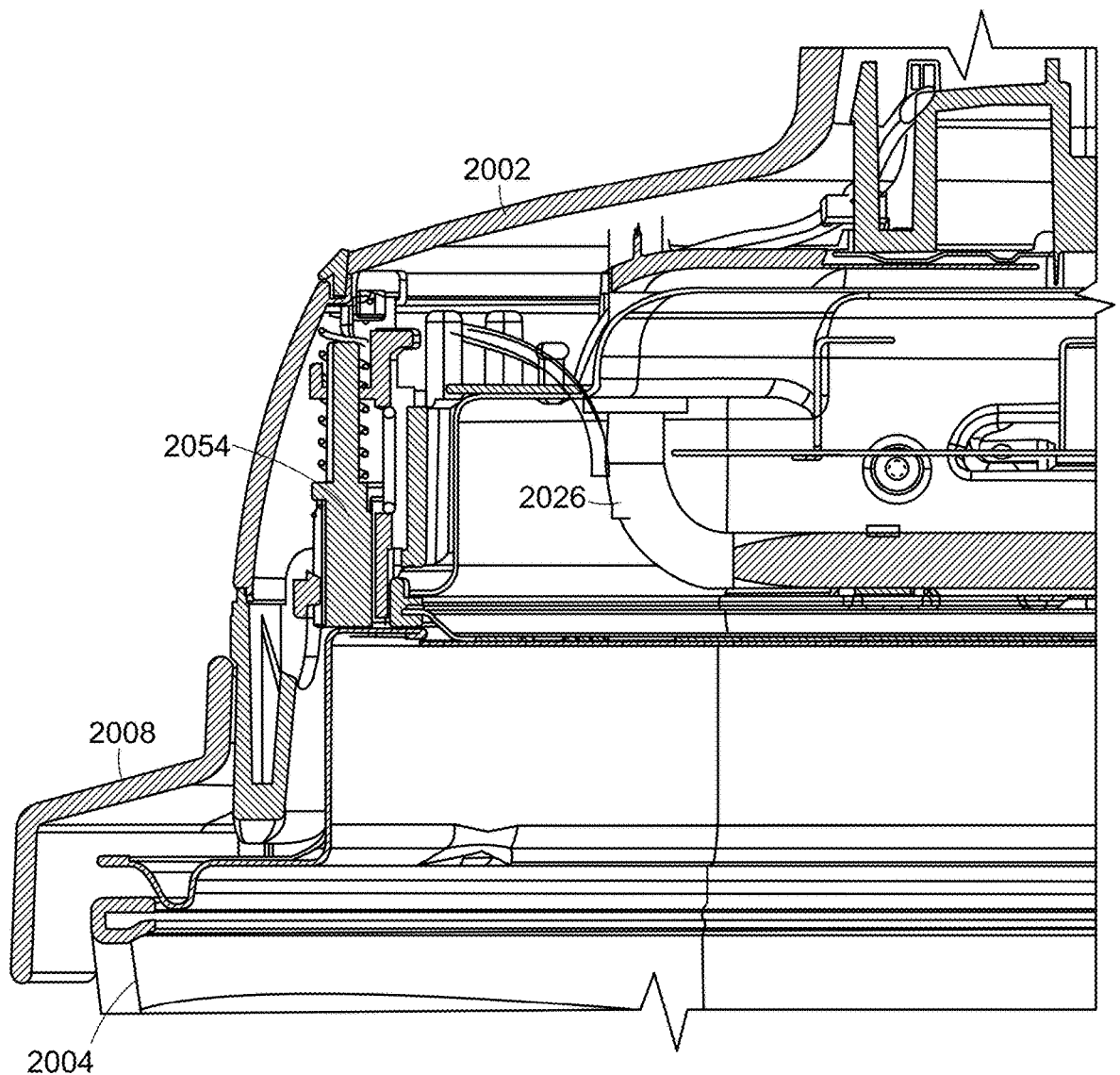
FIG. 22 is a detailed cross-sectional view of the cooking system in FIG. 19.
Figure 23:
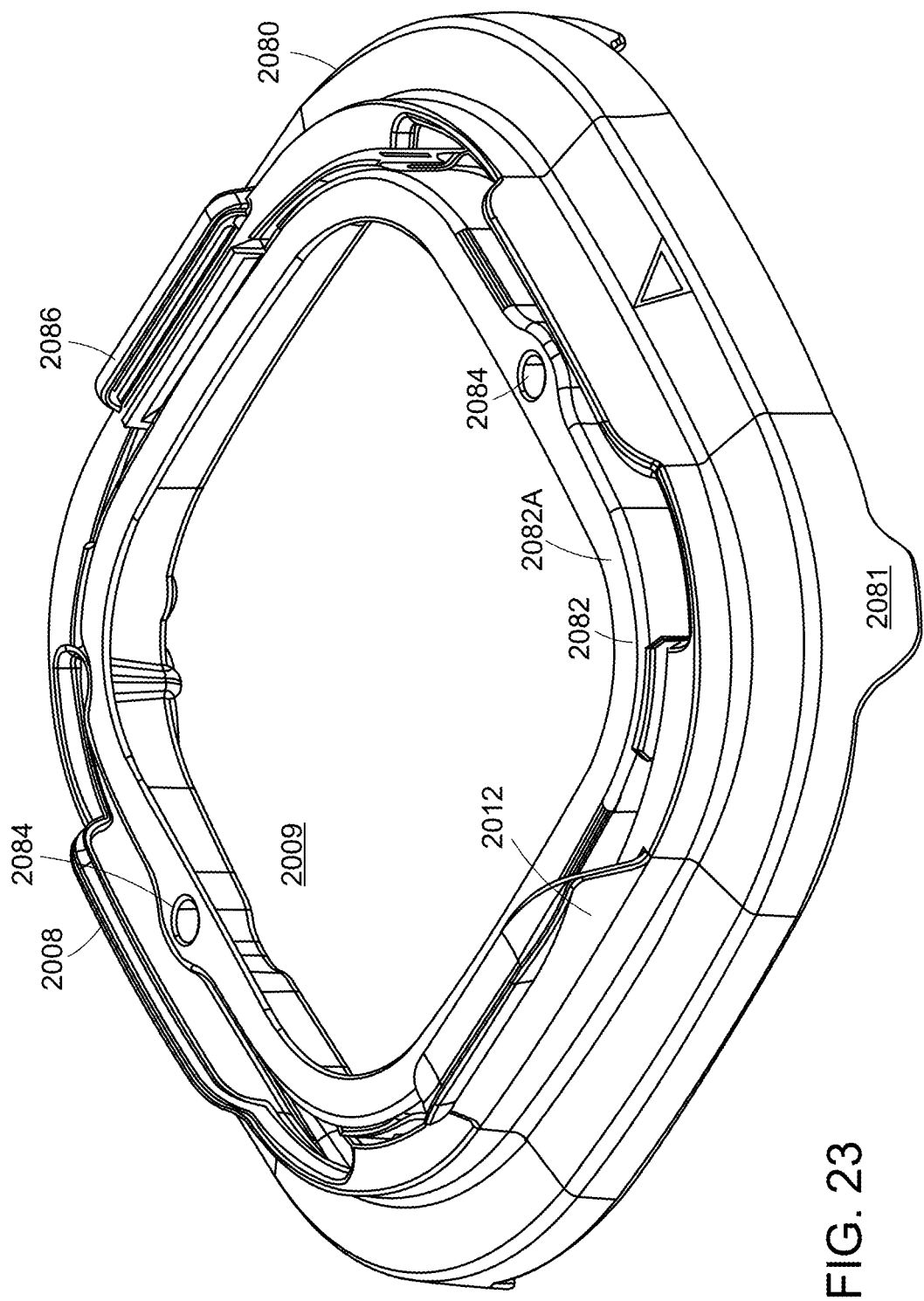
FIG. 23 is a front isolated perspective view of an adapter housing of the cooking system of FIG. 16.
Figure 24:
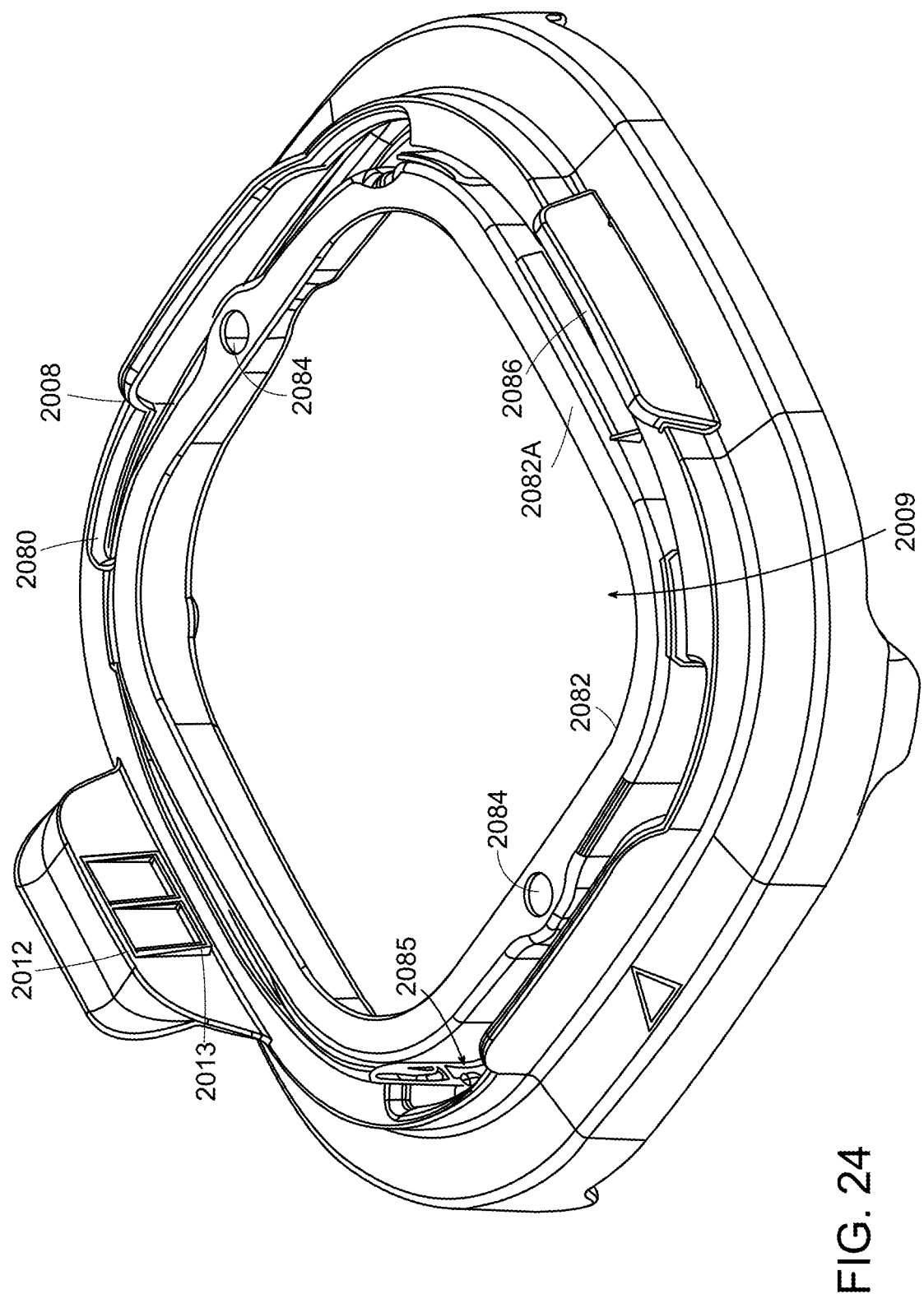
FIG. 24 is a rear perspective view of the adapter housing of FIG. 24.
Figure 25:
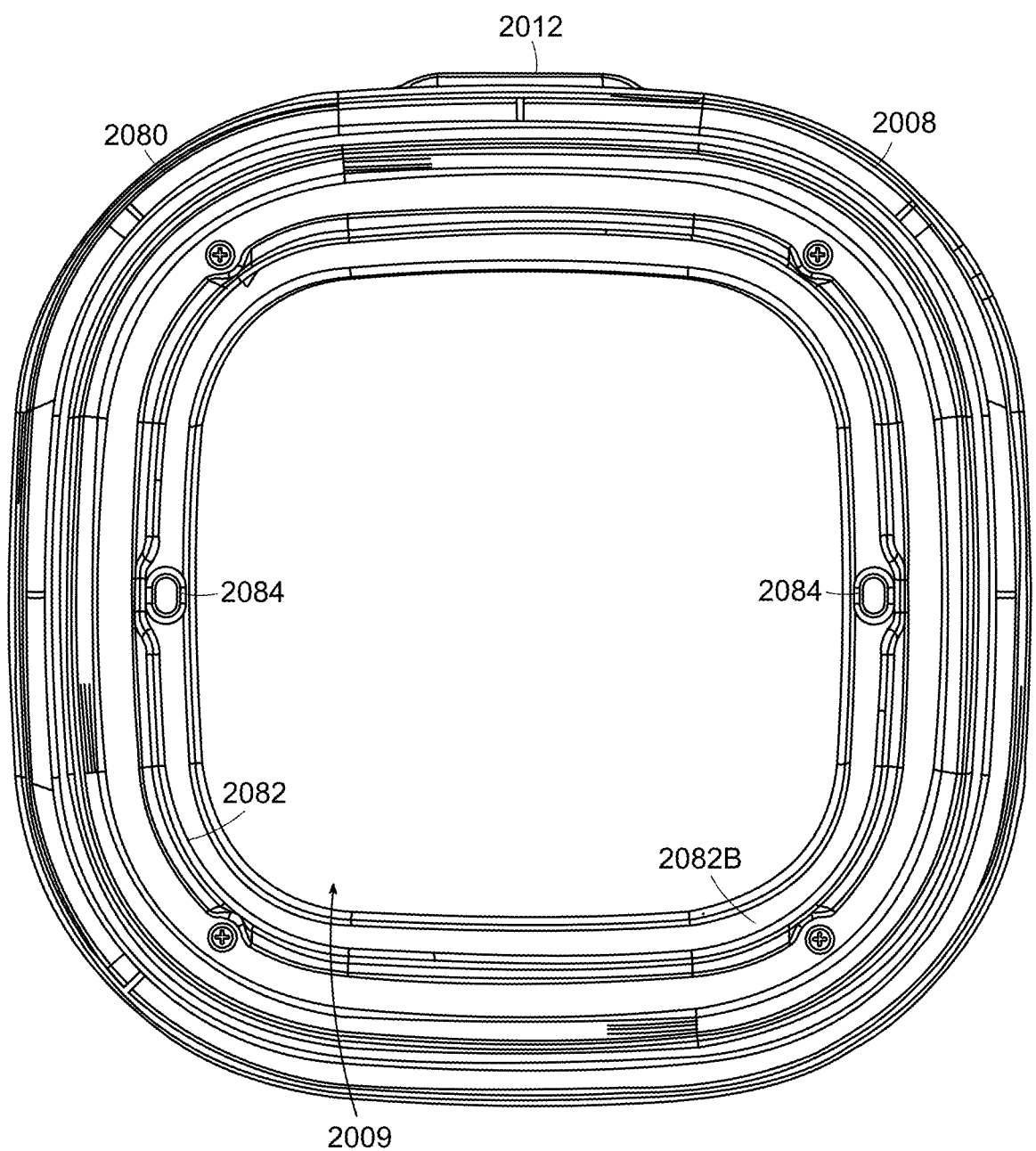
FIG. 25 is a bottom view of the adapter housing of FIG. 24.
Figure 26:
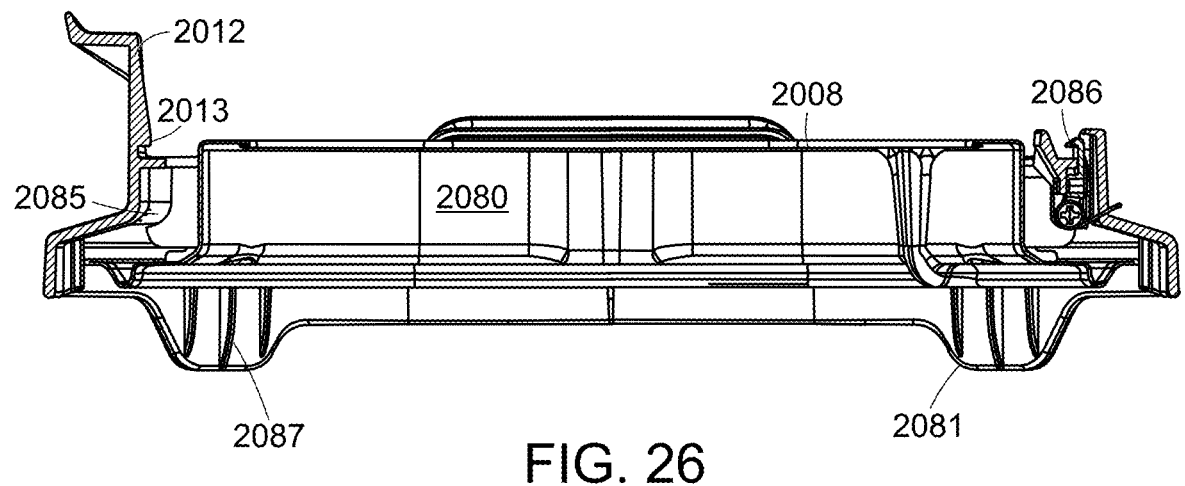
FIG. 26 is a side view of the adapter housing of FIG. 24.
Figure 27:
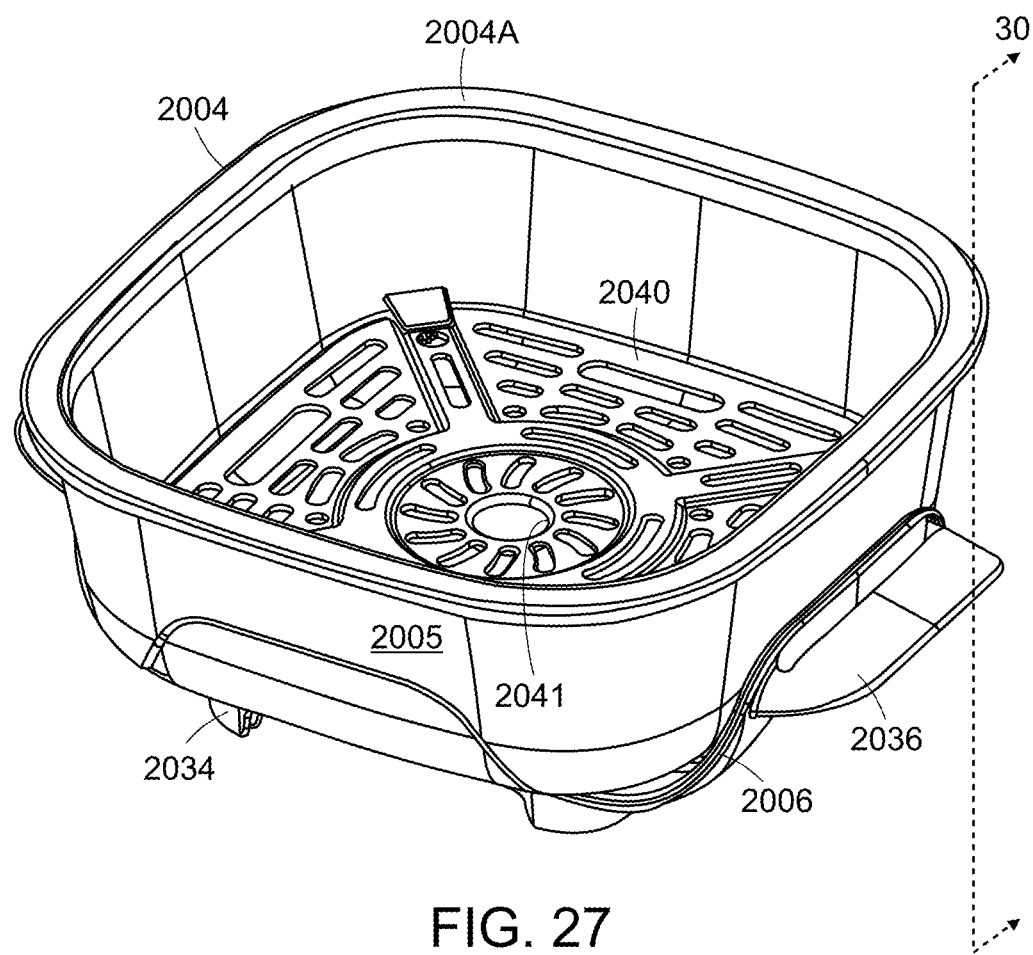
FIG. 27 is an isolated perspective view of a vessel and base of the cooking system of FIG. 16.

As shown in FIGS. 17 and 202-22, one or more vessel detection elements may be coupled to a bottom surface 2016 of the cooking device 2002. The vessel detection elements may be configured to detect one or more specific design features of the vessels. For example, the cooking device 2002 comprises a first detection sensor 2020 and a second detection sensor 2022. Each of the detection sensors 2020, 2022 is coupled to a bottom surface of the cooking device 2002. Each of the detection sensors 2020, 2022 are similar to the detection sensors 226a, 226b, and comprise a microswitch comprising at least plunger and at least one spring coupled thereto. Each of the plungers are configured to be depressed by a vessel, such as the vessel 2004. Depressing (e.g., applying a compressive force against) the one or more plungers 2050, 2054 may cause an electrical signal to change accordingly. If the change in the electrical signal meets a predetermined condition (e.g., based on current, voltage, polarity, or a combination thereof), the vessel may be qualified for use with the cooking device 2002. If the predetermined condition is not met, the vessel may not be qualified for use with the cooking device so the cooking device may not operate. That is, the cooking device 2002 requires each of the detection sensors 2020, 2022 to be depressed by a predetermined magnitude in order to turn on and/or perform a cooking process. Accordingly, the detection sensors 2020, 2022 ensure that only safe and properly qualified vessels may be used with the cooking device 2002. A user interface 2010 can be used to inform a user of an incorrect container or placement, or can be used to allow a user to input cooking commands.

Figure 18:
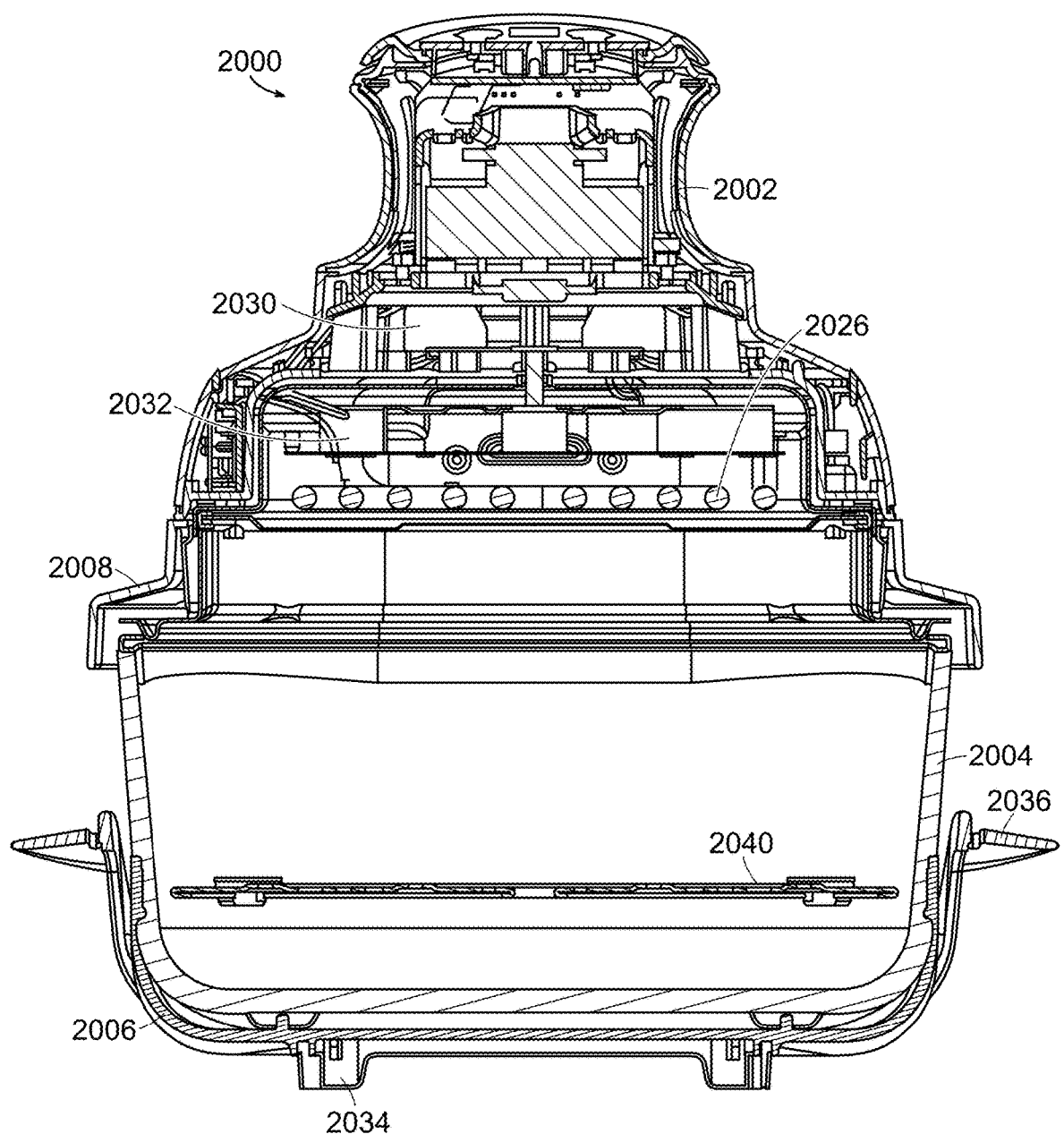
FIG. 18 is a cross-sectional view of the cooking system taken along line 18-18 in FIG. 16.
Figure 19:
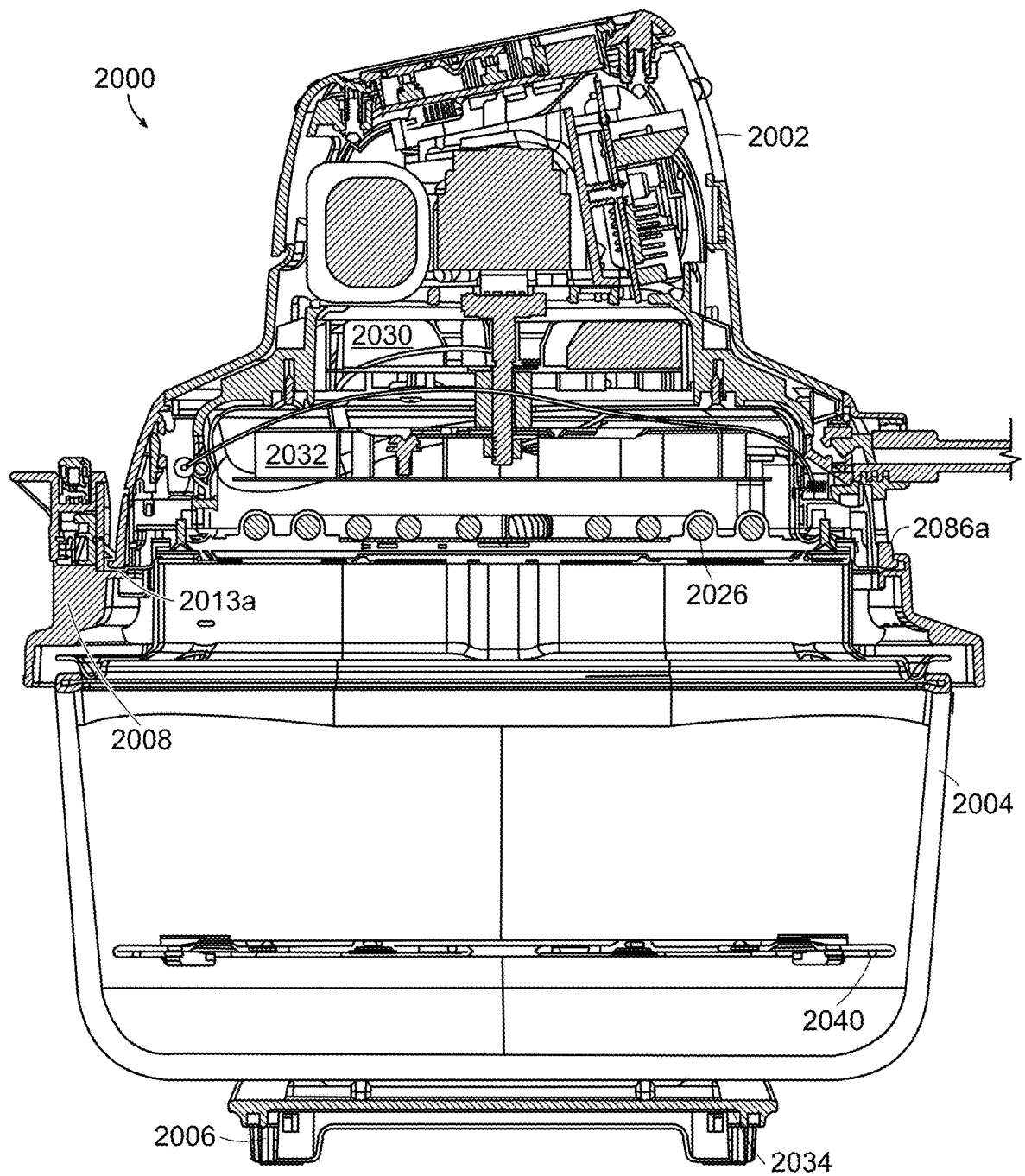
FIG. 19 is a cross-sectional view of the cooking system taken along line 19-19 in FIG. 16.
Figure 20:
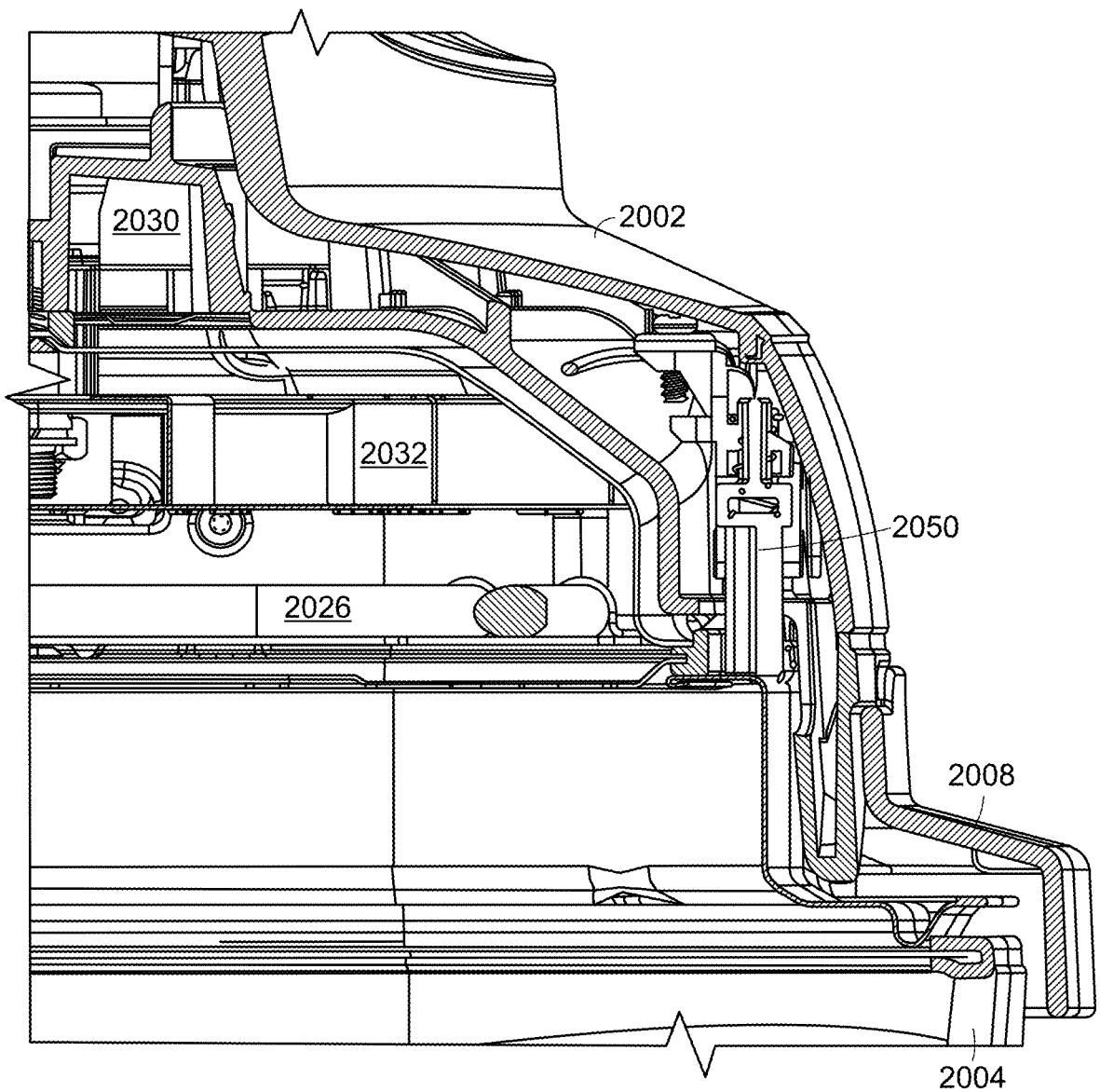
FIG. 20 is a detailed cross-sectional view of the cooking system in FIG. 19.
Figure 21:
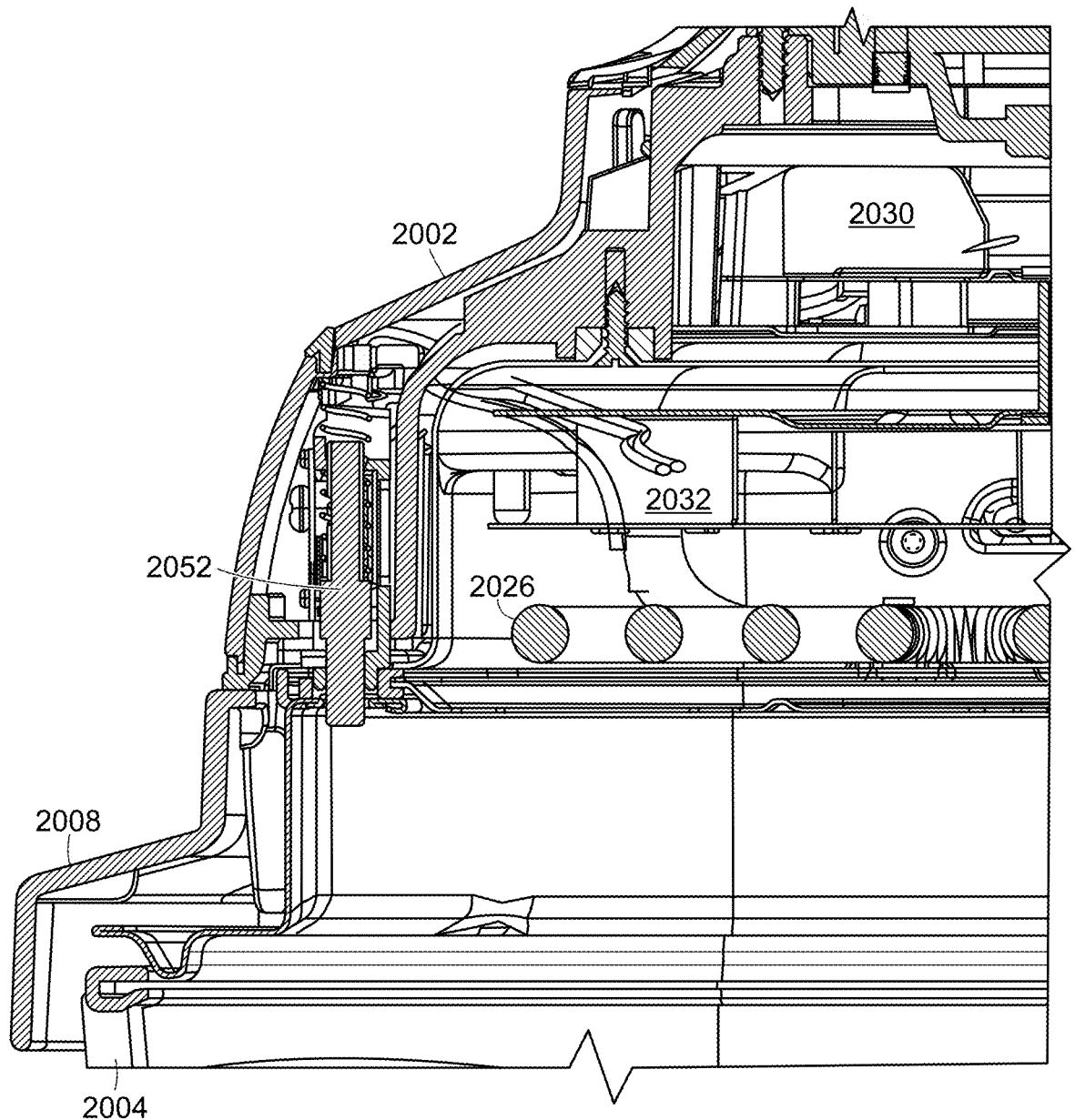
FIG. 21 is a detailed cross-sectional view of the cooking system in FIG. 19.

As stated above, the adapter housing 2008 can be used to increase the cross-sectional area of the cooking chamber in use with a larger vessel 2004. As shown in FIGS. 18-19, the adapter housing 2008 is positioned between the cooking device 2002 and the vessel 2004. Illustrated in FIGS. 23-26, the adapter housing 2008 includes a center aperture 2009 for letting heated air from the cooking device 2002 to pass therethrough into the vessel 2004. The adapter housing 2008 also includes an outer housing 2080 and an inner body 2082. The inner body 2082 includes a top surface 2082A and holes 2084, and can move relative to the outer housing 2080 via springs connecting the outer housing 2080 to the inner body 2082. This is to ensure that the microswitches are not triggered without the adapter housing 2008 being connected to the cooking device 2002, but not to a vessel 2004. Additionally, the outer housing 2080 contacts a surface such as a counter top when the device is not in use. The inner body 2082 does not contact the counter top, and also doesn't contact the plungers 2050, 2052, 2054 when the outer housing 2080 rest on a counter top and not on the vessel 2004. The contacting surface 2082A contacts the plungers 2050 and 2054 of the detection sensors 2020, 2022 when the adapter housing is placed between the cooking device 2002 and the vessel 2004. The holes 2084 are to allow the plunger 2052 of the detection sensor 2024 to pass therethrough, thereby not triggering the detection sensor 2024. This informs the cooking device 2002 that the adapter housing 2008 is in use, and therefore, so is a large vessel 2004. This allows the cooking device to self-calibrate due to the larger volume of the vessel 2004.

Arranged between the outer housing 2080 and the inner body 2082 can be an air channel 2085 that receives a cooling airflow from the cooking device. In an aspect, a cooling airflow is passed over the exterior of the container during a cooking process to help cool the exterior surface of the container. When no adaptor plate is being used, the cooling airflow exits the outlets on the bottom surface of the cooking device and directly contacts the exterior surface of the container. When the adaptor plate 2008 is used with the cooking device, the cooling airflow is passed through the air channel 2085, and directed radially outward in order to direct the cooling airflow over the exterior surface of the large container.

A leg 2081 can be arranged at each corner of the outer housing 2080 in order to space the outer housing 2080 from a support surface. This creates an air gap in between the heating element and the support surface, which helps insulate the support surface from any heat still being produced from the heating element, reducing the heat transfer. The adapter housing 2008 can also include a connector assembly 2012 including a moveable tab 2013 and a torsion spring tab 2086. The cooking device 2002 includes corresponding features 2013a, 2086a on the outside housing positioned at the bottom surface, which connect with the tabs 2013, 2086. User can remove the adapter housing 2008 from the cooking device 2002 by deforming the tab 2013 to release it from an indent in the cooking device 2002. Positioned on each of the legs can be centering tabs 2087. The centering tabs 2087 are configured to help center the adaptor housing onto the container when a user places the adaptor plate on the container.

Figure 28:
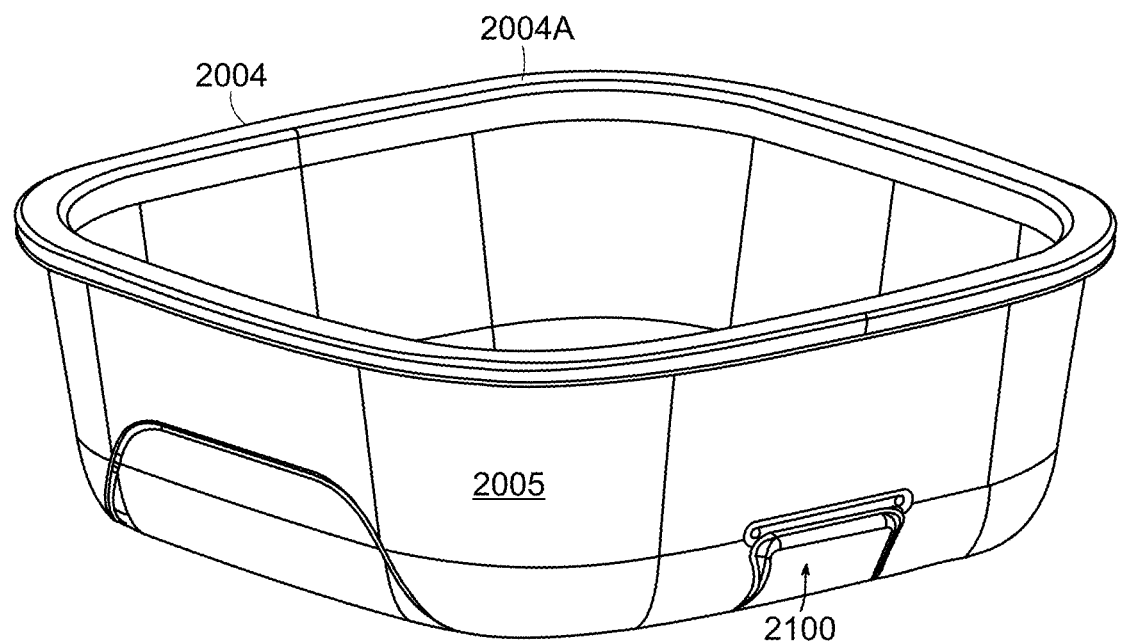
FIG. 28 is an isolated perspective view of the vessel of FIG. 27.
Figure 29:
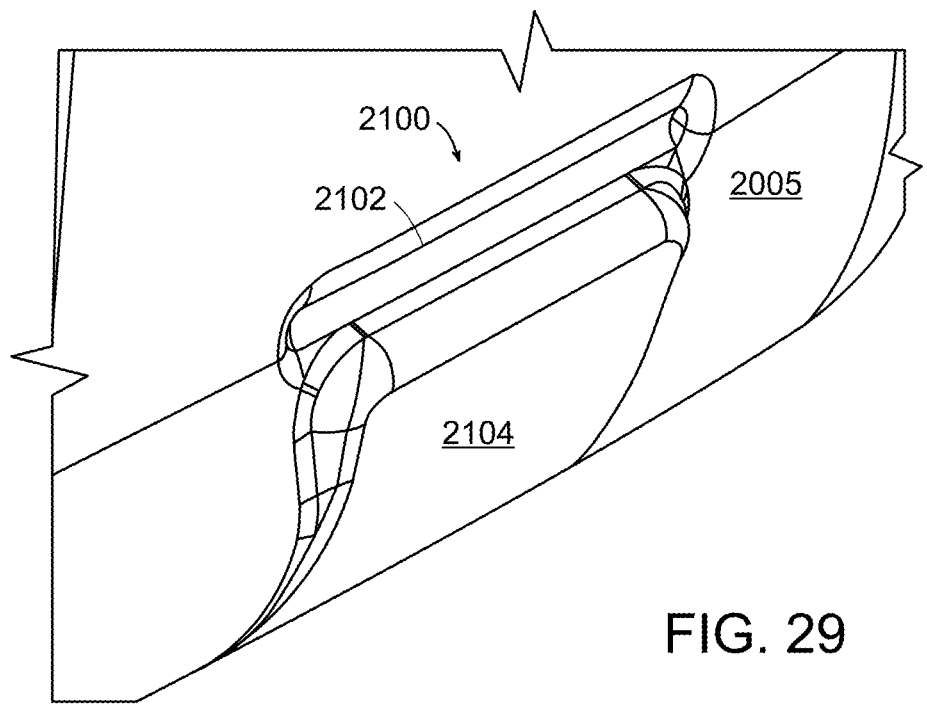
FIG. 29 is a detailed perspective view of the vessel of FIG. 28.

The cooking devices described herein, such as the cooking device 2002, may be used with a variety of vessels comprising a variety of sizes. The vessels, which may also be referred to as containers, may be configured to contain one or more goods intended for heating. For example, FIGS. 27-31 further illustrate the vessel 2004. The vessel 2004 comprises a contacting surface 2004A and a sidewall 2005. The vessel 2004 is similar to the vessel 1930, so like components will not be described in detail. The vessel protection handles described herein may engage with one or more surface features of a vessel sidewall. For example, a connection assembly 2100 can be positioned on the sidewall 2005, such that the vessel protection handle may releasably couple (e.g., via friction fit) thereto. For example, FIGS. 28-29 illustrates the vessel 2004 with an indent 2102 and a dedent 2104. A connection assembly 2100 can be positioned on multiple sides of the vessel 2004. The indent 2102 and dedent 2104 may be configured to receive a handlebar of a thermal protection element, as described in greater detail below.

One or more thermal protection elements may be coupled to the vessels described herein. For example, the vessel 2004 may reach elevated temperatures during and/or after a cooking process. Therefore, reducing or preventing heat transfer from the vessels 2004 to the user and/or countertop may prevent injuries, damage, burns, or a combination thereof. The thermal protection element may comprise a base (e.g., a trivet, mat) that may be releasably coupled to a bottom surface of a vessel. For example, FIGS. 30-34 illustrate the thermal protection element 2006. The thermal protection element 2006 comprises a base configured to reduce or eliminate heat transfer from the vessel 2004 to a mounting surface (e.g., countertop) to avoid burning or otherwise damaging the mounting surface. Accordingly, the thermal protection element 2006 may be made of rubber, plastic, metal, or combination thereof. Additionally, in an aspect, the air outlets 2025 can blow exhaust air from the cooking device in order to cool the outer surface of the sidewall of the vessel. In an aspect, the outlets 2025 are positioned about the circumference of the cooking device 2002 at the bottom surface 2016. In an aspect, the outlets are not positioned at the locations for the handles of the thermal protection element 2006.

The base 2006 can include support arms 2134, 2136 extending upward and connected by a handlebar 2036. Arranged in between the support arms 2134, 2136 is a connector plate 2130. The connector plate 2103 include an indent 2152, and a dedent 2150, which correspond to the indent 2102 and dedent 2104 of the vessel 2004. Accordingly, the vessel 2004 may be coupled to the vessel protection element 2006 by a friction fit. For example, the vessel 2004 may be snapped or pushed into the one or more depressions, grooves, or valleys. In further variations, the vessel 2004 may be releasably coupled to the base by a fastener (e.g., screw, nail, bolt) and/or an adhesive.

A gap 2138 can be positioned between the connector plate 2130 and the support arms 2134, 2136. This allows the connector plate 2130 to move relative to the handlebars 2036, preventing unwanted disengagement of the thermal protection element 2006 from the vessel 2004 when a user is grasping the handlebars 2036. In an aspect, the connector plate 2130 can be flexible and deformed in such a way to remove the thermal protection element 2006 from the vessel 2004. The gap 2138 also can act as a thermal break between the vessel 2004 and the handlebars 2036 in order to reduce the heat transfer to the handlebars 2036 during a cooking process. Additionally, in an aspect, a gap 2036A can be positioned between the handlebar 2036 and the support legs 2134, 2136. The gap 2036A acts as a thermal break to prevent heat transfer to the handlebars 2036.

Figure 30:
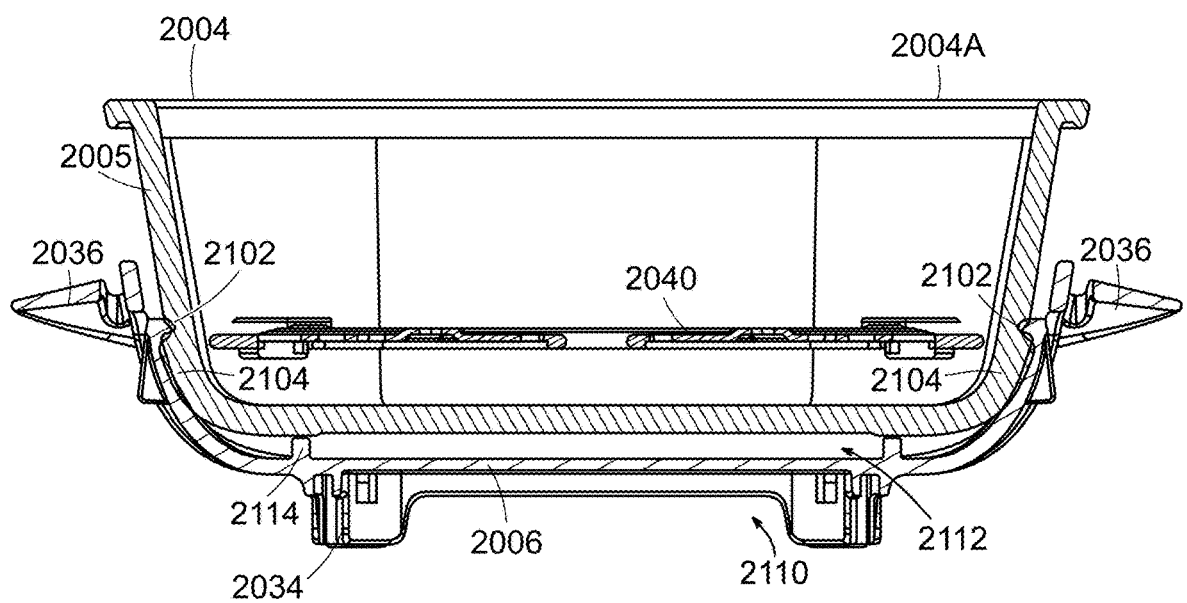
FIG. 30 is a cross-sectional view of the vessel and base taken along line 30-30 in FIG. 27.
Figure 31:
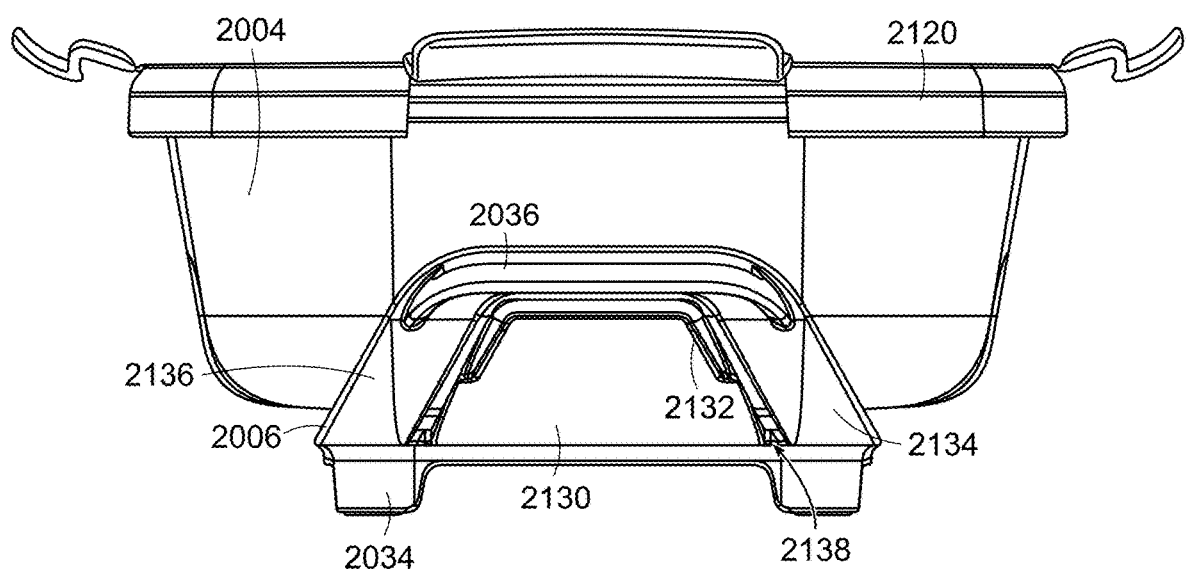
FIG. 31 is a side view of the vessel and the base of FIG. 27 with an aspect of a lid arranged thereon.
Figure 32:
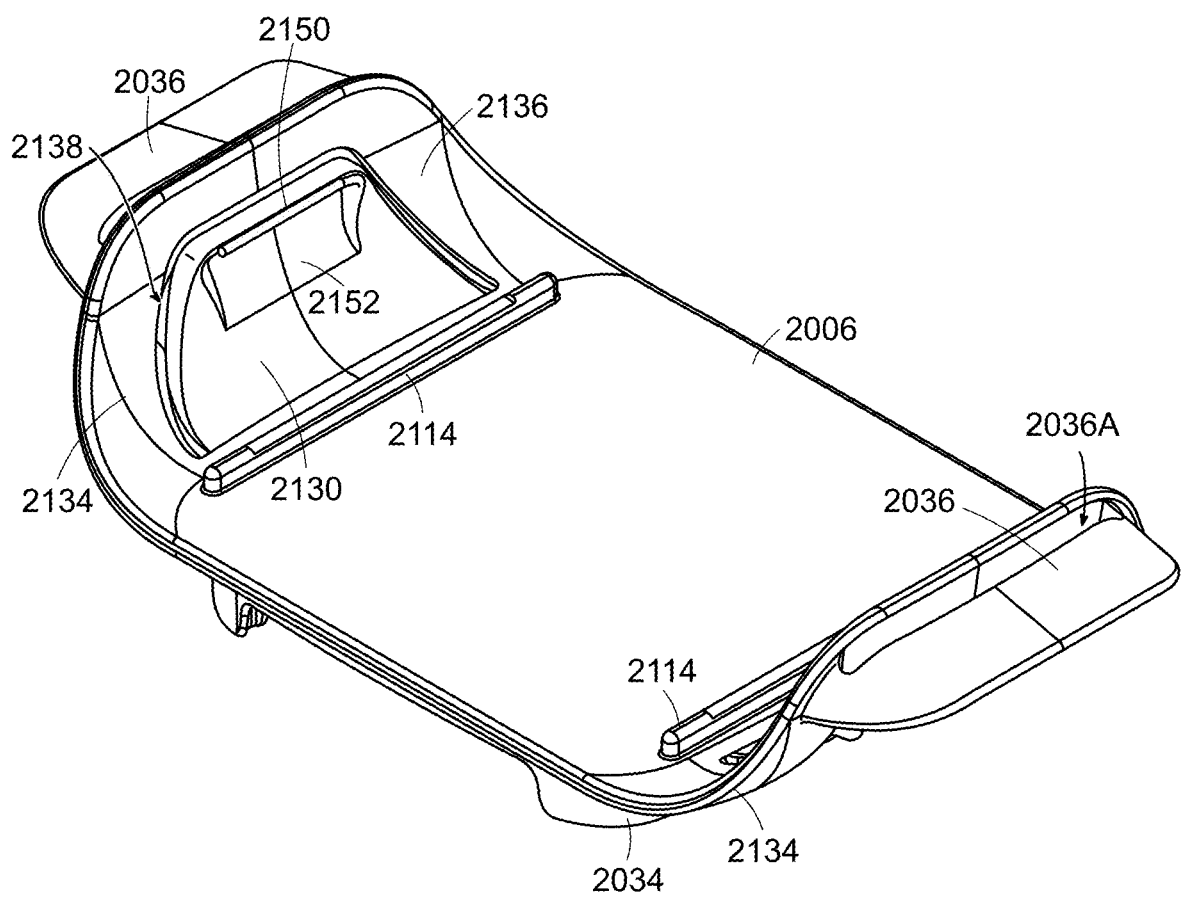
FIG. 32 is a front isolated perspective view of the base of FIG. 26.
Figure 33:
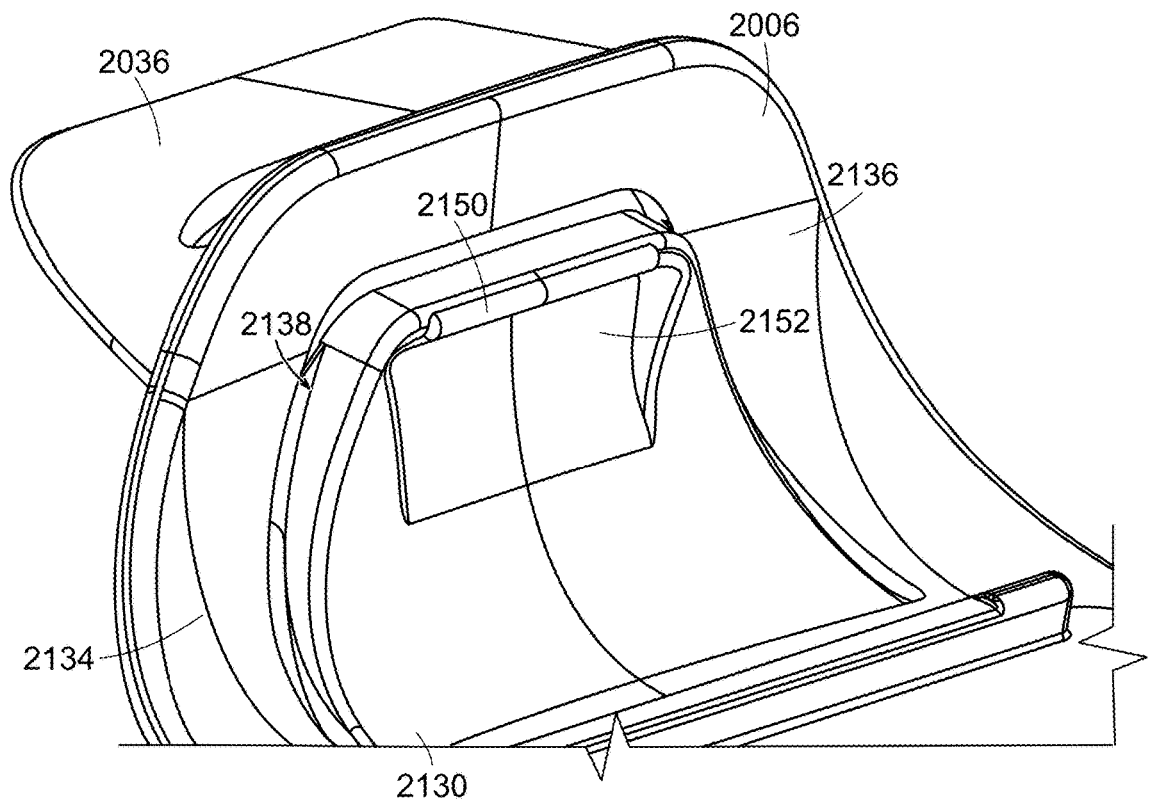
FIG. 33 is a detailed perspective view of the base of FIG. 32.
Figure 34:
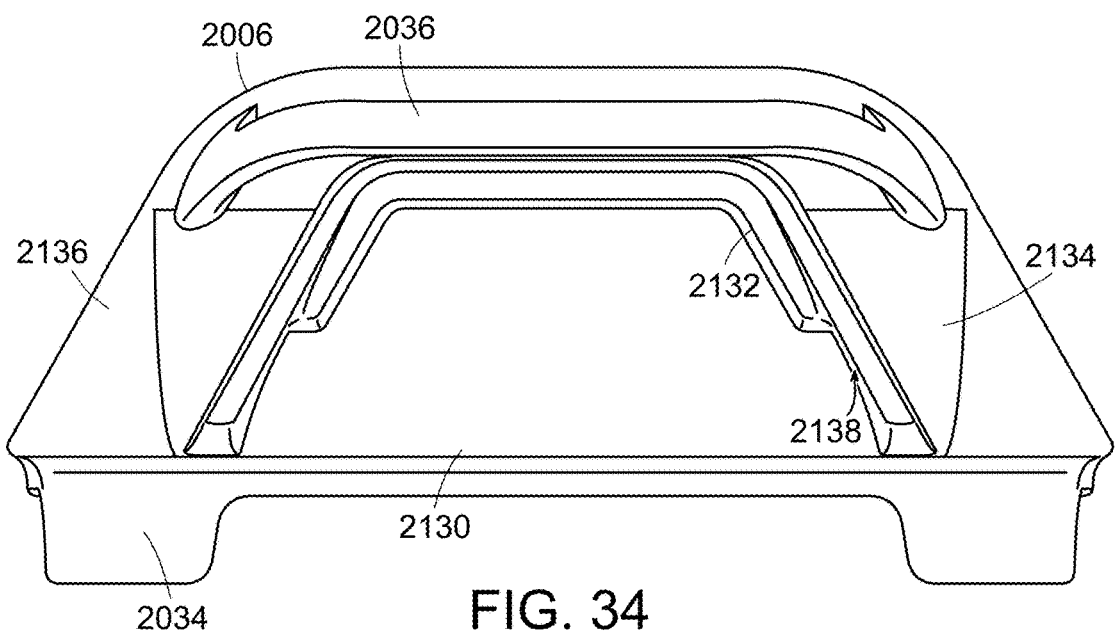
FIG. 34 is a side view of the base of FIG. 32.
Figure 35:
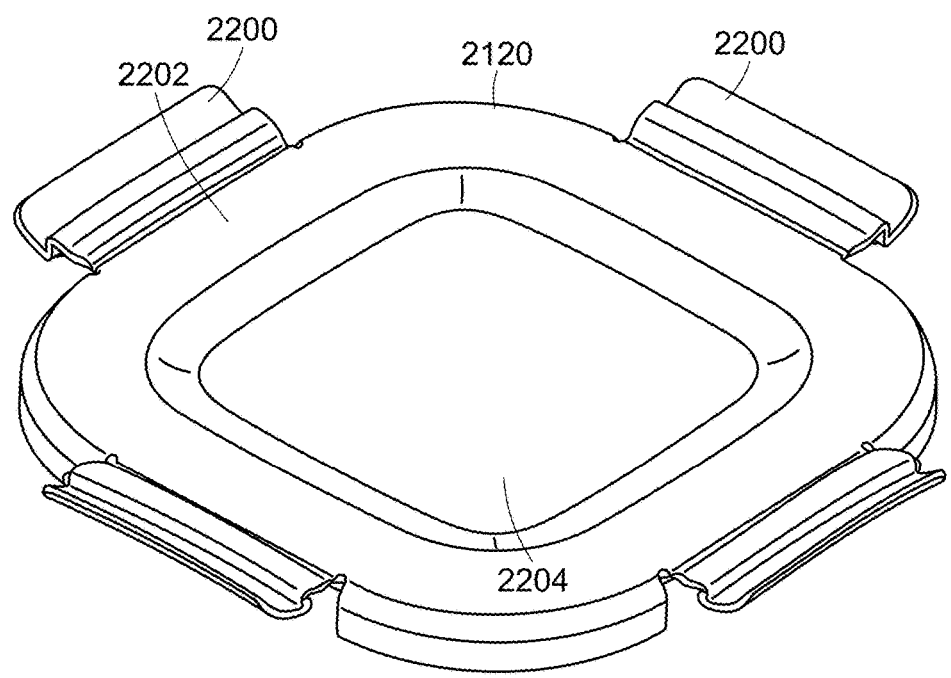
FIG. 35 is a front isolated perspective view of the lid of FIG. 31.
Figure 36:
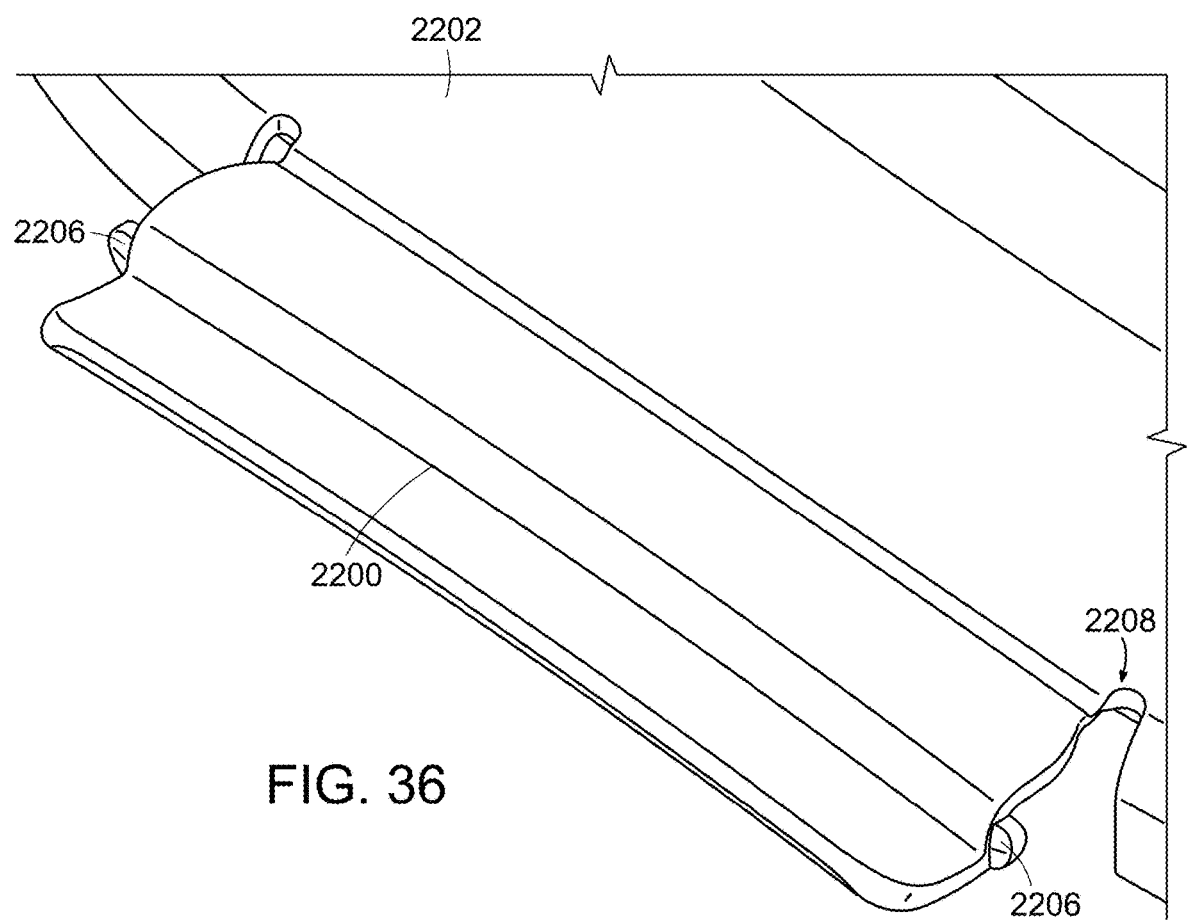
FIG. 36 is a detailed perspective view of the lid of FIG. 35.

In some variations, the thermal protection element 2006 described herein may be coupled to, or integrally formed with, one or more base mounting legs 2034. Similar to the mounting legs described with respect to the cooking device, the base mounting legs may be configured to reduce heat transfer to the mounting surface, such as from the vessel and/or base. For example, as shown in FIG. 30, the thermal protection element 2006 further comprises legs 2034 which create a gap 2110 between the thermal protection element 2006 and a cooking surface (i.e., a counter). In an aspect, the height of the gap 2110 is between 13.4 millimeters and 14.5 millimeters, with 13.9 millimeters being a preferred gap height. Additionally, the thermal protection element 2006 can also include projections 2114 which extend upward from the base and create a gap 2112 between the vessel 2004 and the thermal protection element 2006. In an aspect, the height of the gap 2112 is between 5.0 millimeters and 6.0 millimeters, with 5.5 millimeters being a preferred gap height. Therefore, in an aspect, the ratio of the height of gap 2110 to the height of the gap 2112 is 2.5:1, and can be within a range of 2.0:1 to 3.0:1. This gap height ratio helps ensure properly insulation between the container, base, and support surface during a cooking process.

In some variations, the vessels described herein may further comprise a lid configured to cover the opening when not otherwise covered by a cooking device. The lid (e.g., a storage lid) may provide an air-tight seal of the opening, such that any food contained within the cavity may be isolated from an external environment. The storage lid may be releasably coupled to the vessel by one or more clamps positioned around a perimeter of the storage lid. For example, FIGS. 35-38 illustrate the vessel 2004 releasably coupled to a storage lid 2120. The storage lid 810 comprises clamps 2200 positioned around a circumference of the lid 2120. The lid 2120 also includes a central portion 2204, and an outer edge portion 2202. The clamps 2200 secure to the outer edge portion 2202 by a living hinge. Each of the clamps 2200 includes a bent section 2234 which is configured to releasably couple to a lip 2240 and channel 2242 of the vessel 2004. A seal 2236 can be positioned within the lid 2120 and contact the contacting surface of the vessel 2004 in order to seal the lid 2120 to the vessel 2004. The clamps 2200 also include projections 2206 positioned on the lateral edges of the clamp 2200. The projections extend across the gap 2208 formed between the clamps 2200 and the outer edge portion 2202, and lock the clamps 2200 in a locked position.

Figure 37:
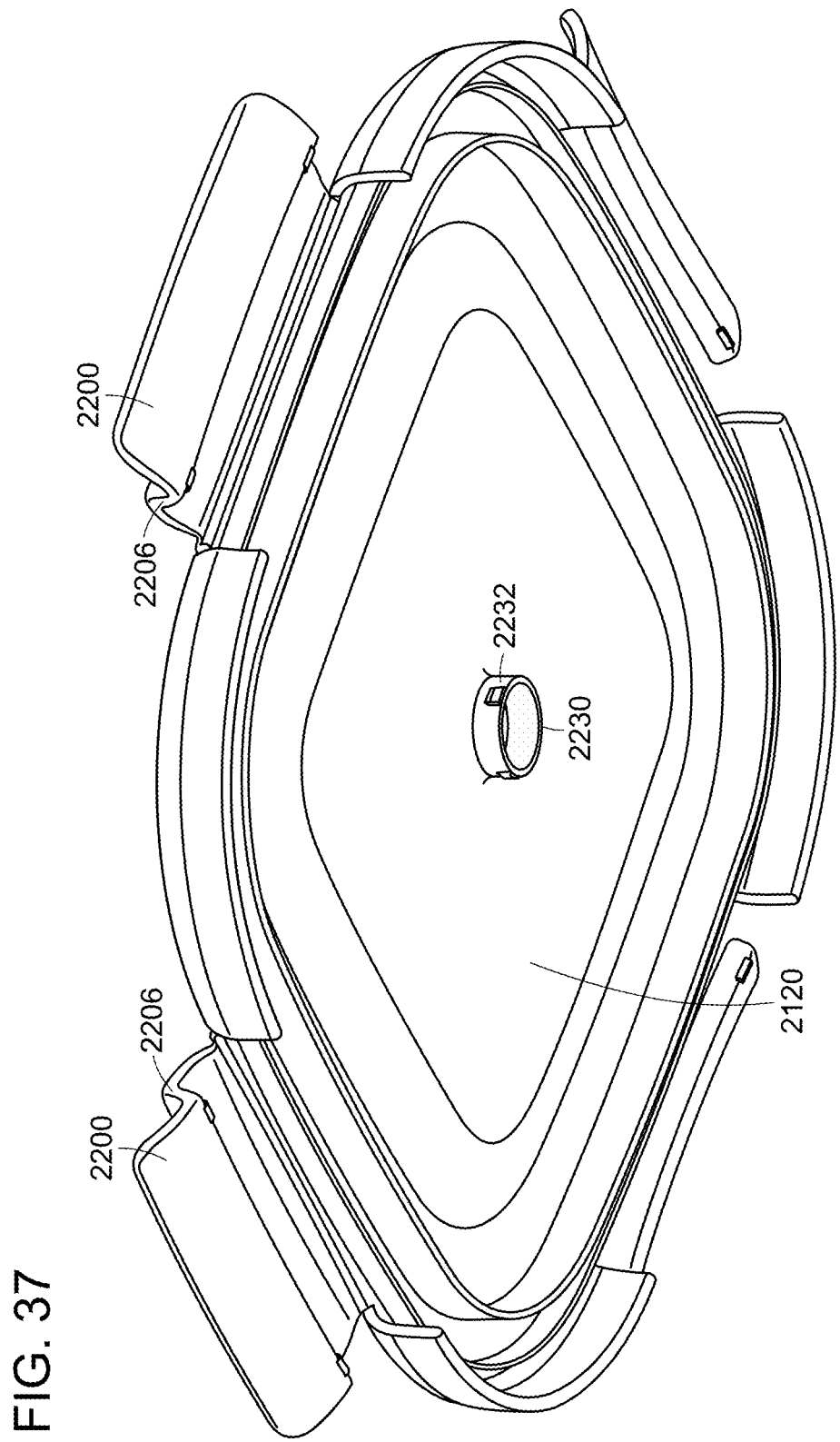
FIG. 37 is a bottom perspective view of the lid of FIG. 35.
Figure 38:
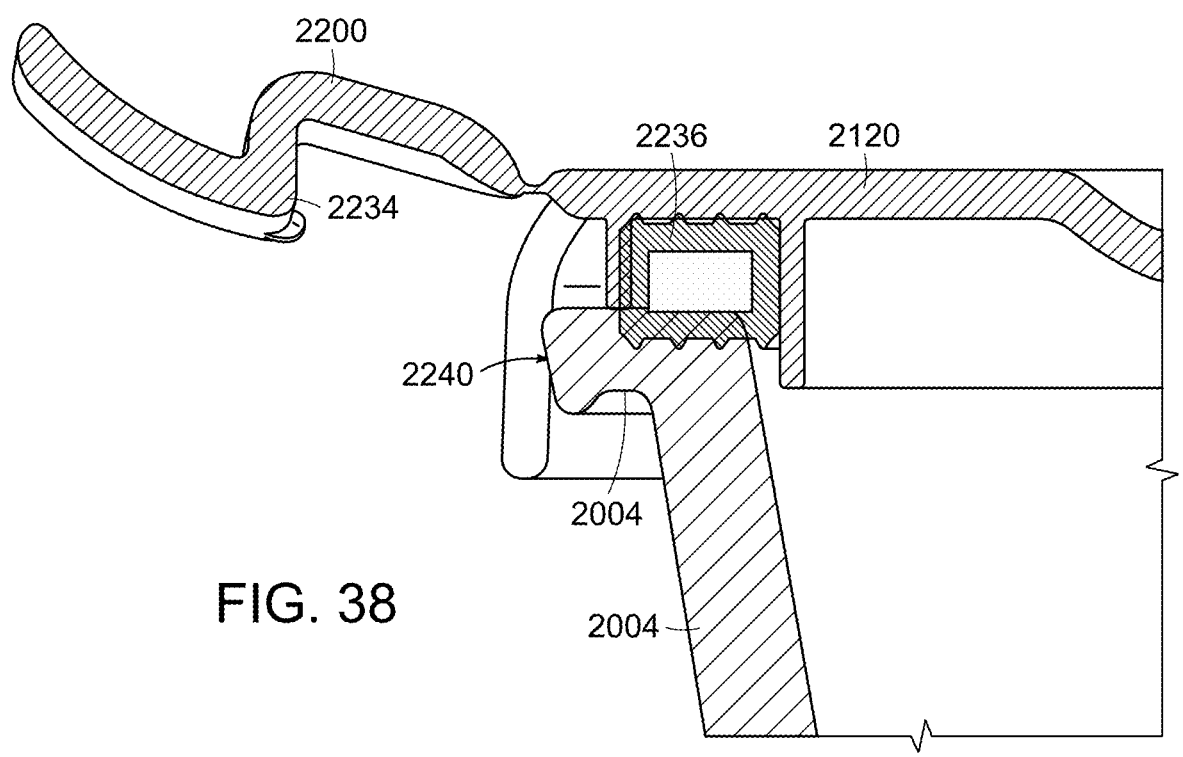
FIG. 38 is a detailed cross-sectional view of the lid of FIG. 35 arranged on the vessel.

The crisper tray may be configured to be releasably coupled to the storage lid of a given vessel when not in use. For example, FIG. 37 illustrates the storage lid 2120 having a projection 2230 extending from a bottom surface of the central portion. The projection 2230 can include radial projections 2232 that extend radially outward, and create a diameter that is larger than the central hole 2041 of the crisper tray 2040. The projections 2232 can also be flexible to allow the projection 2230 to pass through the hole 2041 of the crisper tray 2040. In an aspect, the central portion 2204 can be shaped such that the central portion 2204 receives an adjacent thermal projection element 2006 resting on top of the lid 2202.

Figure 39:
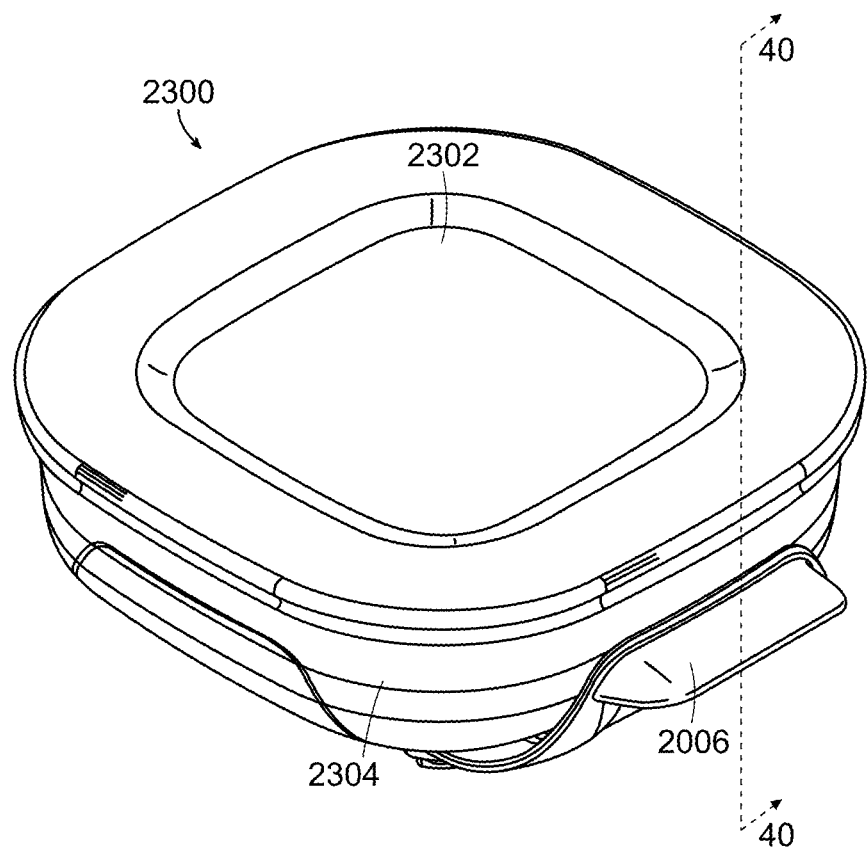
FIG. 39 is a perspective view of the vessel and base of FIG. 27 with an aspect of a lid arranged thereon.
Figure 40:
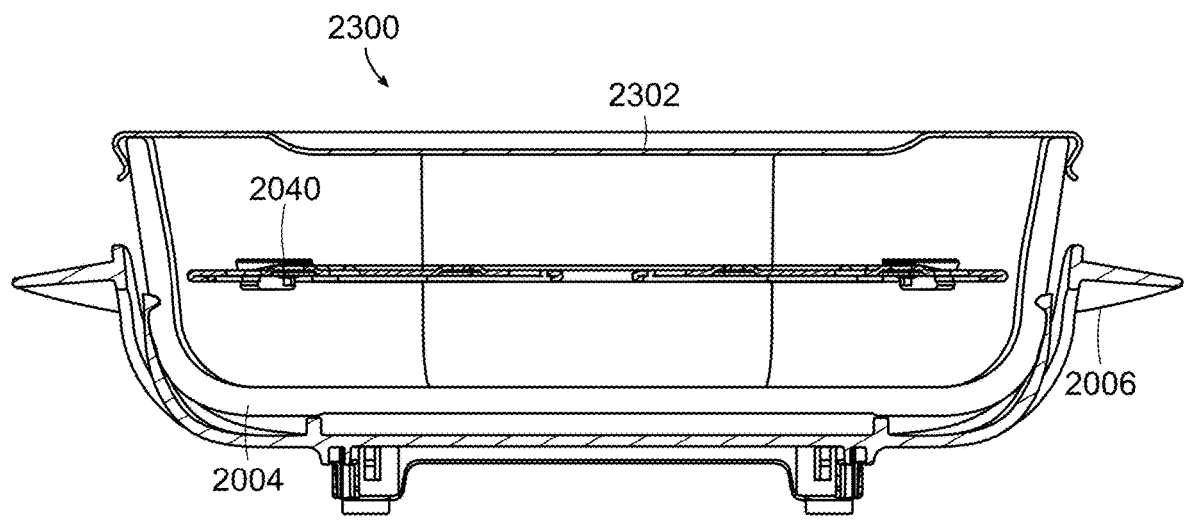
FIG. 40 is a cross-sectional view of the vessel, base, and lid taken along line 40-40 in FIG. 39.

FIGS. 39-40 depict another aspect of a vessel 2304 having a storage lid 2302. The storage lid 2302 does not include clamping members, and instead is a friction fit over the top of the vessel 2304. The vessel 2304 also so not include the lip or channel of the vessel 2004, and instead includes a straight edge along the sidewall.

Figure 41:
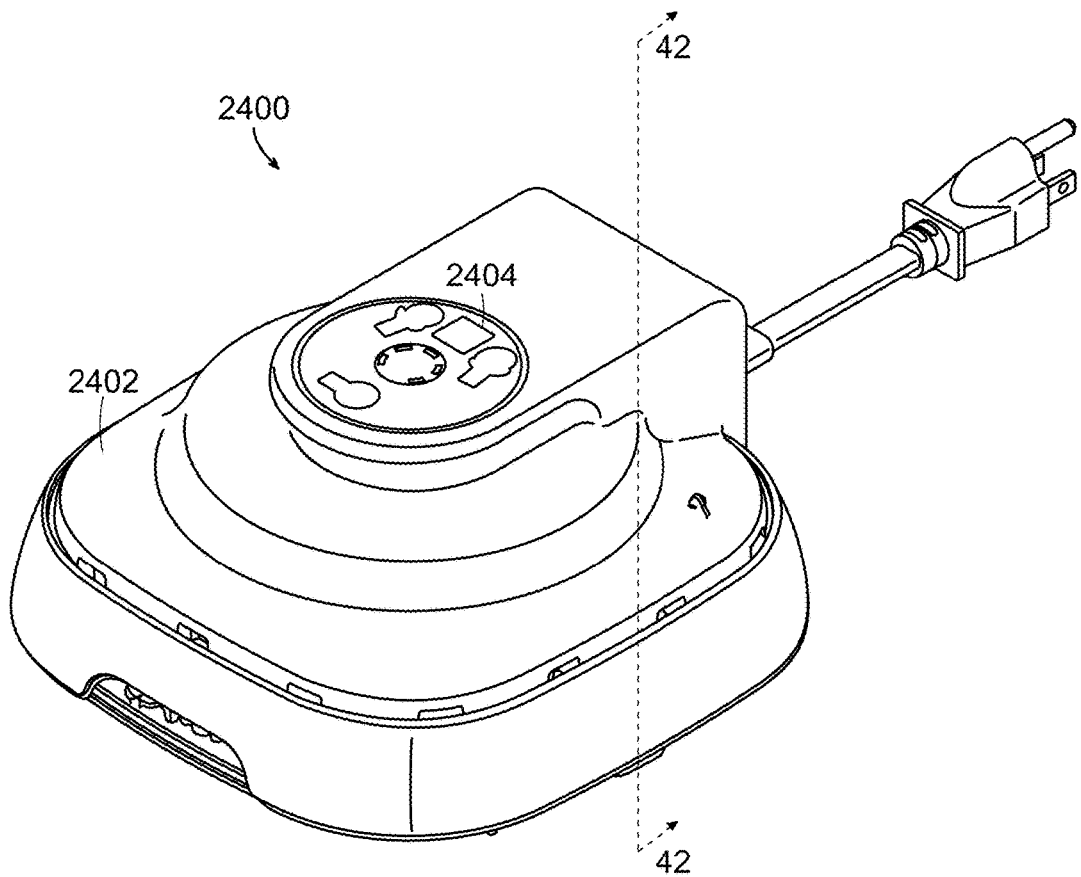
FIG. 41 is a perspective view of an aspect of a cooking system according to the subject matter described herein.
Figure 42:
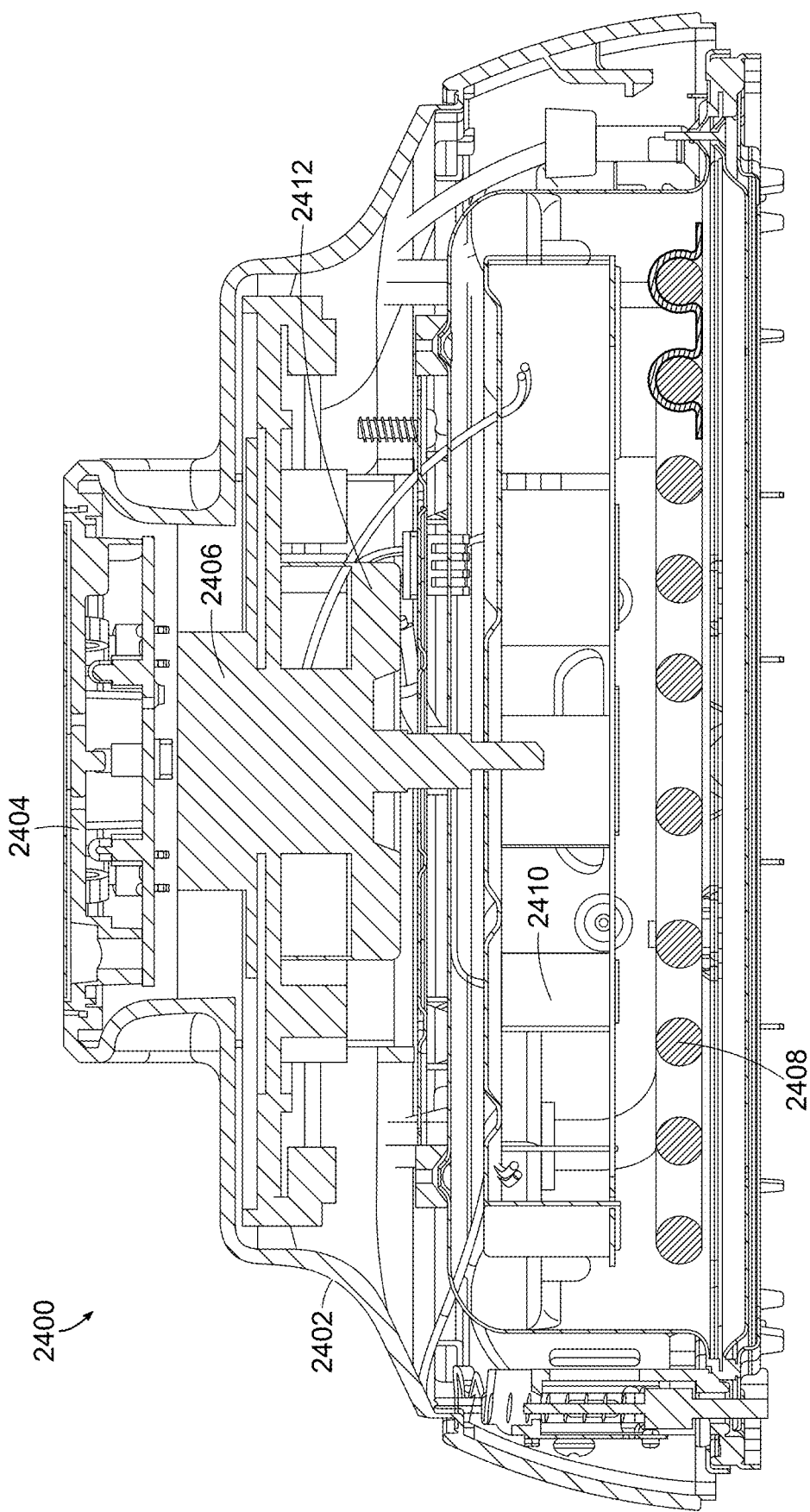
FIG. 42 is a cross-sectional view of the cooking system taken along line 42-42 in FIG. 41.

In an aspect, the motor of the cooking device can be replaced with a brushless DC motor and integrate the exhaust fan into the housing of the BLDC motor. Illustrated in FIGS. 41-42 is a cooking 2400 having a BLDC motor. As shown, the cooking device 2400 includes a housing 2402 and an input panel 2404. The cooking device includes a heating element 2408, a convection fan 2410, an exhaust fan 2412, and a BLDC motor 2406. As seen in FIG. 42, the height of the housing 2402 is reduced due to the compact nature of the BLDC motor 2406, and the integration of the exhaust fan 2412 into the BLDC motor housing.

Certain aspects have been described to provide an overall understanding of the principles of the structure, function, manufacture, and use of the systems, devices, and methods disclosed herein. One or more examples of these implementations have been illustrated in the accompanying drawings. Those skilled in the art will understand that the systems, devices, and methods specifically described herein and illustrated in the accompanying drawings are non-limiting exemplary implementations and that the scope of the present invention is defined solely by the claims. The features illustrated or described in connection with one exemplary implementation may be combined with the features of other implementations. Such modifications and variations are intended to be included within the scope of the present invention. Further, in the present disclosure, like-named components of the implementations generally have similar features, and thus within a particular implementation each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described implementations. Accordingly, the present application is not to be limited by what has been particularly shown and described, except as indicated by the appended claims. All publications and references cited herein are expressly incorporated by reference in their entirety.

What is claimed is:

1. A vessel assembly, comprising:
   a unitary vessel comprising a top opening, a closed bottom, and a cavity therein, the vessel configured to support a cooking device at the top opening to receive a heated airflow through the top opening and into the cavity from a cooking device covering the opening; and
   a U-shaped base fixed to opposed sidewalls of the vessel and configured to rest on a support surface, the base configured to support the closed bottom of the vessel without contacting the cooking device.

2. The vessel assembly of claim 1, wherein the base comprises an insulating body configured to protect the support surface from heat radiating from the vessel due to the heated airflow, and
   wherein a gap is positioned between the bottom surface of the vessel and a top surface of the insulating body.

3. The vessel assembly of claim 2, wherein a gap is positioned between a bottom surface of the base and the support surface.

4. The vessel assembly of claim 2, wherein the insulating body is positioned between the support surface and the bottom surface of the vessel.

5. The vessel assembly of claim 2, wherein the insulating body is formed from a non-conductive material.

6. The vessel assembly of claim 2, wherein the insulating body comprises at least one leg extending downward from a bottom surface of the insulating body, and at least one projection extending upward from a top surface of the insulating body.

7. A vessel assembly, comprising:
 a vessel, comprising:
  a cavity configured to receive a food product therein;
  an opening positioned in a wall of the vessel and configured for accessing the cavity;
  a handlebar positioned under the vessel and configured to be contacted by a user, the handlebar extending upward along a portion of a height of the vessel; and
  a gap positioned between the wall of the vessel and the handlebar, the gap configured to be a thermal break between the vessel and the handlebar.

8. The vessel assembly of claim 7, further comprising a base configured to abut the vessel and rest on a support surface, the base comprising:
 a connector plate extending from the base and configured to connect to a sidewall of the vessel; and
 a support arm extending from the base;
 wherein the support arm and handlebar are offset from the wall of the vessel.

9. The vessel assembly of claim 8, wherein the connector plate connects to the base along a bottom edge.

10. The vessel assembly of claim 8, wherein the base is formed from a non-conductive material.

11. The vessel assembly of claim 8, wherein heat energy is configured to be transferred to the connector plate and to subsequently passes through the base prior to passing into the support arm.

12. The vessel assembly of claim 8, wherein an insulating air gap is formed between the wall of the vessel and the handlebar.

13. The vessel assembly of claim 8, wherein a second thermal break is positioned between a portion of the handlebar and the support arm.

14. A vessel assembly, comprising:
 a vessel having a cavity therein and a sidewall having a first indent and a first detent positioned thereon;
 a base positioned below a bottom surface of the vessel; and
 a connector plate extending from the base and including a second indent and a second detent;
 wherein the first detent is received within the second indent, and the second detent is received within the first indent when the base is connected to the vessel; and
 wherein the connector plate is flexible.

15. The vessel assembly of claim 14, wherein the vessel further includes a third indent and a third detent positioned on an opposite side of the sidewall relative to the first indent and the first detent.

16. The vessel assembly of claim 15, wherein the base further includes a second connector plate extending from the base and including a fourth indent and a fourth detent.

17. The vessel assembly of claim 16, wherein the third detent is received within the fourth indent, and the fourth detent is received within the third indent when the base is connected to the vessel.

18. The vessel assembly of claim 17, wherein the first connector plate and the second connector plate connect to the base along a bottom edge, respectively.

19. The vessel assembly of claim 1, wherein the vessel is formed at least partially from glass.

20. The vessel assembly of claim 8, where in the vessel is formed at least partially from glass.

21. The cooking vessel of claim 1, wherein the U-shaped base includes a first handle and a second handle each flaring away from and being on opposing sides of the vessel.

22. The cooking vessel of claim 7, wherein the handlebar abuts a sidewall of the vessel.

23. The cooking vessel of claim 1, wherein the U-shaped base is U-shaped at a vertical cross-section of the base.

* * * * *